United States Patent
Suzuki et al.

(10) Patent No.: US 9,430,637 B2
(45) Date of Patent: Aug. 30, 2016

(54) SERVICE PROVIDING SYSTEM AND INFORMATION GATHERING METHOD

(71) Applicants: Shohta Suzuki, Kanagawa (JP); Naritake Kondoh, Kanagawa (JP); Shohichi Naitoh, Kanagawa (JP); Sachiko Takeuchi, Tokyo (JP)

(72) Inventors: Shohta Suzuki, Kanagawa (JP); Naritake Kondoh, Kanagawa (JP); Shohichi Naitoh, Kanagawa (JP); Sachiko Takeuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/332,557

(22) Filed: Jul. 16, 2014

(65) Prior Publication Data
US 2015/0029536 A1   Jan. 29, 2015

(30) Foreign Application Priority Data

Jul. 26, 2013 (JP) .................................. 2013-155173
Jul. 29, 2013 (JP) .................................. 2013-157009

(51) Int. Cl.
| | |
|---|---|
| *G06K 15/00* | (2006.01) |
| *G06F 3/12* | (2006.01) |
| *G06F 21/44* | (2013.01) |
| *G06F 21/60* | (2013.01) |
| *G06F 21/12* | (2013.01) |
| *H04N 1/40* | (2006.01) |

(52) U.S. Cl.
CPC ............ *G06F 21/44* (2013.01); *G06F 3/1219* (2013.01); *G06F 3/1239* (2013.01); *G06F 3/1288* (2013.01); *G06F 21/121* (2013.01); *G06F 21/608* (2013.01)

(58) Field of Classification Search
CPC . H04L 63/104; H04L 63/0807; G06F 3/127; G06F 21/608; G06F 21/144; G06F 3/1222
See application file for complete search history.

(56) References Cited

U.S. PATENT DOCUMENTS

| | | | | |
|---|---|---|---|---|
| 2007/0253014 | A1* | 11/2007 | Nakata | G06F 3/1219 358/1.14 |
| 2008/0244756 | A1* | 10/2008 | Kitada | G06F 21/31 726/28 |
| 2008/0273224 | A1* | 11/2008 | Maulsby | G06Q 10/10 358/1.15 |
| 2011/0067026 | A1 | 3/2011 | Nishio | |
| 2011/0188073 | A1* | 8/2011 | Akutsu | G06F 15/00 358/1.15 |

(Continued)

FOREIGN PATENT DOCUMENTS

| | | |
|---|---|---|
| JP | 2011-059631 | 3/2011 |
| JP | 2013-025413 | 2/2013 |

(Continued)

*Primary Examiner* — Barbara Reinier
*Assistant Examiner* — Henok A Shiferaw
(74) *Attorney, Agent, or Firm* — IPUSA, PLLC

(57) ABSTRACT

A service providing system includes a unit that stores management information associating user identification, service identification information, and device identification information; a unit that receives authentication information from a service using apparatus; a unit that performs an authentication process on the authentication information; a unit that identifies a service based on the authentication information and the management information when the authentication information is authenticated; and an execution unit that executes a process according to a service use request. The execution unit includes a unit that determines rule information to be applied to a user using rule information to be applied to the service according to use history information, a unit that applies the rule information to be applied to the user to the process associated with the service use request; and a unit that stores a record of the applied rule information.

13 Claims, 31 Drawing Sheets

(56) References Cited

U.S. PATENT DOCUMENTS

| | | | |
|---|---|---|---|
| 2013/0016395 A1* | 1/2013 | Akutsu | G06F 3/1219 358/1.15 |
| 2013/0194633 A1 | 8/2013 | Takatsu et al. | |
| 2013/0198211 A1 | 8/2013 | Kohkaki et al. | |
| 2013/0198806 A1 | 8/2013 | Takatsu et al. | |
| 2014/0122349 A1 | 5/2014 | Takatsu et al. | |
| 2014/0123239 A1 | 5/2014 | Fukuda et al. | |

FOREIGN PATENT DOCUMENTS

| | | |
|---|---|---|
| JP | 2013-178748 | 9/2013 |
| JP | 2013-242848 | 12/2013 |
| JP | 2013-257859 | 12/2013 |
| JP | 2014-089678 | 5/2014 |
| JP | 2014-089680 | 5/2014 |
| JP | 2014-112354 | 6/2014 |

\* cited by examiner

FIG.4

| LICENSE TYPE | ID | REGISTRATION CODE | REGISTERED STATUS |
|---|---|---|---|
| TENANT | 10000 | AAA | REGISTERED |
| TENANT | 10001 | AAB | REGISTERED |
| TENANT | 10002 | AAC | NOT REGISTERED |
| PRINT SERVICE | 20000 | — | REGISTERED |
| PRINT SERVICE | 20001 | — | REGISTERED |
| PRINT SERVICE | 20002 | — | NOT REGISTERED |
| DELIVERY SERVICE | 30000 | — | REGISTERED |
| DELIVERY SERVICE | 30001 | — | REGISTERED |
| DELIVERY SERVICE | 30002 | — | NOT REGISTERED |
| ... | ... | ... | ... |

FIG.5

| TENANT ID | NAME | SERVICE ID | SERVICE TYPE | VALID TERM | EXTERNAL SERVICE | EXTERNAL SERVICE | ADDRESS INFORMATION | REGION INFORMATION |
|---|---|---|---|---|---|---|---|---|
| 10000 | COMPANY A | 20000 | PRINT SERVICE | 1 YEAR | ONLINE STORAGE A | ONLINE STORAGE B | A@aaa.com | JAPAN |
| | | 20001 | PRINT SERVICE | 1 YEAR | | | | |
| | | 30000 | DELIVERY SERVICE | 1 YEAR | | | | |
| 10001 | COMPANY B | 30001 | DELIVERY SERVICE | 1 YEAR | ONLINE STORAGE A | — | A@bbb.com | U.S.A. |
| ... | ... | ... | ... | ... | ... | ... | ... | ... |

FIG.6

| TENANT ID | LOGIN | | IN-HOUSE AUTHENTICATION | ONLINE STORAGE A | | ONLINE STORAGE B | | | ADDRESS INFORMATION | ... |
| | USER ID | PASSWORD | USER ID | ACCOUNT | PASSWORD | ACCOUNT | AUTHORIZA-TION TOKEN | SCOPE | | |
|---|---|---|---|---|---|---|---|---|---|---|
| 10000 | YAMADA | 123 | Yamada | YYamada | 1234 | yamada | aaaaa | aa, bb | A@aaa.com | |
| | SATOH | 456 | SatohY | Sato | 4567 | sato | bbbbb | aa | B@aaa.com | |
| | SUZUKI | 789 | SuzukiK | SUZUKI | 7890 | Suzuki | ccccc | bb, cc | C@aaa.com | |
| 10001 | SUZUKI | 111 | — | TSuzuki | 1111 | — | — | — | A@bbb.com | |
| | SASAKI | 222 | — | SASAKI | 222 | — | — | — | D@bbb.com | |
| ... | ... | ... | ... | ... | ... | ... | ... | ... | ... | ... |

FIG.7

| TENANT ID | APPARATUS ID | SERVICE ID | SERVICE TYPE | START DATE | END DATE | ... |
|---|---|---|---|---|---|---|
| 10000 | 1 | 20000 | PRINT SERVICE | 2012/1/1 | 2012/12/31 | |
| | | 30000 | DELIVERY SERVICE | 2012/6/1 | 2013/5/31 | |
| | 2 | 20001 | PRINT SERVICE | 2012/6/1 | 2013/5/31 | |
| 10001 | 3 | 30001 | DELIVERY SERVICE | 2013/1/1 | 2013/12/31 | |
| ... | | | ... | ... | ... | ... |

FIG.8

| EXTERNAL SERVICE ID | SERVICE NAME | CLIENT ID | CLIENT SECRET | PRODUCT NAME | SCOPE | | AUTHORIZATION DESTINATION URL | REDIRECT DESTINATION URL |
|---|---|---|---|---|---|---|---|---|
| 001 | ONLINE STORAGE A | | | | | | | |
| 002 | ONLINE STORAGE B | ABCDE | XXXXX | Servece | aa | | http://www.001.com/auth | http://www.XXX.com/callback |
| | | | | | bb | | | |
| | | | | | cc | | | |
| ... | ... | ... | ... | ... | ... | | ... | ... |

FIG.29

| TENANT ID | 10000 |
|---|---|
| USER ID | YAMADA |
| AUTHORITY INFORMATION | COPY, PRINT |
| UPPER LIMIT VALUE | 25 |
| CONSUMPTION | 15 |
| : | : |

FIG.30

| TENANT ID | | 10000 | |
|---|---|---|---|
| CON-SUMP-TION RATE (%) | 80 | RULE | MANDATORY TWO SIDES |
| | 90 | | MANDATORY BLACK & WHITE |
| | 100 | | MANDATORY DELETION |

FIG.31

| ITEM | FACTOR |
|---|---|
| COLOR | 3.0 |
| BLACK & WHITE | 1.0 |
| A4 | 1.0 |
| A3 | 2.0 |
| : | : |

FIG.32

```
<accountLog startTime="20110530103042" endTime=" 20110530103230" >  ~Er1
    <user name="aaa" />  ~Eu1
    <account type="print" rule = "1" del="0">  //Print (mandatory black & white)
        <attributes>
            <attribute code="color" value="1" />  //Color mode (black & white)
            <attribute code="twosides" value="0" />  //Print side (front)           Eat1   Eac1
            <attribute code="size" value="1" />  //Paper size
        </attributes>
        2  //Number of pages  ~Ep1
    </account>
    <account type="print" rule = "1" del="1">  //Delete according to user instruction
                                                 based on applied rule
        <attributes>
            <attribute code="color" value="1" />  // Color mode (black & white)
            <attribute code="twosides" value="0" />  //Print side (front)                   Eac2
            <attribute code="size" value="1" />  //Paper size
        </attributes>
        2  //Number of pages
    </account>
    <account type="print" rule = "4" del="2">  //Mandatory deletion
        <attributes>
            <attribute code="color" value="1" />  //Color mode (black & white)
            <attribute code="twosides" value="0" />  // Print side (front)                  Eac3
            <attribute code="size" value="1" />  // Paper size
        </attributes>
        2  //Number of pages
    </account>
    <account type="print" rule ="3" del="0">  //Print (mandatory black & white,
                                                mandatory two sides)
        <attributes>
            <attribute code="color" value="1" />  //Color mode (black & white)
            <attribute code="twosides" value="1" />  // Print side (front)                  Eac4
            <attribute code="size" value="1" />  // Paper size
        </attributes>
        2  //Number of pages
    </account>
    <account type="print" rule="3" del="0">  //Print (mandatory black & white,
                                               mandatory two sides)
        <attributes>
            <attribute code="color" value="1" />  //Color mode (black & white)
            <attribute code="twosides" value="2" />  //Print side (back)                    Eac5
            <attribute code="size" value="1" />  // Paper size
        </attributes>
        2  //Number of pages
    </account>
</accountLog>
```

L1

SERVICE PROVIDING SYSTEM AND INFORMATION GATHERING METHOD

BACKGROUND OF THE INVENTION

1. Field of the Invention

The present invention relates to a service providing system and an information gathering method.

2. Description of the Related Art

An image processing apparatus having an authentication function for performing user authentication through login/logout and a use restriction function for implementing a use restriction on a device function (print function) is known (e.g. see Japanese Laid-Open Patent Publication No. 2011-59631).

Also, with regard to the use of the image forming apparatus, organizations such as corporations have been implementing various measures to reduce wasteful printing or wasteful copying in order to reduce the TCO (Total Cost of Ownership). One of such measures includes recommending printing or copying in a relatively low cost mode such as black and white printing or black and white copying, for example. Also, some corporations adopt information processing systems for determining the use status of image forming apparatuses and/or implementing restrictions on setting information related to print jobs and copy jobs (e.g. restricting color copying).

In conventional information processing systems, although the overall effect of such cost reduction measures could be determined, it has been difficult to pinpoint a specific measure that has been particularly effective. For example, even if the number of pages printed using black and white printing could be determined in the conventional information processing system, it has been difficult to determine whether the black and white printing was voluntarily selected by a user or was enforced by the information processing system.

In this respect, information processing apparatuses, programs, and information display apparatuses are known for supporting the determination of cost reduction factors (e.g. see Japanese Laid-Open Patent Publication No. 2013-25413).

SUMMARY OF THE INVENTION

According to one embodiment of the present invention, a service providing system is provided that includes one or more information processing apparatuses and is configured to provide a service to a service using apparatus connected to the service providing system via a network. The service providing system includes a management information storage unit configured to store management information including an association between service identification information of the service to be provided, user identification information of a user using the service, and device identification information of the service using apparatus; an authentication information receiving unit configured to receive authentication information from the service using apparatus, the authentication information including at least one of user authentication information used for user authentication and device authentication information used for device authentication; an authentication unit configured to execute an authentication process on the received authentication information; a service identification unit configured to identify the service associated with the authentication information based on the authentication information and the management information in a case where the authentication information is authenticated; and an execution unit configured to execute a process according to a use request for the service identified by the service identification unit upon receiving the use request for the service from the service using apparatus. The execution unit includes a rule application determination unit configured to determine rule information to be applied to the user based on use history information of the service stored in association with the user identification information, and rule information to be applied to the process associated with the use request for the service according to the use history information; a rule information application unit configured to apply the rule information to be applied to the user determined by the rule application determination unit to the process associated with the use request for the service; and a storage unit configured to store a record of the rule information applied to the process associated with the use request for the service by the rule information application unit.

BRIEF DESCRIPTION OF THE DRAWINGS

FIG. 4 is a table illustrating an exemplary data configuration of license information;

FIG. 5 is a table illustrating an exemplary data configuration of tenant information;

FIG. 6 is a table illustrating an exemplary data configuration of user information;

FIG. 7 is a table illustrating an exemplary data configuration of device information;

FIG. 8 is a table illustrating an exemplary data configuration of external service information;

FIG. 29 is a table illustrating an exemplary data configuration of upper limit management information;

FIG. 30 is a table illustrating an exemplary data configuration of rule information;

FIG. 31 is a table illustrating examples of consumption factors;

FIG. 32 illustrates an exemplary data configuration of log information related to a print job;

DETAILED DESCRIPTION OF THE PREFERRED EMBODIMENTS

In the following, embodiments of the present invention are described with reference to the accompanying drawings.

<System Configuration>

Figure 1:
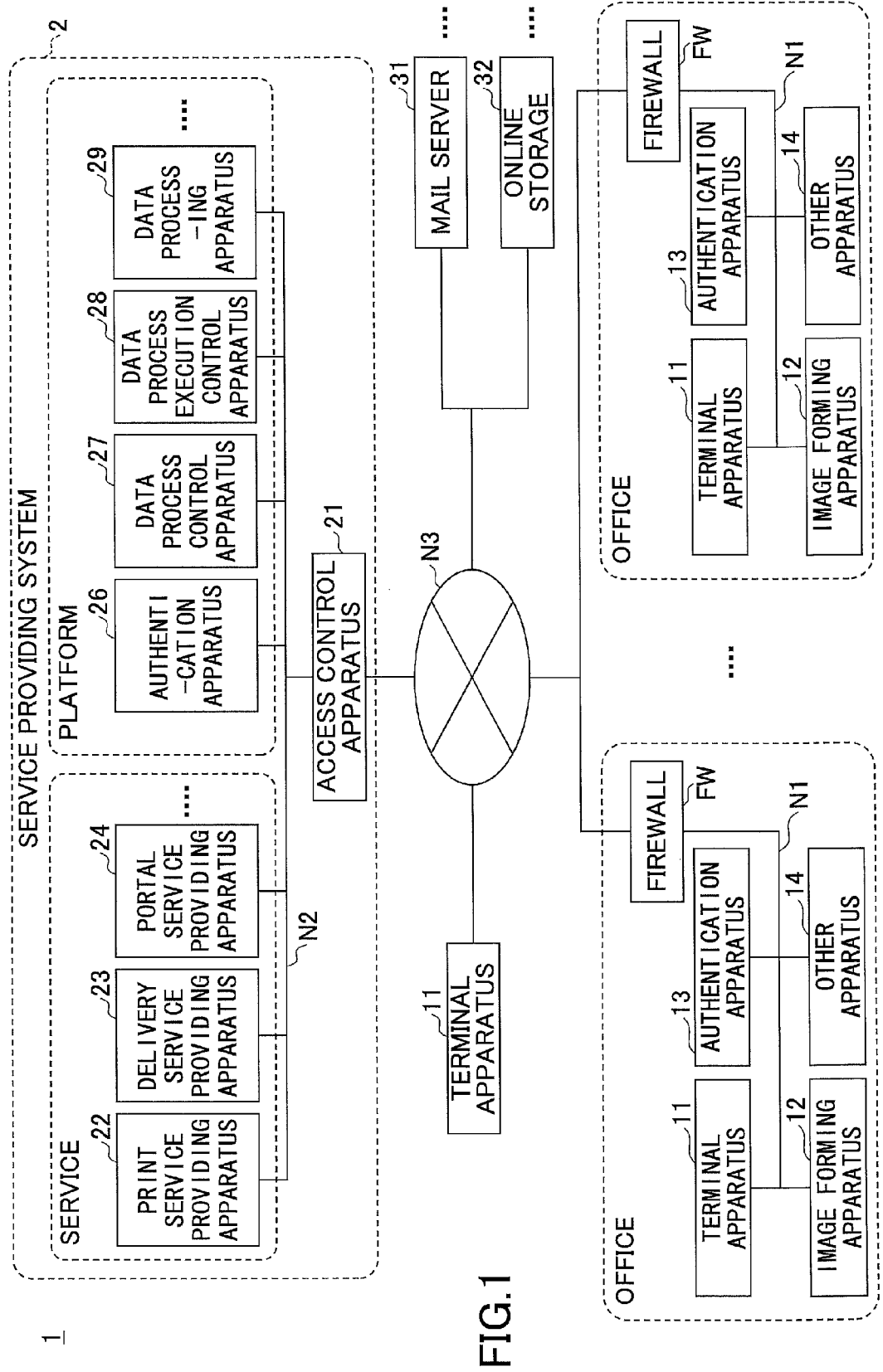
FIG. 1 illustrates an exemplary configuration of an information processing system according to an embodiment of the present invention.

FIG. 1 illustrates an exemplary information processing system according to an embodiment of the present invention. The information processing system 1 illustrated in FIG. 1 includes, for example, a private network N1 in an office, a network N2 of a service providing system 2 represented by a cloud service, and a network N3 such as the Internet. Note that the networks N1-N3 are examples of a network environment.

The private network N1 in the office is arranged behind a firewall FW. The firewall FW is configured to block unauthorized access from an unauthorized source. An access control apparatus 21 is arranged at the network N2. The access control apparatus 21 is configured to restrict access to the network N2.

The network N1 in the office is a private network arranged at the inner side of the firewall FW. A terminal apparatus 11, an image forming apparatus 12, an authentication apparatus 13, and some other apparatus 14 may be connected to the network N1.

The terminal apparatus 11 may be implemented by an information processing apparatus (computer system) having a general OS (operating system) installed therein. The terminal apparatus 11 may be a device operable by a user such as a PC (personal computer), a tablet PC, a notebook PC, a smartphone, or a mobile phone, for example.

The image forming apparatus 12 is a device having an image forming function, such as a MFP (multifunction peripheral), a copier, a scanner, or a laser printer. The authentication apparatus 13 may be implemented by an information processing apparatus (computer system) having a general OS installed therein. The authentication apparatus 13 is configured to provide a user authentication function. The other apparatus 14 may be a device such as a projector or an electronic blackboard, for example.

Note that the terminal apparatus 11, the image forming apparatus 12, the authentication apparatus 13, and the other apparatus 14 have mechanisms for establishing wireless or wired communication. Also, note that although FIG. 1 illustrates an example where one of each of the terminal apparatus 11, the image forming apparatus 12, the authentication apparatus 13, and the other apparatus 14 are provided, there may be a plurality of each of these devices.

The service providing system 2 is a system configured by a service provider that provides a cloud service via the network N3. Note that although the present embodiment relates to an application for a cloud service, the present invention is not limited to the present embodiment but may also be applied to any service that can be provided via the network N3 such as a web service or a service provided by an ASP (application service provider), for example.

The network N2 is connected to the network N3 via the access control apparatus 21. The access control apparatus 21, a print service providing apparatus 22, a delivery service providing apparatus 23, a portal service providing apparatus 24, an authentication apparatus 26, a data process control apparatus 27, a data process execution control apparatus 28, and a data processing apparatus 29 are connected to the network N2.

The print service providing apparatus 22, the delivery service providing apparatus 23, the portal service providing apparatus 24, the authentication apparatus 26, the data process control apparatus 27, the data process execution control apparatus 28, and the data processing apparatus 29 are described in detail below.

The access control apparatus 21 and the other apparatuses such as the print service providing apparatus 22 within the service providing system 2 may be implemented by at least one information processing apparatus. That is, the apparatuses within the service providing system 2 may be implemented by one information processing apparatus or multiple information processing apparatuses.

Note that the apparatuses within the service providing system 2 may be integrated into a single computer, for example. In other words, the number of information processing apparatuses configuring the service providing system 2 is not limited to a particular number.

Also, a part or all of the apparatuses of the service providing system 2 may be implemented in a private network such as the network N1 in the office. The illustrated information processing system 1 of the present embodiment is merely one example. That is, the scope of the present invention is not limited by whether the firewall FW is implemented between the service providing system 2 and apparatuses of the network N1 in the office that are used to gain access to the service providing system 2.

The apparatuses of the service providing system 2 may be roughly categorized into those implementing service providing functions for providing various services and those implementing platform functions to be commonly used upon providing the various services.

Note that the print service providing apparatus 22, the delivery service providing apparatus 23, and the portal service providing apparatus 24 are examples of apparatuses implementing service providing functions for providing various services. The authentication apparatus 26, the data process control apparatus 27, the data process execution control apparatus 28, and the data processing apparatus 29 are examples of apparatuses implementing platform functions to be commonly used upon providing the various services.

Note that the above-described categorization of the apparatuses of the service providing system 2 are for illustrative purposes only. That is, the service providing system 2 does not necessarily have to be configured based on such categorization.

The network N3, corresponding to the Internet, for example, may have the terminal apparatus 11, a mail server 31, and an online storage 32 connected thereto. As illustrated in FIG. 1, the terminal apparatus 11 may be connected to a network other than the private network N1 in the office. The information processing system 1 illustrated in FIG. 1 includes the terminal apparatus 11 that is connected to the private network N1 in the office and the terminal apparatus 11 that is connected to the network N3 such as the Internet.

The mail server 31 performs processes related to email such as transmission and reception of a user email. The online storage 32 performs processes related to rental services of a storage area of a storage. The mail server 31 and the online storage 32 may be implemented by at least one information processing apparatus.

<Hardware Configuration>

Figure 2:
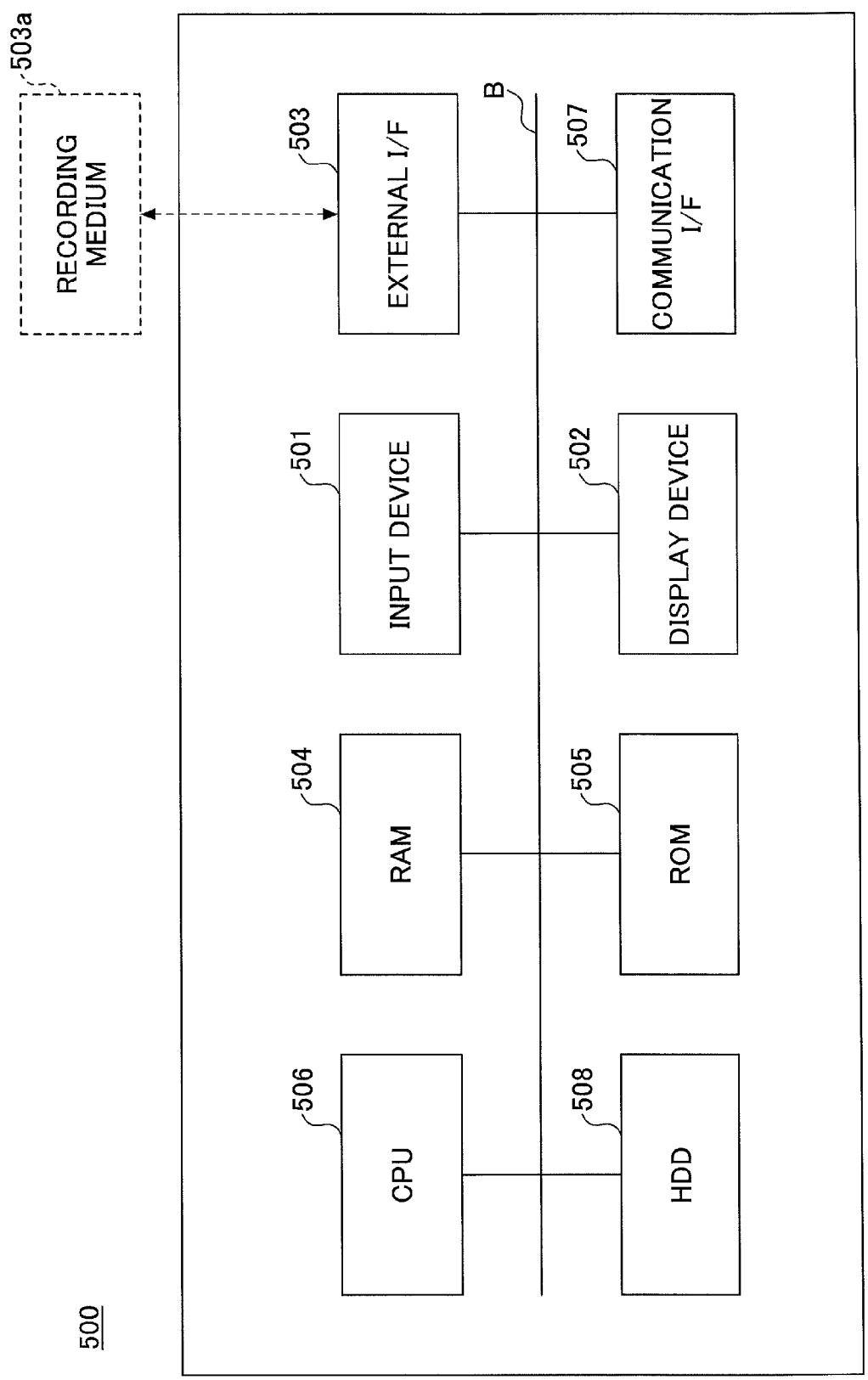
FIG. 2 illustrates an exemplary hardware configuration of a computer system according to an embodiment of the present invention.

The terminal apparatus 11 and the authentication apparatus 13 illustrated in FIG. 1 may be implemented by a computer system having a hardware configuration as illustrated in FIG. 2, for example. Similarly, the apparatuses within the service providing system 2 such as the access control apparatus 21 and the print service providing apparatus 22 as illustrated in FIG. 1 may be implemented by the computer system having the configuration as illustrated in FIG. 2, for example. Similarly, the mail server 31 and the online storage 32 as illustrated in FIG. 1 may be implemented by the computer system having the configuration as illustrated in FIG. 2, for example. FIG. 2 is a block diagram illustrating an exemplary configuration of a computer system according to an embodiment of the present invention.

The computer system 500 illustrated in FIG. 2 includes an input device 501, a display device 502, an external I/F 503, a RAM (Random Access Memory) 504, a ROM (Read-Only Memory) 505, a CPU (Central Processing Unit) 506, a communication I/F 507, and a HDD (Hard Disk Drive) 508, which are interconnected by a bus B.

The input device 501 may include a keyboard, a mouse, and a touch panel, for example, to be used by a user for inputting operation signals. The display device 502 may include a display for displaying processing results obtained by the computer system 500, for example.

The communication I/F 507 is an interface for connecting the computer system 500 to the networks N1 through N3. In this way, the computer system 500 may establish data communication via the communication I/F 507.

The HDD 508 is a nonvolatile storage device storing programs and data. Examples of the stored programs and data include an OS (operating system) corresponding to basic software for controlling the entire computer system 500 and application software for providing various functions in the OS.

The external I/F 503 is an interface between the computer system 500 and an external device. An example of the external device is a recording medium 503*a*. In this way, the computer system 500 can read data from and/or write data in the recording medium 503*a* via the external I/F 503. Examples of the recording medium 503*a* include a flexible disk, a CD (compact disk), a DVD (digital versatile disk), an SD memory card, and a USB memory (universal serial bus memory).

The ROM 505 is a nonvolatile semiconductor memory (storage device) that can hold programs and data even after the power is turned off. The ROM 505 stores programs and data such as BIOS (Basic Input/Output System) that is executed when the computer system 500 is activated, OS settings, and network settings. The RAM 504 is a volatile semiconductor memory (storage device) for temporarily storing programs and data.

The CPU 506 is a processor that controls and executes overall operations and functions of the computer system 500 by loading programs and data from storage devices such as the ROM 505 and the HDD 508 into the RAM 504 and executing relevant processes, for example.

<Software Configuration>
<<Service Providing System>>

Figure 3:
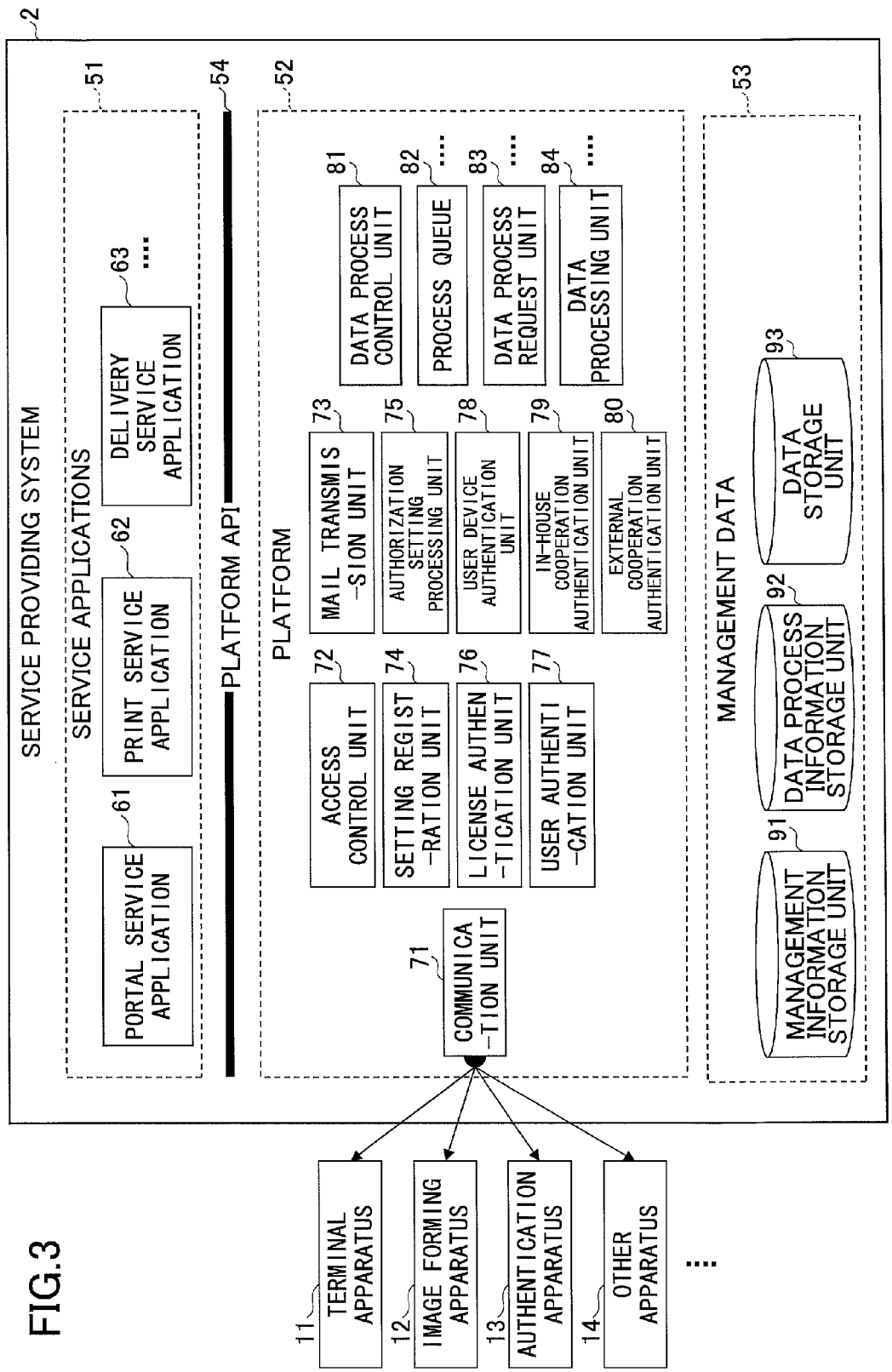
FIG. 3 is a block diagram illustrating an exemplary functional configuration of a service providing system according to an embodiment of the present invention.

FIG. 3 is a block diagram illustrating an exemplary functional configuration of the service providing system 2 according to the present embodiment. The service providing system 2 may execute corresponding programs to implement service applications 51, a platform 52, a management data storage unit 53, and a platform API (application programming interface) 54.

In the example of FIG. 3, the service applications 51 include a portal service application 61, a print service application 62, and a delivery service application 63, for example. The service applications 51 are applications having functions for providing various services.

For example, the portal service application 61 may be implemented in the portal service providing apparatus 24 illustrated in FIG. 1. The print service application 62 may be implemented in the print service providing apparatus 22. The delivery service application 63 may be implemented in the delivery service providing apparatus 23.

The portal service application 61 is configured to provide portal sites for enabling the user to use various services such as a print service or a delivery service. Also, as described below, the portal service application 61 is configured to cooperate with the platform 52 to execute a tenant registration process, a service registration process, and registration processes of various types of management information, for example.

The print service application 62 is configured to provide a print service for implementing printing by the image forming apparatus 12 by storing print data and transmitting the print data to the image forming apparatus 12, for example.

The delivery service application 63 is configured to provide a delivery service for delivering to the online storage 32 of FIG. 1, for example, image data that has been processed and transmitted from a device such as the image forming apparatus 12.

Note that the service applications 51 are not limited to the examples illustrated in FIG. 3. In some embodiments, the service applications 51 may include an application providing a service for transmitting stored image data (projection data) to the other apparatus 14 such as a projector. Also, the service applications 51 may include an application providing a service for transmitting stored image data (projection data) to the other apparatus 14 such as an electronic blackboard. As described above, the service applications 51 include an application providing some type of service to a device used by a user such as the image forming apparatus 12.

The platform API 54 is an interface that enables the service applications 51 to use the platform 52. In other words, the platform API 54 is a predefined interface that enables the platform 52 to receive requests from the service applications 51, and may be implemented by functions or classes. When the service providing system 2 is implemented by (or distributed to) multiple information processing apparatuses, a Web API that is accessible via a network may be used as the platform API 54.

In the example of FIG. 3, the platform 52 includes a communication unit 71, an access control unit 72, a mail transmission unit 73, a setting registration unit 74, an authorization setting process unit 75, a license authentication unit 76, a user authentication unit 77, a user device authentication unit 78, an in-house cooperation authentication unit 79, an external cooperation authentication unit 80, a data process control unit 81, one or more process queues 82, one or more data process request units 83, and one or more data processing units 84.

The communication unit 71 is configured to establish communication with other devices such as the image forming apparatus 12 and may be implemented in the access control apparatus 21 of FIG. 1, for example. The access control unit 72 is configured to perform access control according to various types of access requests made from devices such as the image forming apparatus 12 to the service providing system 2. The access control unit 72 may be implemented in the access control apparatus 21, for example.

The mail transmission unit 73 is configured to transmit mail and may be implemented in the authentication apparatus 26 of FIG. 1, for example. The setting registration unit 74 is configured to set up and register various types of management data to be stored in the management data storage unit 53 and may be implemented in the authentication apparatus 26, for example. The authorization setting unit 75 is configured to execute a process of setting up authorization with respect to an external service such as the online storage 32 and may be implemented in the authentication apparatus 26, for example.

The license authentication unit 76 is configured to perform authentication related to a license based on license information and tenant information (described below) to be stored by the management data storage unit 53. The license authentication unit 76 may be implemented in the authentication apparatus 26, for example. The user authentication unit 77 is configured to perform user authentication based on a login request from a device not requiring device authentication such as the terminal apparatus 11. The user authentication unit 77 may be implemented in the authentication apparatus 26, for example. The user device authentication unit 78 is configured to perform user authentication based on a login request from a device requiring device authentication such as the image forming apparatus 12. The user device authentication unit 78 may be implemented in the authentication apparatus 26, for example.

The in-house cooperation authentication unit 79 is configured to perform user authentication in a case where the user using the image forming apparatus 12, for example, performs authentication by the authentication apparatus 13 of FIG. 1 and attempts to login using a user ID acquired from the authentication apparatus 13. The in-house cooperation authentication unit 79 may be implemented in the authentication apparatus 26, for example. The external cooperation authentication unit 80 is configured to perform an authentication process for logging into the online storage 32 of FIG. 1 and may be implemented in the authentication apparatus 26, for example.

The data process control unit 81 is configured to control a data process that is executed based on a request from the service applications 51 and may be implemented in the data process control apparatus 27, for example. The one or more process queues 82 are message queues corresponding to one or more data process types (specific processes). Request messages related to data processes from the data process control unit 81 are registered in the process queues 82. The process queues 82 may be implemented in the data process control apparatus 27, for example.

The one or more data process request units 83 are configured to monitor the process queues 82 assigned thereto and receive request messages related to data processes from their corresponding process queues 82. The data process request units 83 are configured to send requests to the data processing units 84 to execute data processes corresponding to the received messages. The data process request units 83 may be implemented in the data process execution apparatus 28, for example.

The one or more data processing units 84 are configured to execute data processes according to requests from the data process request units 83 and may be implemented in the data processing apparatus 29, for example. Examples of data processes that may be executed by the data processing units 84 include a division process for dividing up a request from the service applications 51, a data format conversion process for converting a data format, an OCR (optical character recognition) process for executing an ORC process. Further, the data processing units 84 may execute other processes such as an uploading process for uploading data in the online storage 32, for example.

Note that depending on the data process type, the data process request units 83 and the data processing units 84 may be implemented in the data process execution control apparatus 28, for example.

The management data storage unit 53 includes, for example, a management information storage unit 91, a data process information storage unit 92, and a data storage unit 93.

The management information storage unit 91 stores management information such as license information, tenant information, user information, and device information, for example. The management information storage unit 91 may be implemented in the authentication apparatus 26, for example. The data process information storage unit 92 stores information related to requested data processes. The data process information storage unit 92 may be implemented in the data process control apparatus 27, for example. The data storage unit 93 stores data such as application data, print data, and other data, for example. The data storage unit 93 may be implemented in the data process control apparatus 27, for example.

The management data stored in the management data storage unit 53 may include the following information, for example. FIG. 4 is a table illustrating an exemplary data configuration of license information. The license information includes, as data items, "license type", "ID", "registration code", and "registration status". The "license type" is information indicating the type of license. Exemplary types of licenses include tenant, print service, and delivery service licenses. The "ID" is information representing the ID of licenses that may be used for license authentication, for example. The "registration code" is information used upon registering a tenant. The "registration status" is information indicating whether license registration (ID registration) by a user has been completed (i.e. registered or not registered).

FIG. 5 is a table illustrating an exemplary data configuration of tenant information. The tenant information includes, as data items, "tenant ID", "name", "service ID", "service type", "valid term", "external service", "address information", and "region information", for example. The "tenant ID" corresponds to an ID of license information of which the license type is indicated as "tenant". The tenant ID is registered when the user performs a tenant registration process.

The "name" corresponds to a name designated by the user upon performing the tenant registration. For example, a company name or an organization name may be set up as the "name" in the tenant information. The "service ID" corresponds to an ID of license information of which the license type is indicated as "print service", "delivery service", or some other service. The service ID is registered when the user performs a service registration after completing the tenant registration.

The "service type" is information indicating the license type (service type) corresponding to the service ID. The "valid term" indicates the term of validity of the service ID. Note that the term of validity of the service ID is managed based on the time point at which the service ID is registered with a particular apparatus.

The "external service" is information indicating an external service to be used in cooperation with the service providing system 2. The online storage 32 of FIG. 1 may be an exemplary external service that may be used in cooperation with the service providing system 2. The "address information" indicates the email address of the administrator registered in connection with the tenant registration. The "region information" is information indicating the country/region in which the corresponding service is to be used. Note that the online storage 32 is an example of an external service. Examples of information items that may be used in connection with the use of the external service include an account, a password, an authorization token, and scope, which are described below.

Note that authorization refers to setting up the scope of use (authority) of services such as the types of services a user is authorized to use and resources to which the user is permitted to access, for example. For example, authorization may be set up using API authorization standard technology such as OAuth. In this case, from the perspective of using an external service such as the online storage 32 from the service providing system 2, the external service assumes the role of the OAuth service provider and the service providing system 2 assumes the role of the OAuth consumer.

FIG. 6 is a table illustrating an exemplary data configuration of user information. The user information includes, as data items, "tenant ID", "user ID" and "password" for login, "user ID" for in-house authentication, "account", "password", "authorization token", and "scope" for an online storage, and "address information", for example.

The user information manages information of users with respect to each tenant ID. The "user ID" and "password" for login correspond to authentication information to be used for user authentication when the user logs into the service providing system 2. The user ID for login may be a user name or some other information that may be used for identifying the user when the user logs into the service providing system 2. The "user ID" for in-house authentication corresponds to user identification information for identifying the user within the authentication apparatus 13 of the network N1 in the office. The user ID for in-house authentication corresponds to authentication information to be used for user authentication in a case where the user attempts to login using user identification information acquired from the authentication apparatus 13. The user ID for in-house authentication may be any information that may be used to identify a user within the authentication apparatus 13 of the network N1 in the office such as a card ID of an IC card or a terminal ID of a terminal apparatus carried by a user, for example.

The "account" and "password" for an online storage correspond to authentication information to be used upon logging into the online storage 32. The "authorization token" corresponds to information for using the online storage 32 within a specific authority range. The "scope" corresponds to information specifying the scope of use set up by an authorization process.

The "account" for online storage may be a user ID, a user name, an address for online storage, or any other information that may be used as authentication information for authenticating the user when the user logs into the online storage 32. The "address information" corresponds to an email address of the user.

FIG. 7 is a table illustrating an exemplary data configuration of device information. The device information includes, as data items, "tenant ID", "device ID", "service ID", "service type", "start date", and "end date", for example. The device information manages information of devices with respect to each tenant ID.

The "device ID" corresponds to information identifying a device that is used for device authentication. For example, a device serial number may be used as the device ID. The "service ID" and "service type" of the device information may be identical to the "service ID" and "service type" of the tenant information and are registered when a user performs service ID registration with respect to a specific device.

The "start date" corresponds to information indicating the date on which the service ID registration has been performed. The "end date" corresponds to information indicating the date on which the validity of the registered service ID is to expire. The device registered with the device information can use the service identified by the registered service ID from the start date of the service ID to the end date of the service ID.

Note that depending on the service type and license type, some services may be valid for an unlimited duration (have no substantial restrictions on the term of validity), for example. Also, it is assumed below that a device that does not have its device information registered may still be able to use functions provided by the service providing system 2 except for the services (functions) that require device authentication before they can be used.

Note that in the present embodiment, the terminal 11 is illustrated as an example of a device that does not need to have its device information registered, and the image forming apparatus 12 is illustrated as an example of a device that needs to have its device information registered.

Examples of functions that may be used at the terminal apparatus 11 include setting and registration of management data, submission of print data, and deletion. Examples of functions that may be used at the image forming apparatus 12 include acquisition of print data and transmission of delivery data.

Note that functions that require device authentication before they can be used and functions that can be used without device authentication may be arbitrarily determined by the service provider providing the functions. That is, the service provider may provide services that do not require device authentication.

FIG. 8 is a table illustrating an exemplary data configuration of external service information. The external service information includes, as data items, "external service ID", "service name", "client ID", "client secret", "product name", "scope", "authorization destination URL" and "redirect destination URL", for example. The "external service ID" corresponds to information identifying an external service.

The "service name" corresponds to the name of an external service. The "client ID" corresponds to information issued by an external service for identifying the service providing system 2. The "client secret" corresponds to secret information for ensuring the authenticity of the client ID that may be handled like a password, for example. The "product name" corresponds to information for identifying the service applications 51. The "scope" corresponds to information specifying the scope of use for an external service. The "authorization destination URL" represents a URL of an authorization system of an external service (e.g. URL of an authorization server of the external service). The "redirect destination URL" represents a URL of the service providing system 2 to which the external service is redirected (e.g. URL of a function as an authorization client of the authorization setting process unit 75).

As can be appreciated from the above, the tenant ID is associated with services provided by the service providing system 2, users using the services, and devices that use the services. The tenant ID corresponds to information for managing users, services and devices within the service providing system 2. Also, the tenant ID corresponds to information for identifying a target (target identification information) such as a specific service to be used, a specific user that is to use the service, and a specific device to which the service is to be provided, for example.

<Process Details>

In the following, process operations of the information processing system 1 according to the present embodiment are described.

<<Process from Tenant Registration to Service Registration>>

Figure 9:
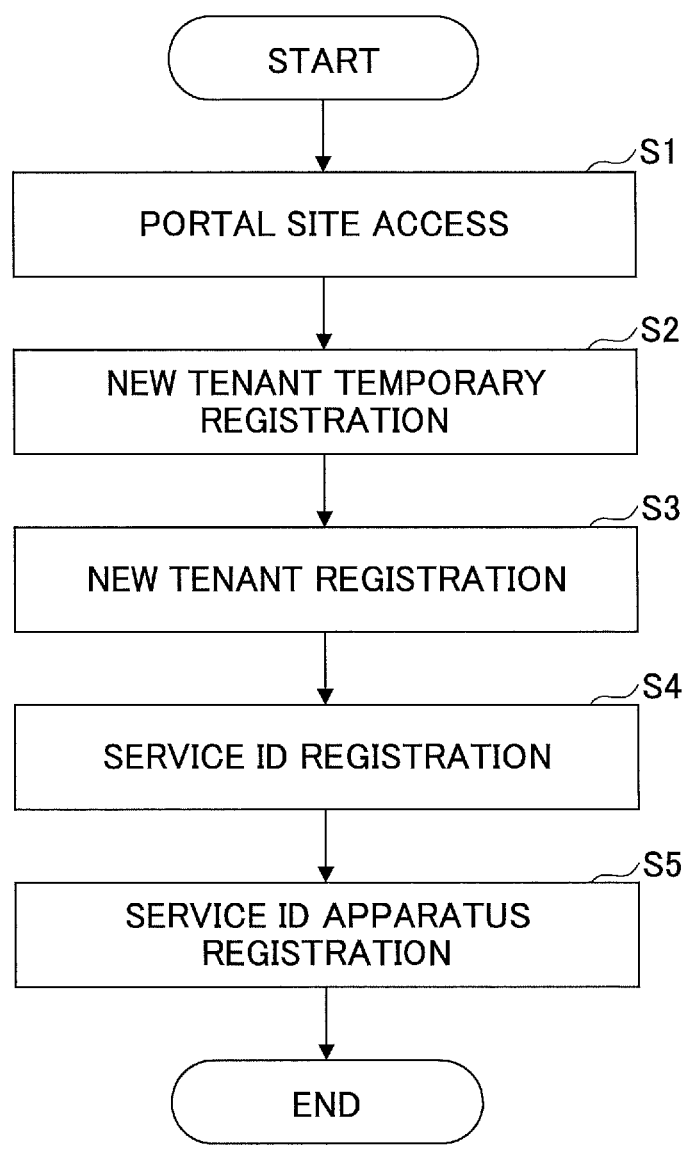
FIG. 9 is a flowchart illustrating exemplary process steps from tenant registration to service registration.

FIG. 9 is a flowchart illustrating exemplary process steps from tenant registration to service registration. First, a user wishing to perform tenant registration (e.g. administrator of a company or an organization) acquires a tenant ID and a registration code from the service provider of the service providing system 2 (e.g. salesperson in charge of providing service).

Exemplary methods of acquiring the tenant ID and registration code include acquiring the information directly from the service provider, or accessing a dedicated site operated by the service provider from the terminal apparatus 11 of the user.

In step S1, the user operates the input device 501 of the terminal apparatus 11 so that the terminal apparatus 11 may access a portal site of the service providing system 2. Based on the user operation, the terminal apparatus 11 accesses the portal service of the service providing system 2.

Because the terminal apparatus 11 is accessing the portal site, the access control apparatus 72 of the service providing system 2 enables access from the terminal apparatus 11 to the portal service application 61.

The portal service application 61 prompts the display device 502 of the terminal apparatus 11 to display a top screen. The user may operate the input device 501 of the terminal apparatus 11 and select to make a login request or a new tenant registration request. In the following descriptions, it is assumed that the new tenant registration request has been selected by the user. Note that if the user is registered in the user information (as an administrator or other user) of the management information storage unit 91, the user may also select to make a login request by inputting a tenant ID, a user ID, and a password, for example.

When the new tenant registration request is made, in step S2, the portal service application 61 of the service providing system 2 prompts the display device 502 of the terminal apparatus 11 to display an input screen for enabling temporary registration of a tenant ID. The user operates the input device 501 of the terminal apparatus 11 to enter information for the tenant ID temporary registration and issues a temporary registration request. Based on the user operation, the terminal apparatus 11 sends the temporary registration request to the portal site of the service providing system 2.

Note that information that needs to be entered to complete the tenant ID temporary registration may include information on the country/region where services are to be used (region information) and information indicating consent to the terms of service corresponding to the country/region where the services are to be used, for example. The information to be entered for the tenant ID temporary registration may also include information items such as the tenant ID, the registration code, an email address, and a language, for example.

The service providing system 2 stores terms of service information corresponding to the country/region where the services may to be used. The portal service application 61 of the service providing system 2 controls the display device 502 of the terminal apparatus 11 to display the terms of service corresponding to the country/region entered by the user in connection with the tenant ID temporary registration and prompts the user to select whether the user agrees with the terms of service.

Figure 10:
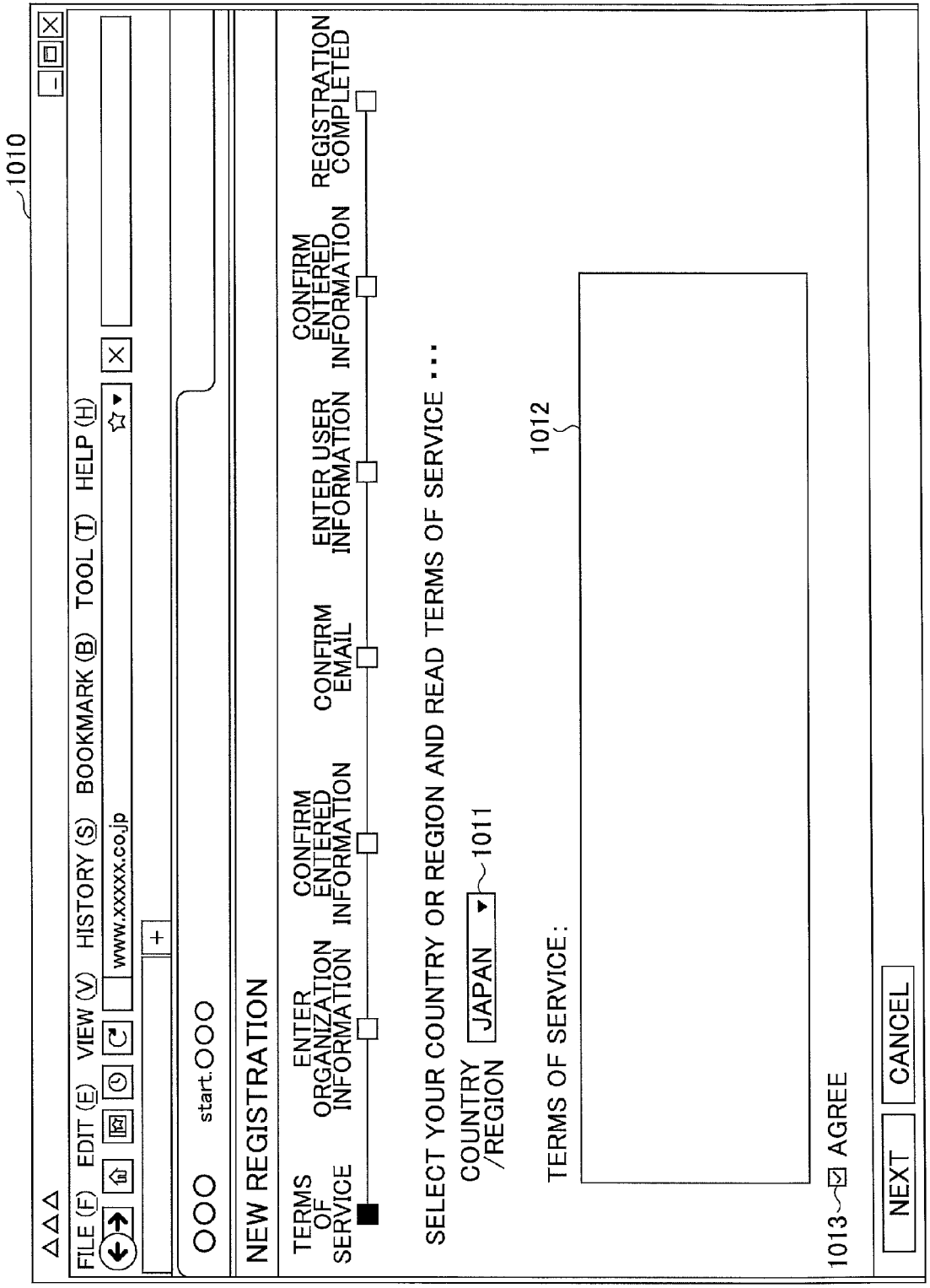
FIG. 10 illustrates an exemplary image of a terms of service screen.

FIG. 10 illustrates an exemplary image including of a terms of service screen. The terms of service screen 1010 includes a selection field 1011 for selecting a country/region where services are to be used, a terms of service field 1012 displaying the terms of service corresponding to the country/region selected in the selection field 1011, and a check box 1013 for enabling the user to select whether to agree to the terms of the service.

When the temporary registration request is issued from the terminal apparatus 11 of the user, the portal service application 61 of the service providing system 2 issues a request to the license authentication unit 76 to perform a confirmation process for confirming the validity of the tenant ID and the registration code included in the information entered in connection with the tenant ID temporary registration. Upon receiving such a request, the license authentication unit 76 executes a license authentication process, and determines whether the tenant ID and registration code designated in the request for the confirmation process are stored in the license information of FIG. 4 stored by the management information storage unit 91.

If the tenant ID and registration code designated in the request for the confirmation process are stored in the license information, the license authentication unit 76 determines whether the registration status associated with the relevant tenant ID and registration code is "not registered".

If the registration status is "not registered", the license authentication unit 76 determines that the tenant ID and registration code designated in the request for the confirmation process are valid information and thereby authenticates the tenant ID (license). The license authentication unit 76 notifies the portal service application 61 of the license authentication result.

In the case where the tenant ID and the registration code are valid information, the portal service application 61 issues a request to the setting registration unit 74 to register the tenant ID, the email address, and the region information included in the information entered in connection with the tenant ID temporary registration. In turn, the setting registration unit 74 registers the tenant ID, the email address, and the region information in the tenant information of the management information storage unit 91 according to the request from the portal service application 61.

Once the above information is registered by the setting registration unit 74, in step S2, the portal service application 61 generates a registration URL corresponding to an access destination for displaying a screen for proper registration and generates an email indicating the registration URL. The portal service application 61 then issues a request to the mail transmission unit 73 to send the generated email. In turn, the mail transmission unit 73 sends the email to the email address included in the information entered in connection with the tenant ID temporary registration.

When the email is sent by the mail transmission unit 73, the portal service application 61 prompts the display device 502 of the terminal apparatus 11 to display a notification screen indicating that the email has been sent. Note that the registration URL may be managed based on its term of validity (e.g. one hour) from the time it is generated, for example. Also, for security purposes, at least one of the tenant ID and the registration code may be omitted in the email sent from the mail transmission unit 73.

Next, the user operates the input device 501 of the terminal apparatus 11 to access the registration URL indicated in the email received from the mail transmission unit 73. Based on the user operation, the terminal apparatus 11 accesses the registration URL. Note that the terminal apparatus 11 that accesses the registration URL does not necessarily have to be the same terminal apparatus 11 used to request for the temporary registration. The access control unit 72 of the service providing system 2 prompts the terminal apparatus 11 to access the portal service application 61.

The portal service application 61 verifies whether the access to the registration URL is valid (i.e. whether access is made to the generated registration URL and whether access is made within the term of validity). If the access is valid, the portal service application 61 prompts the display device 502 of the terminal apparatus 11 to display a registration screen.

The user operates the input device 501 of the terminal apparatus 11, enters information for completing proper tenant ID registration, and issues a registration request. Note that the information to be entered in the registration screen may include tenant information such as the tenant ID, name, and registration code; and user information such as a user ID and password for login and address information, for example. Also, note that at least one of the tenant ID and registration code already entered by the user during the temporary registration may be pre-entered and displayed on the registration screen, for example. However, as described, for security purposes, at least one of the tenant ID and the registration code entered by the user is not indicated in the email notifying the registration URL.

When the registration request is issued from the terminal apparatus 11, the portal service application 61 issues a request to the license authentication unit 76 to perform a license validation process (registration process) based on the tenant ID and the registration code entered in the registration screen.

Upon receiving such a request, the license authentication unit 76 executes a license authentication process, and determines whether the tenant ID and the registration code entered in the registration screen are stored in the license information managed by the management information storage unit 91. If the tenant ID and the registration code entered in the registration screen are stored in the license information and the registration status stored in association with the above tenant ID and registration code is "not registered", the license authentication unit 76 determines that the entered tenant ID and registration code are valid information.

Upon determining the validity of the entered tenant ID and registration code, the license authentication unit 76 issues a request to the setting registration unit 74 to change the license information. In turn, the setting registration unit 74 changes the value of the registration status associated with the validated tenant ID and registration code in the license information stored by the management information storage unit 91 to "registered".

After the license validation process is completed, the portal service application 61 issues a request to the setting registration unit 74 to register the tenant information and the user information entered in the registration screen at the terminal apparatus 11 by the user. In turn, the setting registration unit 74 registers the tenant name entered as part of the tenant information in the tenant information stored by the management information storage unit 91. Also, the setting registration unit 74 registers information items such as the tenant ID, the user ID and password for login, and the address information in the user information stored by the management information storage unit 91.

After setting registration of various items of information by the setting registration unit 74 is completed, the portal service application 61 prompts the display device 502 of the terminal apparatus 11 to display a tenant registration completion screen. Also, the portal service application 61 generates an email for notifying the completion of the tenant registration and issues a request to the mail transmission unit 73 to send the generated email. In turn, the mail transmission unit 73 sends the email notifying the completion of the tenant registration to the email address entered at the terminal apparatus 11 in connection with the tenant ID temporary registration (address information registered in the tenant information).

For example, the user may check the tenant registration completion screen displayed by the display device 502 of the terminal apparatus 11. By completing registration of the tenant ID, user ID, and password, from the next time, the user may make a login request from the top screen of the portal site. By logging in from the top screen of the portal site, the user may perform registration processes for registering tenant information, user information, and device information associated with the tenant ID.

In step S4, the user such as an administrator operates the input device 501 of the terminal apparatus 11 to enter the tenant ID, user ID, and password from the top screen of the portal site, and makes a login request.

Upon receiving the login request, the portal service application 61 issues a request to the user authentication unit 77 to perform user authentication. The user authentication unit 77 determines whether the combination of the tenant ID, user ID, and password received from the terminal apparatus 11 is stored in the user information managed by the management information storage unit 91.

If the combination of the tenant ID, user ID, and password received from the terminal apparatus 11 is stored in the user information, the user authentication unit 77 authenticates the user that has made the login request. Once the user is authenticated by the user authentication unit 77, the portal service application 61 allows the user to login.

The user that has logged into the portal service application 61 is able to register the service ID of a service the user wishes to use. The portal service application 61 prompts the display device 502 of the terminal apparatus 11 to display a service registration screen for enabling the user to register a service ID. The user operates the input device 501 of the terminal apparatus 11, enters a service ID from the service registration screen displayed by the display device 502 of the terminal apparatus 11, and issues a service registration request. Based on the user operation, the terminal apparatus 11 issues the service registration request to the portal service application 61.

When the service registration request is issued from the terminal apparatus 11, the portal service application 61 refers to the license information stored by the management information storage unit 91 and selects an ID matching the service ID entered by the user from the service registration screen. The portal service application 61 acquires the license type (service type) associated with the selected ID.

Also, the portal service application 61 refers to the tenant information stored by the management information storage unit 91 and acquires region information associated with the tenant ID of the logged in user. The portal service application 61 prompts the display device 502 of the terminal apparatus 11 to display the terms of service corresponding to the acquired license type and region information, and prompts the user to select whether the user agrees with the terms of service.

Thus, the service providing system 2 stores terms of service information corresponding to each service type (license type) and each country/region where the services may be used. In this way, the portal service application 61 may control the display of the terms of service according to the region information entered by the user in connection with the tenant ID temporary registration and the service type of the service designated in the service registration request, and prompt the user to select whether the user agrees to the relevant terms of service.

The user operates the input device 501 of the terminal apparatus 11 to select to agree to the terms of service. If the user selects to agree to the terms of service, the portal service application 61 issues a request to the license authentication unit 76 to perform a service registration process based on the tenant ID of the logged in user and the service ID entered by the logged in user from the service registration screen.

The license authentication unit 76 determines whether the service ID entered from the service registration screen is stored as an ID in the license information managed by the management information storage unit 91. If the service ID entered from the service registration screen is stored as an ID in the license information, the license authentication unit 76 determines that the entered service ID is valid (authenticates the service ID). Upon determining the validity of the service ID, the license authentication unit 76 issues a request to the setting registration unit 74 to register the service ID. In turn, the setting registration unit 74 registers the service ID and service type in association with the tenant ID of the logged in user in the tenant information managed by the management information storage unit 91.

In step S5, the user such as an administrator performs a device registration for a service ID. The user operates the input device 501 of the terminal apparatus 11 to prompt the display device 502 of the terminal apparatus 11 to display a device registration screen. The user operates the input device 501 of the terminal apparatus 11 to enter a service ID and a device ID of the device that may be able to use the service by the service ID, and issue a service ID device registration request.

When the service ID device registration request is issued from the terminal apparatus 11, the portal service application 61 issues a request to the license authentication unit 76 to perform a service ID device registration process based on the tenant ID of the logged in user and the service ID and device ID entered from the device registration screen.

The license authentication unit 76 determines whether the combination of the tenant ID of the logged in user and the service ID entered from the service registration screen is stored in the tenant information managed by the management information storage unit 91.

If the combination of the tenant ID of the logged in user and the service ID entered from the device registration screen is stored in the tenant information, the license authentication unit 76 refers to the license information stored by the management information storage unit 91. The license authentication unit 76 determines whether the registration status associated with the service ID entered from the device registration screen is "not registered".

If the registration status is "not registered", the license authentication unit 76 issues a request to the setting registration unit 74 to perform device registration for the service ID. Note that a service ID with the registration status "not registered" corresponds to a service ID for which a device registration has not yet been performed. The setting registration unit 74 registers the tenant ID of the logged in user and the service ID and device ID entered from the device registration screen in the device information stored by the management information storage unit 91. Also, the setting registration unit 74 refers to the tenant information stored by the management information storage unit 91, and acquires the service type and valid term associated with the tenant ID and service ID. The setting registration unit 74 registers the service type, the start date, and the end data in the device information stored by the management information storage unit 91 based on the acquired service type and valid term information.

Note that the execution date of the service ID device registration is stored as the start date. The date of expiry of the service ID calculated based on the valid term (e.g. 1 year) acquired from the tenant information and the start date is stored as the end date. However, in some embodiments, the start date may be designated in the service registration request of step S4, for example. In the case where the start date can be designated, the date designated as the start date in the service registration request is stored as the start date of the device information. When the service ID device registration is completed, the setting registration unit 74 changes the registration status associated with the service ID for which the device registration was performed to "registered" in the license information stored by the management information storage unit 91.

By implementing the process steps from tenant registration to device registration as described above, the user such as an administrator may perform tenant registration, service ID registration, and service ID device registration by accessing the service providing system 2 from the terminal apparatus 11. Accordingly, the user may easily complete necessary procedures for receiving services from a service provider. Also, the service providing system 2 may manage information on the services to be provided, the users that are to use the services, and the devices that are to use the services with respect to each tenant ID that has been subject to a license validation process.

<<User Authentication/Device Authentication Function of Service Providing System>>

Figure 11:
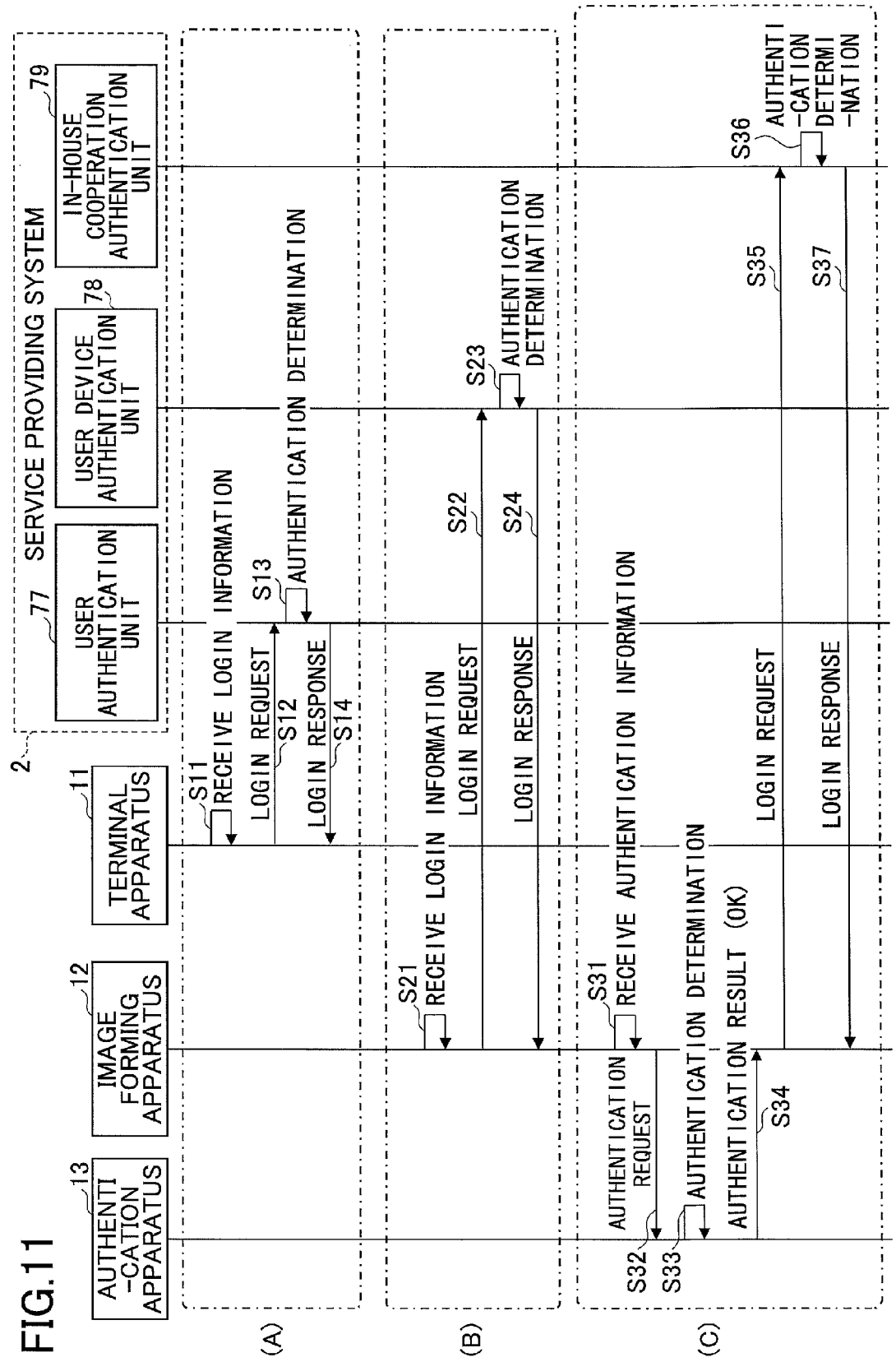
FIG. 11 is a sequence chart illustrating an exemplary user authentication/device authentication process.

FIG. 11 is a sequence chart illustrating exemplary user authentication/device authentication processes. FIG. 11 (A) illustrates user authentication from the terminal apparatus 11 that does not require device authentication. FIG. 11 (B) illustrates user authentication from the image forming apparatus 12 that requires device authentication. FIG. 11 (C) illustrates in-house cooperation authentication from the image forming apparatus 12 that requires device authentication.

As illustrated in FIG. 11 (A), when performing user authentication from the terminal apparatus 11, the user enters a tenant ID, a user ID, and a password as login information from a top screen of a portal site, for example. In step S11, the terminal apparatus 11 receives the login information entered by the user.

In step S12, the terminal apparatus 11 issues a login request to the service providing system 2 using the login information entered by the user. The access control unit 72 of the service providing system 2 issues a request to the user authentication unit 77 to perform user authentication.

In step S13, the user authentication unit 77 determines whether the login information received from the terminal apparatus 11 is included in the user information stored by the management information storage unit 91. If the login information received from the terminal apparatus 11 is included in the user information stored by the management information storage unit 91, the user authentication unit 77 determines that the user authentication has been successful. If the login information received from the terminal apparatus 11 is not included in the user information stored by the management information storage unit 91, the user authentication unit 77 determines that the user authentication has been unsuccessful.

In the case where the user authentication has been successful, the access control unit 72 allows login from the terminal apparatus 11 to the service providing system 2 (login for using a service). In step S14, the access control unit 72 sends a login response based on the result of the user authentication by the user authentication unit 77 to the terminal apparatus 11.

Referring to FIG. 11 (B) and FIG. 11 (C), in user authentication for logging into the service providing system 2 from the image forming apparatus 12, a user ID and a password for login may be used or a user ID for in-house authentication may be used. The image forming apparatus 12 may store settings for using the user ID and password for login and settings for using the user ID for in-house authentication. The settings for user authentication may be changed as desired. Also, the image forming apparatus 12 has a tenant ID and a device ID stored in its own storage area.

In the case where the user ID and password for login are used, the image forming apparatus 12 performs user device authentication as illustrated in FIG. 11 (B) in order to log into the service providing system 2.

In step S21, the image forming apparatus 12 displays an input screen for prompting the user to enter a user ID and a password for login. The user enters a user ID and a password for login from the input screen displayed at the image forming apparatus 12. In turn, the image forming apparatus 12 receives the user ID and password for login entered by the user.

In step S22, the image forming apparatus 12 sends the user ID and password for login entered by the user and the tenant ID and the device ID stored in its own storage area to the service providing system 2 as login information, and issues a login request. The access control unit 72 of the service providing system 2 issues a request to the user device authentication unit 78 to perform user device authentication.

In step S23, the user device authentication unit 78 determines whether the combination of the tenant ID and the device ID included in the login information received from the image forming apparatus 12 is included in the device information stored by the management information storage unit 91. If the combination of the tenant ID and the device ID included in the login information received from the image forming apparatus 12 is included in the device information stored by the management information storage unit 91, the user device authentication unit 78 determines that the device authentication has been successful. If the combination of the tenant ID and the device ID included in the login information received from the image forming apparatus 12 is not included in the device information stored by the management information storage unit 91, the user device authentication unit 78 determines that the device authentication has been unsuccessful.

Further, the user device authentication unit 78 determines whether the combination of the user ID and password for login included in the login information received from the image forming apparatus 12 is included in the user information stored by the management information storage unit 91. If the combination of the user ID and password for login included in the login information received from the image forming apparatus 12 is included in the user information stored by the management information storage unit 91, the user device authentication unit 78 determines that the user authentication has been successful. If the combination of the user ID and password for login included in the login information received from the image forming apparatus 12 is not included in the user information stored by the management information storage unit 91, the user device authentication unit 78 determines that the user authentication has been unsuccessful.

When the device authentication and the user authentication are successful, the access control unit 72 allows login from the image forming apparatus 12 to the service providing system 2 (login for using service). In step S24, the access control unit 72 sends a login response to the image forming apparatus 12 based on the results of the device authentication and the user authentication by the user device authentication unit 78.

In the case of using the user ID for in-house authentication, the image forming apparatus 12 performs in-house cooperation authentication as illustrated in FIG. 11 (C) in order to log into the service providing system 2. First, the user performs user authentication at the image forming apparatus 12. The user authentication performed at the image forming apparatus 12 may correspond to user authentication for using the image forming apparatus 12 or user authentication for using a certain function of the image forming apparatus 12. In the following, an exemplary case is described in which the authentication apparatus 13 performs user authentication using a card ID stored in a card such as an IC card carried by the user.

In step S31, the user prompts a card reader (not shown) connected to the image forming apparatus 12 to read the card ID and performs user authentication. In step S32, the image forming apparatus 12 sends the card ID read by the card reader to the authentication apparatus 13 and performs user authentication.

In step S33, the authentication apparatus 13 performs authentication determination using the card ID received from the image forming apparatus 12. The authentication apparatus 13 stores in its storage area user authentication information associating a card ID with a corresponding user ID. The authentication apparatus 13 refers to the user authentication information associating a card ID with a user ID to determine whether a user ID associated with the card ID received from the image forming apparatus 12 may be identified.

In the case where a user ID associated with the card ID could be identified, the authentication apparatus 13 determines that the user authentication has been successful. In step S34, the authentication apparatus 13 sends the authentication result (successful authentication result) together with the identified user ID to the image forming apparatus 12.

Next, the user may make a login request by selecting login to the service providing system 2 from a display screen of the image forming apparatus 12, for example. In step S35, the user makes a login request to log into the service providing system 2 from the image forming apparatus 12.

When the login request from the user to the service providing system 2 is made, the image forming apparatus 12 sends the identified user ID and the tenant ID and device ID stored in its own storage area as login information to the service providing system 2, and issues a login request. The access control unit 72 of the service providing system 2 issues a request to the in-house cooperation authentication unit 79 to perform in-house cooperation authentication.

In step S36, the in-house cooperation authentication unit 79 determines whether the combination of the tenant ID and device ID included in the login information received from the image forming apparatus 12 is included in the device information stored by the management information storage unit 91.

If the combination of the tenant ID and device ID included in the login information received from the image forming apparatus 12 is included in the device information, the in-house cooperation authentication unit 79 determines that the device authentication has been successful. If the combination of the tenant ID and device ID included in the login information received from the image forming apparatus 12 is not included in the device information, the in-house cooperation authentication unit 79 determines that the device authentication has been unsuccessful.

Further the in-house cooperation authentication unit 79 determines whether the combination of the tenant ID and the user ID for in-house authentication included in the login information received from the image forming apparatus 12 is included in the user information stored by the management information storage unit 91. If the combination of the tenant ID and the user ID for in-house authentication included in the login information received from the image forming apparatus 12 is included in the user information stored by the management information storage unit 91, the in-house cooperation authentication unit 79 determines that the device authentication has been successful.

If the combination of the tenant ID and the user ID for in-house authentication included in the login information received from the image forming apparatus 12 is not included in the user information stored by the management information storage unit 91, the in-house cooperation authentication unit 79 determines that the device authentication has been unsuccessful.

When the device authentication and the user authentication are successful, the access control unit 72 allows login from the image forming apparatus 12 to the service providing system 2 (login for using service). In step S37, the access control unit 72 sends a login response to the image forming apparatus 12 based on the results of the device authentication and the user authentication by the in-house cooperation authentication unit 79.

Note that in the case where the device authentication by the in-house cooperation authentication unit 79 has been successful but the user authentication has been unsuccessful, the service providing system 2 may prompt the image forming apparatus 12 to display an input screen for prompting the user to enter a user ID and password for login, for example.

In this case, the user may enter a user ID and a password for login from the input screen and make a login request once more. The image forming apparatus 12 may send the user ID and password for login entered by the user and the tenant ID and device ID stored in its own storage area as login information to the user device authentication unit 78 of the service providing system 2, and issue login request.

The user device authentication unit 78 determines whether the combination of the tenant ID and the user ID and password for login received from the image forming apparatus 12 are included in the user information stored by the management information storage unit 91.

If the combination of the tenant ID and the user ID and password for login received from the image forming apparatus 12 are included in the user information, the user device authentication unit 78 determines that the user authentication has been successful. In turn, the access control unit 72 allows login from the image forming apparatus 12 to the service providing system 2.

Further, the setting registration unit 74 registers the user ID for in-house authentication received from the image forming apparatus 12 in association with the tenant ID and the user ID and password for login received from the image forming apparatus 12 in the user information stored by the management information storage unit 91. By registering the user ID for in-house authentication received from the image forming apparatus 12 in association with the tenant ID and the user ID and password for login received from the image forming apparatus 12 as described above, from the next time, the user may be able to use the user ID for in-house authentication to login.

<<Data Processing Function of Service Providing System>>

In the service providing system 2, the data process control unit 81, the process queues 82, the data process request units 83, and the data processing units 84 may execute various data processes requested by a process request unit 101 of the service applications 51 in the following manner.

Figure 12:
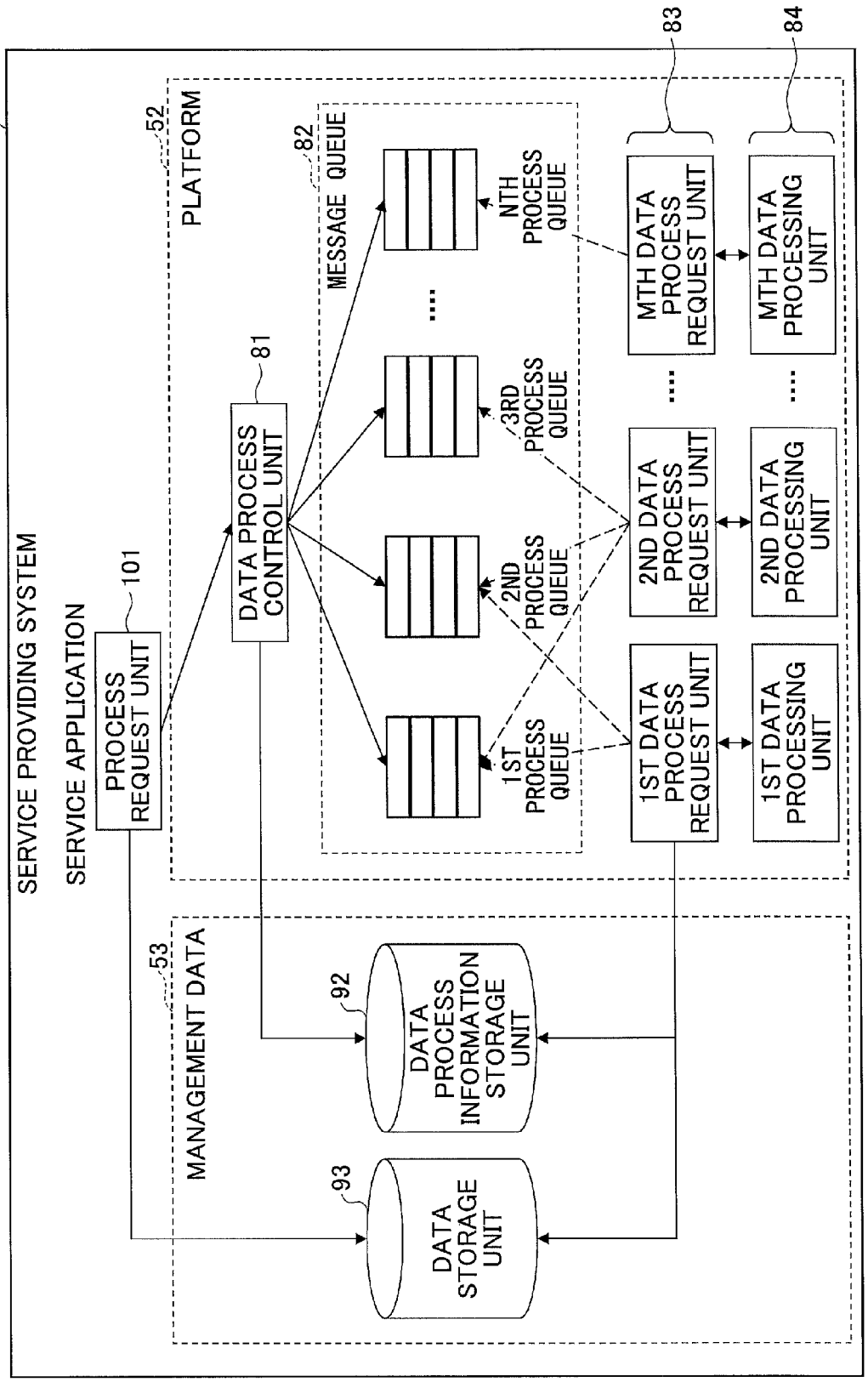
FIG. 12 illustrates an exemplary data processing function of the service providing system.

FIG. 12 illustrates an exemplary data processing function of the service providing system 2. The process request unit 101 of the service applications stores data to be processes in the data storage unit 93 of the management data storage unit 53. The processing data may be application data or image data subject to a data process, for example.

Also, the process request unit 101 transmits a data process request (referred to as "request" hereinafter) to the data process control unit 81 of the platform 52. The request to be transmitted includes the specific process of the data process and storage destination information (e.g. URL) for the processing data.

The data process control unit 81 analyzes the request received from the process request unit 101 and registers a message in the process queue (message queue) 82 according to the specific process of the data process. Note that the process queue 82 is provided for each specific process.

Also, the data process control unit 81 registers request information in the data process information storage unit 92 of the management data storage unit 53. The request information may include information items such as the storage destination of the processing data, the specific process of the data process, and the status of the request, for example.

The status of the request may include statuses such as "received", "executing", and "completed", for example. The status of the request indicates the progress of the data process. The status of the request may be set to "received" at the time the data process control unit 81 registers the request information.

The data process request units 83 monitors the one or more process queues 82 to which they are assigned. That is, the data process request units 83 monitor requests for specific processes of one or more data processes. The data process request units 83 acquire the messages that are registered in the process queues 82 they monitor.

For example, in FIG. 12, a first data process request unit 83 monitors a first process queue 82 and a second process queue corresponding to specific processes that differ from each other. Also, a second data process request unit 83 monitors first through third process queues 82 corresponding to specific processes that differ from one another. FIG. 12 illustrates an exemplary case in which the first data process request unit 83 and the second data process request unit 83 both monitor the first process queue 82 and the second process queue 82.

Note that the assignment of the process queues 82 to be monitored by the data process request units 83 may be arbitrarily set up and changed as desired. For example, the assignment of the process queues 82 to be monitored by the data process request units 83 may be set up and changed according to the frequency of the requests for the various specific processes of the data processes and the processing time.

The data process request units 83 acquire request information from the data process information storage unit 92 based on the messages acquired from the process queues 82 they monitor. The data process request units 83 prompt the data processing units 84 to execute the data processes of requests based on the storage destination of the processing data and the specific processes of the data processes included in the acquired request information.

Next, the data process request units 83 update the request information based on the execution results of the data processes executed by the data processing units 84 and registers the updated request information in the data process information storage unit 92. Updating the request information may include deleting the specific processes of the data processes that have been executed based on the requests, and changing the status of the requests, for example. Also, if request information of a data process calls for execution of a next specific process, for example, the data process request unit 83 registers a message in the process queue 82 corresponding to the specific process of the data process.

Note that when the processing data changes as a result of having the data processing unit 84 execute the data process of a request, the data process request unit 83 registers the changed processing data after processing in the data storage unit 93. Also, the data process request unit 83 updates the request information according to information on the storage destination of the changed processing data after processing.

Figure 13:
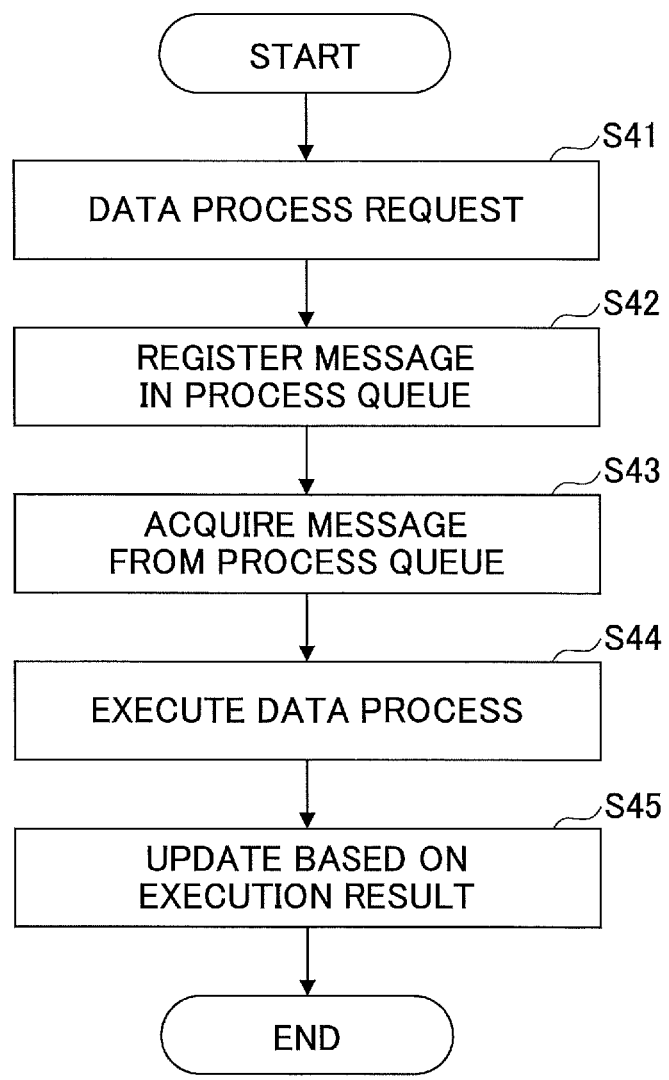
FIG. 13 is a flowchart illustrating exemplary process steps of the data processing function of the service providing system.

FIG. 13 is a flowchart illustrating exemplary process steps of a data processing function of the service providing system 2. In step S41, the process request unit 101 of the service applications 51 stores processing data in the data storage unit 93 of the management data storage unit 53. Also, the process request unit 101 transmits a request (data process request) to the data process control unit 81 of the platform 52.

In step S42, the data process control unit 81 analyzes the request and registers a message in the process queue 82 that corresponds to the specific process of the data process called by the request. Also, the data process control unit 81 registers the request information in the data process information storage unit 92 of the management data storage unit 53.

In step S43, the data process request units 83 acquire the messages registered in the process queues 82 from the process queues 82 they monitor. In step S44, the data process request units 83 acquire request information from the data process information storage unit 92 based on the acquired message. Then, the data process request units 83 prompts the data processing units 84 to execute the data processes of the requests based on the acquired request information.

In step S45, the data process request units 83 update the request information based on the execution results of the data processes executed by the data processing units 84, register the updated request information in the data process information storage unit 92, and ends the process of FIG. 13.

Note that if the request information includes a specific process of a next data process to be executed, the data process request units 83 registers a message in the process queue 82 corresponding to the specific process of the data process, and ends the process of FIG. 13 thereafter.

In the following, examples of specific processes of data processes are illustrated. However the present invention is not limited to these examples. As a first example, the specific process of the data process may be a data format conversion process for converting the data format of processing data.

For example, the data format conversion process for converting the data format of processing data may include a data process for converting image data into PDF (portable document format) data. In the following descriptions, the specific process of the data process for converting image data into PDF data may be referred to as "image2pdf".

Also, the data format conversion process for converting the data format of processing data may include a data process for converting PDF data into PDL (page description language) data. In the following descriptions, the specific process of the data process for converting PDF data into PDL data may be referred to as "pdf2pdl".

Further, the data format conversion process for converting the data format of processing data may include a data process for converting Microsoft Office (registered trademark) document data into PDL data. In the following descriptions, the specific process of the data process for converting Office document data into PDL data may be referred to as "office2pdl".

As a second example, a specific process of a data process may include a process of dividing up one specific process of a data process into a plurality of specific processes of data processes, and converting a request into a plurality of requests to the data processing units 84 according to the divided specific processes of data processes.

For example, a data process for converting image data into PDL data may be divided into a process of converting the image data into PDF data, and a process of converting the PDF data into PDL data. In the following descriptions, the specific process of the data process for converting image data into PDL data may be referred to as "image2pdl".

For example, one of the data processing units 84 may perform a data process for dividing a request for the data process "image2pdl" into the data processes "image2pdf" and "pdf2pdl". That is, the data processing units 84 include a data processing unit 84 that performs a data process of dividing a request for one data process into a plurality of requests for data processes.

Accordingly, even when the data processing units 84 do not include a data processing unit 84 that is capable of executing the data process "image2pdl", the desired data process "image2pdl" may be executed through cooperation of the data processes "image2pdf" and "pdf2pdl".

Figure 14:
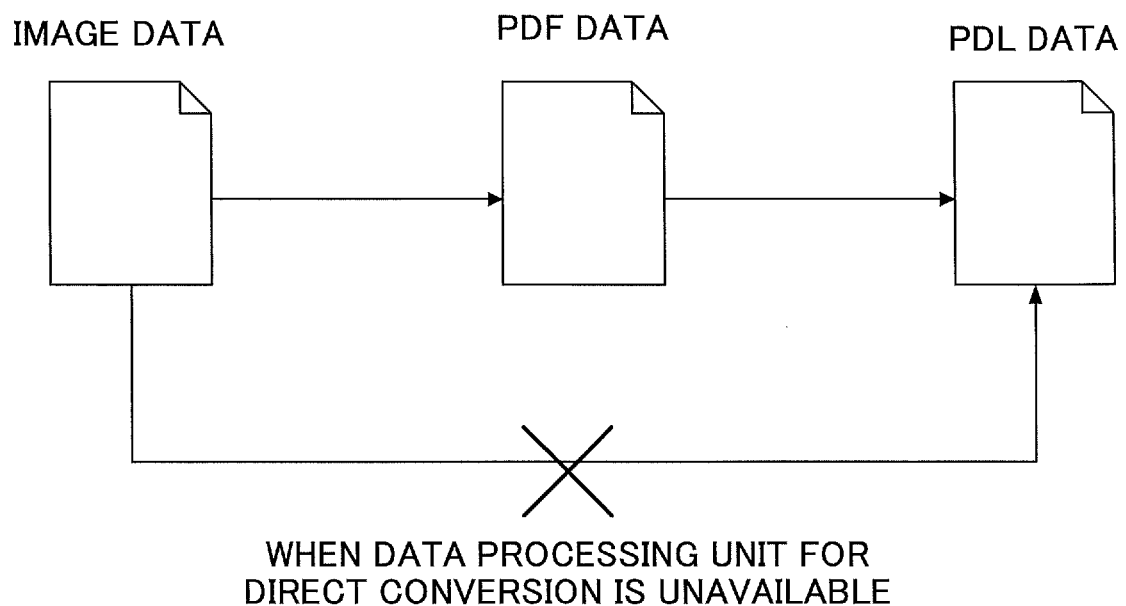
FIG. 14 illustrates a data process for dividing a specific process of one data process into multiple specific processes of data processes.

FIG. 14 conceptually illustrates a data process of dividing up one specific process of a data process into a plurality of specific processes of data processes. FIG. 14 illustrates an exemplary case where the data processing units 84 do not include a data processing unit 84 that is capable of executing the data process "image2pdl".

As illustrated in FIG. 14, even in a case where a data processing unit capable of performing the desired data process is unavailable, the desired data process "image2pdl" may be executed through cooperation of the data processes "image2pdf" and "pdf2pdl".

As can be appreciated, the service providing system 2 of the present embodiment is capable of executing a data process for dividing up one specific process of a data process into a plurality of specific processes of data processes. In this way, the service providing system 2 of the present embodiment may flexibly accommodate an increase in the types of specific processes of data processes.

Also, as a third example, a specific process of a data process may include a data process for cooperating with an external service. For example, the data process for cooperating with an external service may include a data process of issuing a request to the external cooperation authentication unit 80 to log into the online storage 32 using an account and password for online storage of a logged in user.

Other examples of the data process for cooperating with an external service may include a data process of storing data in the logged in online storage 32, a data process of acquiring data from the logged in online storage 32, a data process for cooperating with an external storage.

<<Cooperation with Online Storage>>

Figure 15:
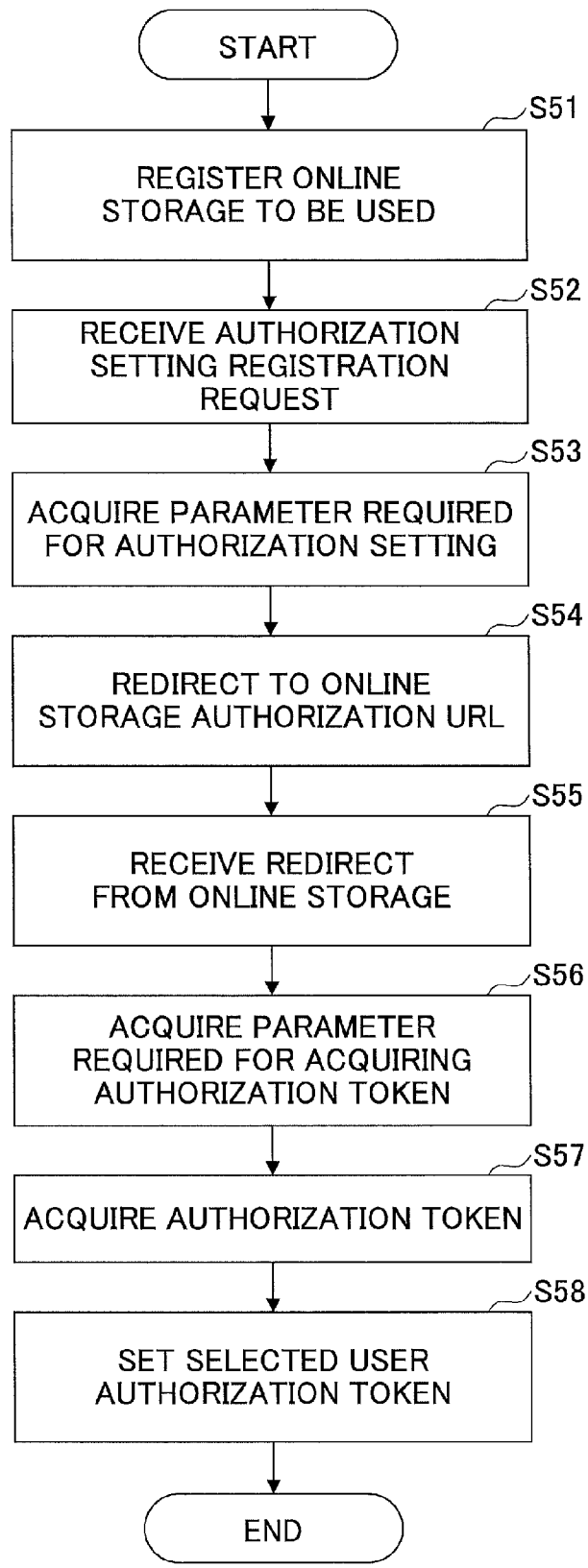
FIG. 15 is a flowchart illustrating exemplary process steps of authorization setting with respect to an online storage.

FIG. 15 is a flowchart illustrating exemplary process steps for setting up authorization with respect to an online storage. The user such as an administrator operates the input device 501 of the terminal apparatus 11 to enter a tenant ID, a user ID, and a password from the top screen of a portal site, and makes a login request. The portal service application 61 that receives the login request allows the user to login and prompts the display device 502 of the terminal apparatus 11 to display an external service registration screen.

In step S51, at the external service registration screen, the user selects the online storage (external service) 32 that the user wishes to use from a list of external services stored in the external service information of the management information storage unit 91, and makes a registration request.

The portal service application 61 that has received the registration request issues a request to the setting registration unit 74 to register the online storage 32 selected by the user. In turn, the setting registration unit 74 registers the online storage 32 selected by the user in association with the tenant ID of the logged in user in the tenant information of the management information storage unit 91.

In step S52, the user selects from an authorization setting screen of the portal site the user ID of users to be subject to the authorization setting, the external service ID (or service name) of the external service subject to the authorization setting, and the scope to be set up for the users, and makes an authorization setting registration request. The portal service application 61 receives the authorization setting registration request.

In step S53, the portal service application 61 that has received the authorization setting registration request issues a request to the authorization setting process unit 75 to set up the authorization setting. In turn, the authorization setting process unit 75 acquires parameters necessary for the authorization setting from the external service information of the management information storage unit 91. Note that the parameters necessary for authorization setting may include the external service ID, the scope, information items associated with the selected external service ID such as a client ID and a redirect destination URL, and an arbitrary session key for maintaining a session, for example.

In step S54, the authorization setting process unit 75 that has acquired the parameters necessary for the authorization setting acquires from the external service information of the management information storage unit 91 the authorization destination URL associated with the selected external service ID. The authorization setting process unit 75 redirects a request including the parameters necessary for the authorization setting (request having the parameters necessary for the authorization setting as queries of a GET request) to the authorization destination URL from the terminal apparatus 11.

By redirecting the request from the terminal apparatus 11 to the authorization destination URL, authorization may be set up between the terminal apparatus 11 and the online storage 32. Note that after the authorization is set up, the online storage 32 is redirected to the authorization setting process unit 75, and therefore, the session at the HTTP level is terminated. Accordingly, a session key is used to maintain the same session.

The redirected online storage 32 prompts the display device 502 of the terminal apparatus 11 to display a login screen. The user operates the input device 501 of the terminal apparatus 11 to enter an account and password from the login screen, and makes a login request. The online storage 32 receives the login request.

If the login is successful, the online storage 32 prompts the display device 502 of the terminal apparatus 11 to display an authorization screen. The user may view the authorization screen, and in the case of performing authorization, the user may operate the input device 501 of the terminal apparatus 11 to press an authorization button displayed on the authorization screen, for example, to make an authorization request.

In step S55, the online storage 32 redirects an authorization code indicating that authorization has been approved and a session key from the terminal apparatus 11 to the redirect destination URL. In step S56, the authorization setting process unit 75 of the service providing system 2 receives the authorization code. Note that if the user is already logged in upon being redirected to the online storage 32, the display of the login screen may be omitted.

In step S56, the authorization setting process unit 75 that has received the authorization code acquires parameters necessary for acquiring an authorization token from the service information of the management information storage unit 91. The parameters necessary for acquiring an authorization token from the service information of the management information storage unit 91 may include the received authorization code as well as the client ID and client secret associated with the external service ID of the online storage 32 corresponding to the sender of the authorization code, for example.

In step S57, the authorization setting process unit 75 transmits the acquired client ID and client secret and the received authorization code to the online storage 32, and makes an authorization token acquisition request. The online storage 32 verifies the received authorization token and transmits the authorization token to the authorization setting process unit 75 of the service providing system 2.

In step S58, the authorization setting process unit 75 that has received the authorization token issues a request to the setting registration unit 74 to register the authorization token. The setting registration unit 74 registers the users to be subject to the authorization setting selected from the authorization setting screen, the received authorization token, and the scope in association with each other the in the user information of the management information storage unit 91. After the authorization token registration is completed, the authorization setting process unit 75 notifies the portal service application 61 of the registration completion. In turn, the portal service application 61 prompts the display device 502 of the terminal apparatus 11 to display a screen indicating the setting result of the authorization setting.

Note that upon transmitting the authorization token to the service providing system 2, the online storage 32 may also transmit the term of validity of the authorization token and a refresh token for reissuing the authorization token in the case where the authorization token has expired, for example.

Figure 16:
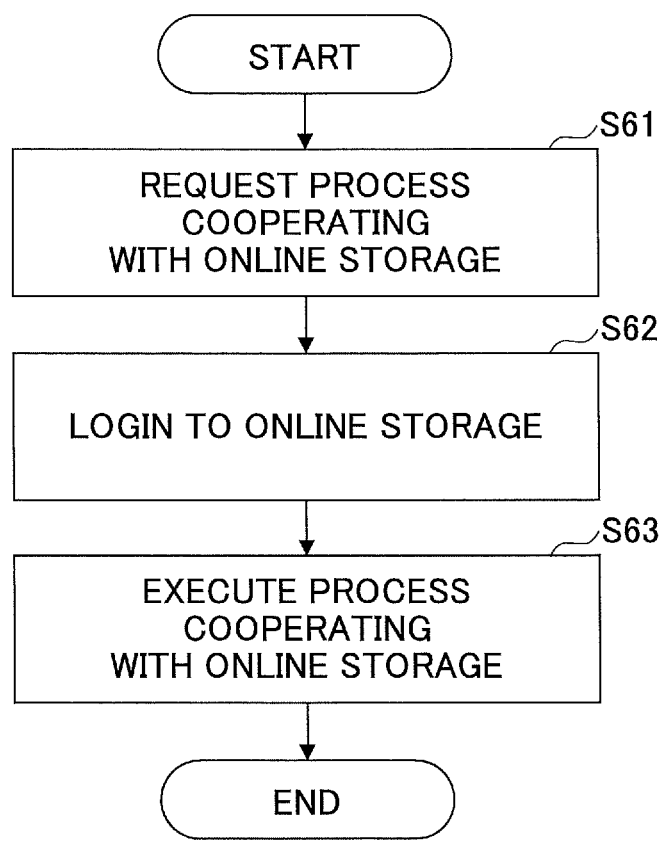
FIG. 16 is a flowchart illustrating exemplary process steps of a cooperative process with an online storage.

FIG. 16 is a flowchart illustrating an exemplary cooperative process with an online storage. In step S61, the user that has logged into the service providing system 2 issues a process request for cooperating with the online storage 32 from the terminal apparatus 11 or the image forming apparatus 12.

When the process request for cooperating with the online storage 32 is issued, in step S62, the external cooperation authentication unit 80 of the service providing system 2 performs a login process to the online storage 32.

The external cooperation authentication unit 80 receives the login request for logging into the online storage 32 from the data processing unit 84, for example. The external cooperation authentication unit 80 acquires from the user information of the management information storage unit 91, information required for the login process that is associated with the user that has logged into the service providing system 2 and the online storage 32 to which the login process is to be directed. More specifically, the external cooperation authentication unit 80 acquires the information required for the login process for logging into the online storage 32 that is associated with the tenant ID and the user ID and password for login of the user that has logged into the service providing system 2.

For example, referring to the user information of FIG. 6, when the external cooperation authentication unit 80 receives a login request for logging into "online storage A", the external cooperation authentication unit 80 acquires the account and password for the "online storage A" as the information required for the login process for logging into the "online storage A".

Further, upon receiving the login request for logging into "online storage B", the external cooperation authentication unit 80 acquires the account and authorization token for the "online storage B" as the information required for the login process for logging into the "online storage B".

If the online storage 32 with which cooperation is sought corresponds to an external service that does not have the authorization setting implemented such as the "online storage A", the external cooperation authentication unit 80 uses an account and a password to make a login request to log into the "online storage A". The account and password are examples of authentication information with respect to an external service. The "online storage A" that receives the login request performs an authentication process on the received account and password. If the authentication is successful, the "online storage A" sends a response indicating login approval to the external cooperation authentication unit 80. If the authentication is unsuccessful, the "online storage A" sends a response indicating login rejection to the external cooperation authentication unit 80.

When the external cooperation authentication unit 80 receives from the "online storage A" the response indicating login approval, the service providing system 2 may be able to upload (store) data to the "online storage A" or download (acquire) data from the "online storage A", for example.

That is, by having the external cooperation authentication unit 80 receive from the online storage 32 a response indicating login approval as described above, the service providing system 2 may execute a cooperative process with the online storage 32 in step S63.

If the online storage 32 with which cooperation is sought corresponds to an external service that has the authorization setting implemented such as the "online storage B", the external cooperation authentication unit 80 uses an account and an authorization token to make a login request to log into the "online storage B". The account and authorization token are examples of authorization information with respect to an external service. The "online storage B" that receives the login request verifies the validity of the received account and authorization token. If the validity of the account and authorization token is verified, the "online storage B" sends a response indicating login approval to the external cooperation authentication unit 80. If the account and authorization token cannot be verified, the "online storage B" sends a response indicating login rejection to the external cooperation authentication unit 80.

When the external cooperation authentication unit 80 receives from the "online storage B" the response indicating login approval, in step S63, the service providing system 2 may be able to execute a cooperative process with the online storage 32 within the limit prescribed by the scope of the authorization setting.

<<Process of Implementing Use Restriction on Device Function>>

In the following, an exemplary process performed in the information processing system 1 of the present embodiment for implementing a use restriction on a device function of the image forming apparatus 12 is described. For example, in order to implement a process of implementing a use restriction on a device function of the image forming apparatus 12 in the information processing system 1 of the present embodiment, the image forming apparatus 12 may be arranged to have a functional configuration as illustrated in FIG. 17.

Figure 17:
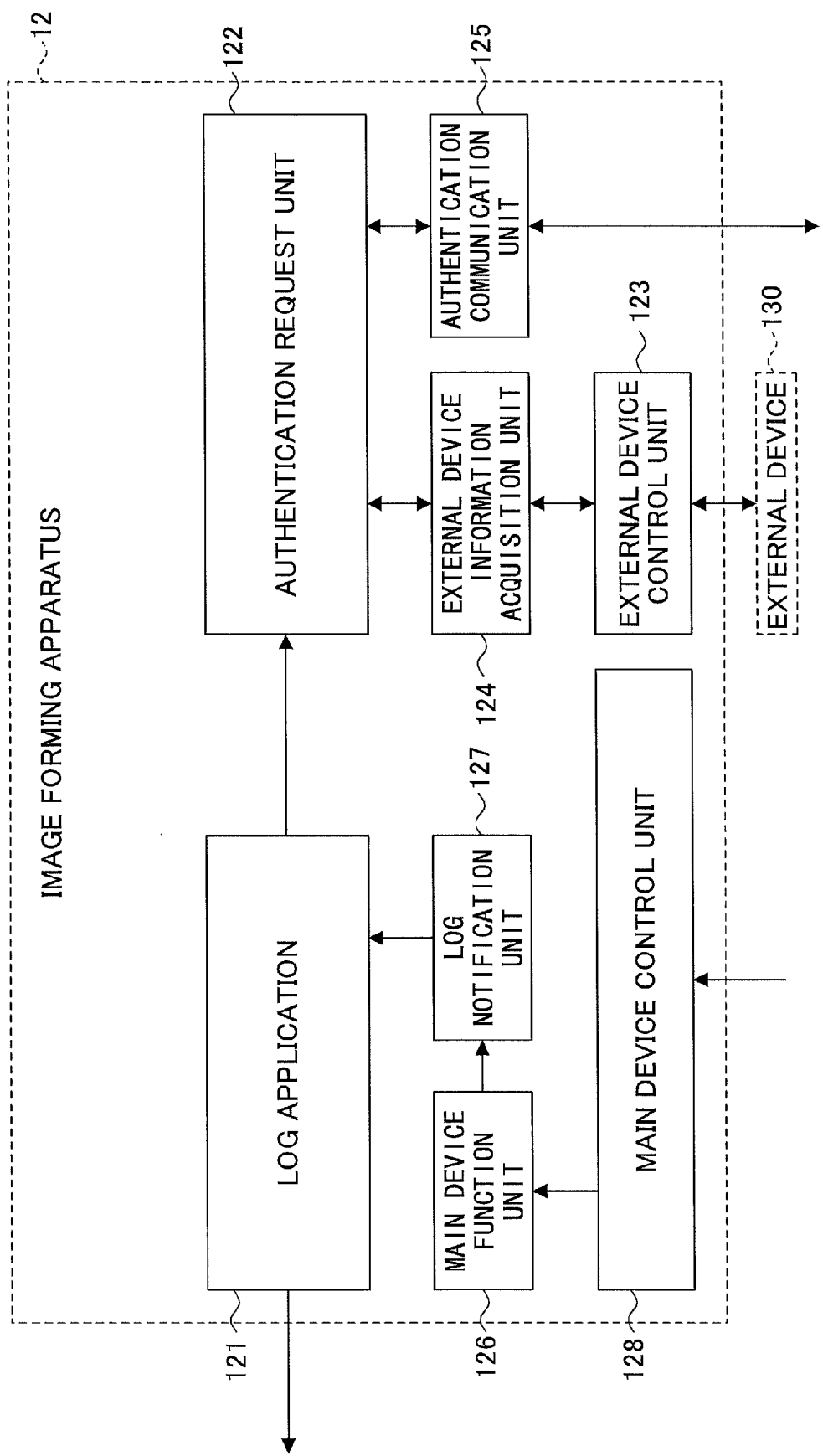
FIG. 17 is a block diagram illustrating an exemplary functional configuration of an image forming apparatus.

FIG. 17 is a block diagram illustrating an exemplary functional configuration of the image forming apparatus 12. In FIG. 17, the image forming apparatus 12 includes a log application 121, an authentication request unit 122, an external device control unit 123, an external device information acquisition unit 124, an authentication communication unit 125, a main device function unit 126, a log notification unit 127, and a main device control unit 128.

The log application 121 is a functional unit for managing a log issued when a device function of the image forming apparatus 12 is operated (operation log). The log application 121 receives the log in page units (on a page-by-page basis) from the log notification unit 127, which is described below. The log application 121 transmits the log received from the log notification unit 127 to the service providing system 2.

The authentication request unit 122 is a functional unit that cooperates with the print service application 62 of the service providing system 2 and provides an authentication function with respect to a user of the image forming apparatus 12. The authentication request unit 122 displays a login screen (GUI: Graphical User Interface) on an operation panel of the image forming apparatus 12, for example, and prompts an input of authentication information. The authentication request unit 122 transmits the input authentication information to the print service application 62 via the authentication communication unit 125, which is described below, and makes a user authentication (user device authentication) request.

As a result, the authentication request unit 122 receives an authentication result as a response from the print service application 62. At this time, if the user is successfully authenticated, the authentication request unit 122 acquires authority information along with the authentication result. The authority information indicates the functions the authenticated user is authorized to use.

The external device control unit 123 is a functional unit for controlling an external device I/F (interface). The external device information acquisition unit 124 is a functional unit for acquiring (reading) stored information from an external device 130 via the external device I/F.

By implementing these functional units, the image forming apparatus 12 may read authentication information stored by a tag within a non-contact IC card, for example. Thus, the authentication request unit 122 can perform not only user authentication based on authentication information input from the login screen but also user authentication based on authentication information acquired by the external device information acquisition unit 124. That is, at the image forming apparatus 12 of FIG. 17, user authentication may be performed by holding a non-contact IC card over the external device I/F.

The authentication communication unit 125 is a functional unit for establishing data communication related to user authentication between the image forming apparatus 12 and the service providing system 2. For example, the authentication communication unit 125 may transmit and receive authentication information and an authentication result via a network I/F provided in the image forming apparatus 12.

The main device function unit 126 is a functional unit providing a predetermined service to a user at the image forming apparatus 12. The image forming apparatus 12 may have basic functions related to input/output and extended functions cooperating with the basic functions that can be added or deleted.

In the present embodiment, functions related to output (printing) are subject to use restrictions. Accordingly, for example, in the case where the image forming apparatus 12 corresponds to a MFP (multifunction peripheral), the main device function unit 126 may be a generic term referring to the basic functions related to output such as copying, printing, facsimile, etc.

The log notification unit 127 is a functional unit for issuing and providing notification of a log in page units regarding the operation of the main device function unit 126 according to a function use request from an authenticated user. For example, if the main device function unit 126 (copy function) receives a copy request from the authenticated user, the log notification unit 127 may issue and provide notification of a log in the following manner.

For example, in a case where one set of a 5-page document is copied, a total of five (5) logs are successively issued and notified according to the order in which the pages are processed. Also, in a case where five sets of a 5-page document are copied, a total of 25 logs are issued and notified according to the order in which the pages are processed. The logs are passed to the log application 121 in page units according to the order in which the pages are processed by the main device unit 126.

The main device control unit 128 is a functional unit implementing an operation environment (platform) for the main device function unit 126. Also, the main device control unit 128 controls operations such as start, stop, and termination operations of the main device function unit 126 (controls the life cycle of the device functions). In this way, the main device control unit 128 may stop the operation of the main device function unit 126 according to an instruction from the service providing system 2.

Figure 18:
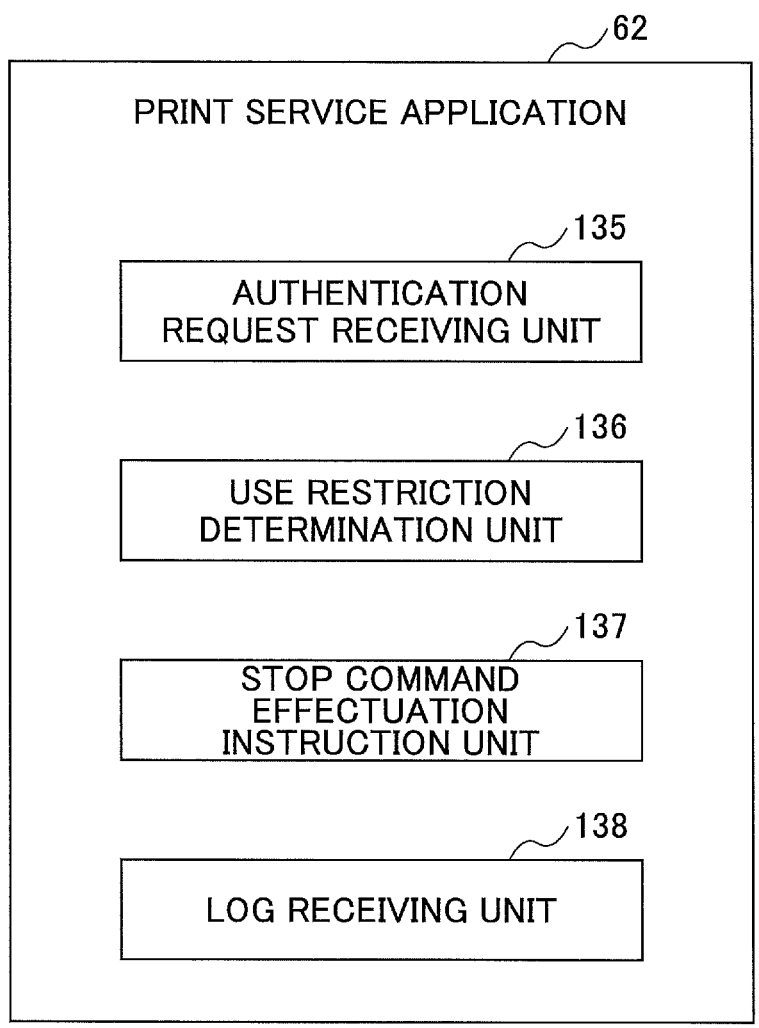
FIG. 18 is a block diagram illustrating an exemplary functional configuration of a print service application.

FIG. 18 is a block diagram illustrating an exemplary functional configuration of the print service application 62. In FIG. 18, the print service application 62 includes an authentication request receiving unit 135, a use restriction determination unit 136, a stop command effectuation instruction unit 137, and a log receiving unit 138. Note that the block diagram of FIG. 18 illustrates functional units for describing the process of implementing use restrictions on device functions of the image forming apparatus 12.

The authentication request receiving unit 135 receives a request for user authentication based on authentication information (user ID, password, etc.) transmitted from the image forming apparatus 12. The authentication request receiving unit 135 requests the user device authentication unit 78 of the platform 52 to perform authentication according to the authentication request from the image forming apparatus 12. If the user is successfully authenticated, the authentication request receiving unit 135 returns authority information along with the authentication result to the image forming apparatus 12. The log receiving unit 138 is a functional unit that receives a log from the image forming apparatus 12 and manages the log. The log receiving unit 138 may mange the log by storing the log in the data storage unit 93, for example.

The log receiving unit 138 passes the log received from the image forming apparatus 12 in page units to the use restriction determination unit 136. The use restriction determination unit 136 updates a cumulative consumption value, which quantitatively indicates the consumption of consumable resources resulting from past operations, to a latest value based on the log received from the log receiving unit 138. The use restriction determination unit 136 determines whether a use restriction needs to be implemented by comparing the updated cumulative consumption value (latest value) with a pre-set upper limit value related to consumption.

Further, based on the determination result of the use restriction determination unit 136, the stop command effectuation instruction unit 137 may issue a stop command for stopping the operation of the main device function unit 126 in page units and send the stop command to the main device control unit 128 of the image forming apparatus 12.

Figure 19:
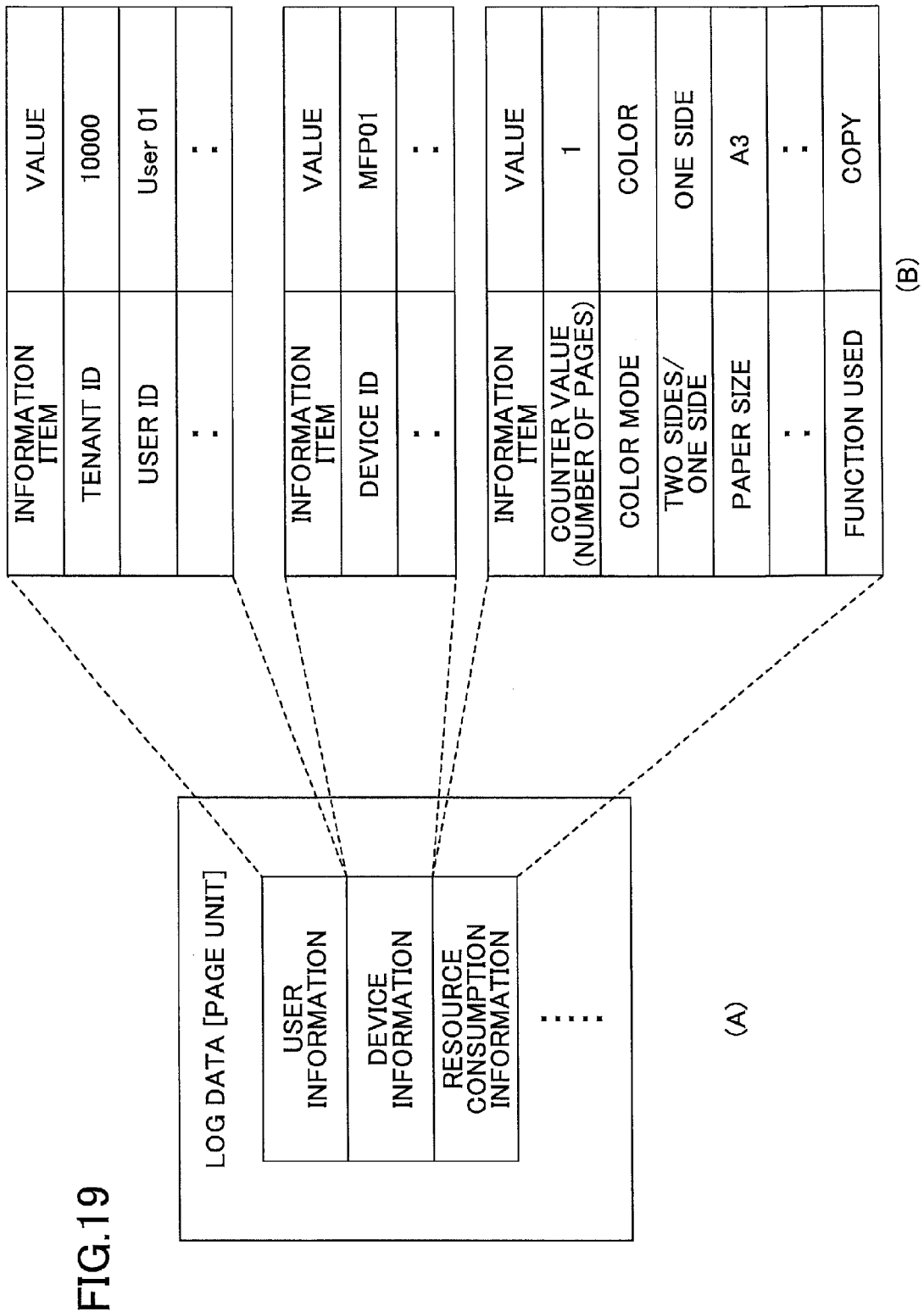
FIG. 19 illustrates an exemplary data configuration log data.

FIG. 19 illustrates an exemplary data configuration of log data. The log data (log) illustrated in FIG. 19 corresponds to data of an operation log issued and notified in page units from the log notification unit 127. In the example of FIG. 19, a page unit corresponds to one side (front side/back side). Note that a page unit may also refer to one sheet, for example.

The log data is passed from the log application 121 to the log receiving unit 138 of the print service application 62 according to the issuance/notification timing of the log by the log notification unit 127. The log data is collected by the service providing system 2 to be stored and managed in the data storage unit 93, for example.

As illustrated in FIG. 19 (A), the log data includes user information, device information, and resource consumption information. The information items such as the user information, the device information, and the resource consumption information are configured by actual values (actual data) for the following information items.

The user information is information related to the authenticated user making an operation request. The user information may include values corresponding to, for example, a user ID and a tenant ID. Note that the user ID may be any information capable of identifying the authenticated user such as the user name. The device information is information related to the image forming apparatus 12 of which function is operated. The device information may include a value corresponding to a device identification item such as a device ID, for example. The device ID may be any information capable of identifying the device being used such as the device name.

The resource consumption information is information relating to the consumption of resources by requested operations. The resource consumption information may include, for example, a counter value and values corresponding to consumption related information items such as color mode, two sides/one side printing, paper size, and function used. Note that in FIG. 19 (B), which illustrates exemplary information items configuring the above information, values are indicated for a case where one page of a document in "A3" size paper is printed in "color" through "one side" printing.

In the present embodiment, log data having a configuration as described above is issued by the log notification unit 127 in page units. In this way, resource consumption per page upon printing may be obtained in the present embodiment.

Figure 20:
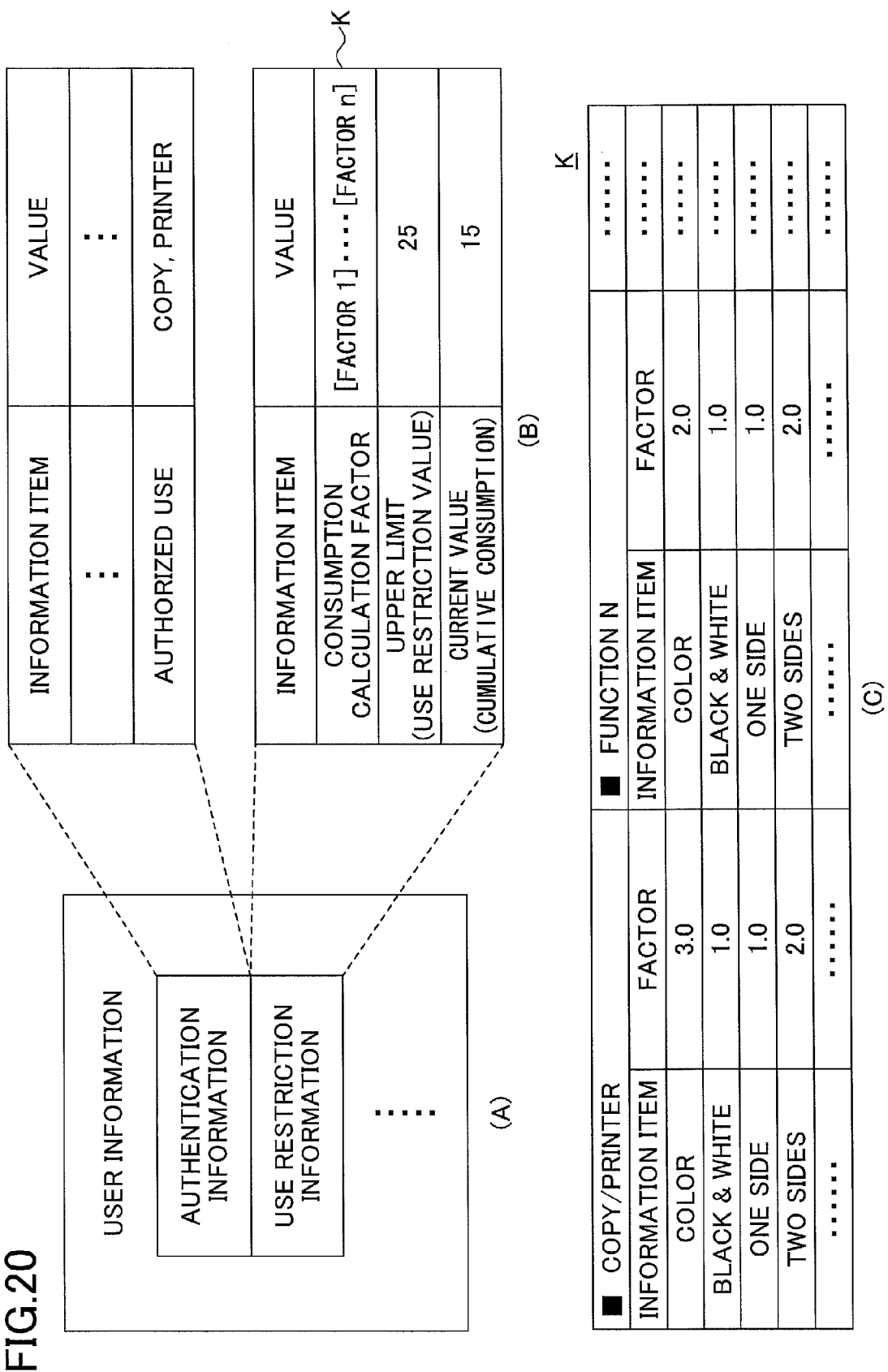
FIG. 20 illustrates another exemplary data configuration user information.

FIG. 20 illustrates another exemplary configuration of user information. The user information of FIG. 20 has authorized use information added to the authentication information of the user information illustrated in FIG. 6, for example, and also includes use restriction information. The user information of FIG. 20 is referred to by the user restriction determination unit 136 of the print service application 62.

As illustrated in FIG. 20 (A), the user information includes authentication information and use restriction information. For example, the authentication information and the use restriction information may be configured by actual values (actual data) for the following information items.

Authorized use is an information item to which values corresponding to functions that the authenticated user is authorized to use are set (authority information). In the data example illustrated in FIG. 20 (B), values are illustrated for a case where copy and printer functions are set as authorized use information.

The use restriction information is information related to use restrictions set up with respect to the user. For example, the use restriction information may include values corresponding to use restriction information items such as a consumption calculation factor, an upper limit value (use restriction value), and a current value (cumulative consumption). The consumption calculation factor is an information item to which a factor K is set for calculating the consumption per page of a requested operation (value to be added to the current cumulative consumption value). For example, the factor K may be in a table format as illustrated in FIG. 20 (C).

As illustrated in FIG. 20 (C), the factor K has a factor value per page corresponding to each item such as color, black & white, one side, two sides with respect to each function/print type. For example, according to the data example of FIG. 20 (C), in a case where color copying is performed, the consumption per page is calculated using the factor value "3.0". Also, in a case where color printing is performed using function N, the consumption per page is calculated using the factor value "2.0". Also, the consumption calculation factor information item may have a weighted factor set up for each user with respect to the consumption per page from the execution of a function used, for example.

The upper limit (use restriction value) is an item to which an upper limit value corresponding to the maximum allowable consumption is set. The value of the upper limit is used to determine whether a use restriction has to be implemented. The current value (cumulative consumption) is an information item to which a cumulative value of the consumption by requested operations calculated using the consumption calculation factor is set (value quantitatively indicating the cumulative consumption of operations requested up to the present).

Thus, the current value item is initially set to a default value of "0". The value of the current value item is cumulatively increased by having the consumption calculated during execution of an operation added thereto in page units. According to the data example illustrated in FIG. 20 (B), "factor 1" through "factor n" are to be used to calculate the consumption per page upon printing, and an upper limit value of "25" is to be used to determine whether a use restriction has to be implemented.

Note that in the present embodiment, the user information as illustrated in FIG. 20 is managed at the service providing system 2. In this way, the service providing system 2 may implement a use restriction when user authentication and printing is performed at the image forming apparatus 12.

In the following, a user authentication process and a use restriction process for implementing a use restriction on a device function of the image forming apparatus 12 in the information processing system 1 are described.

Figure 21:
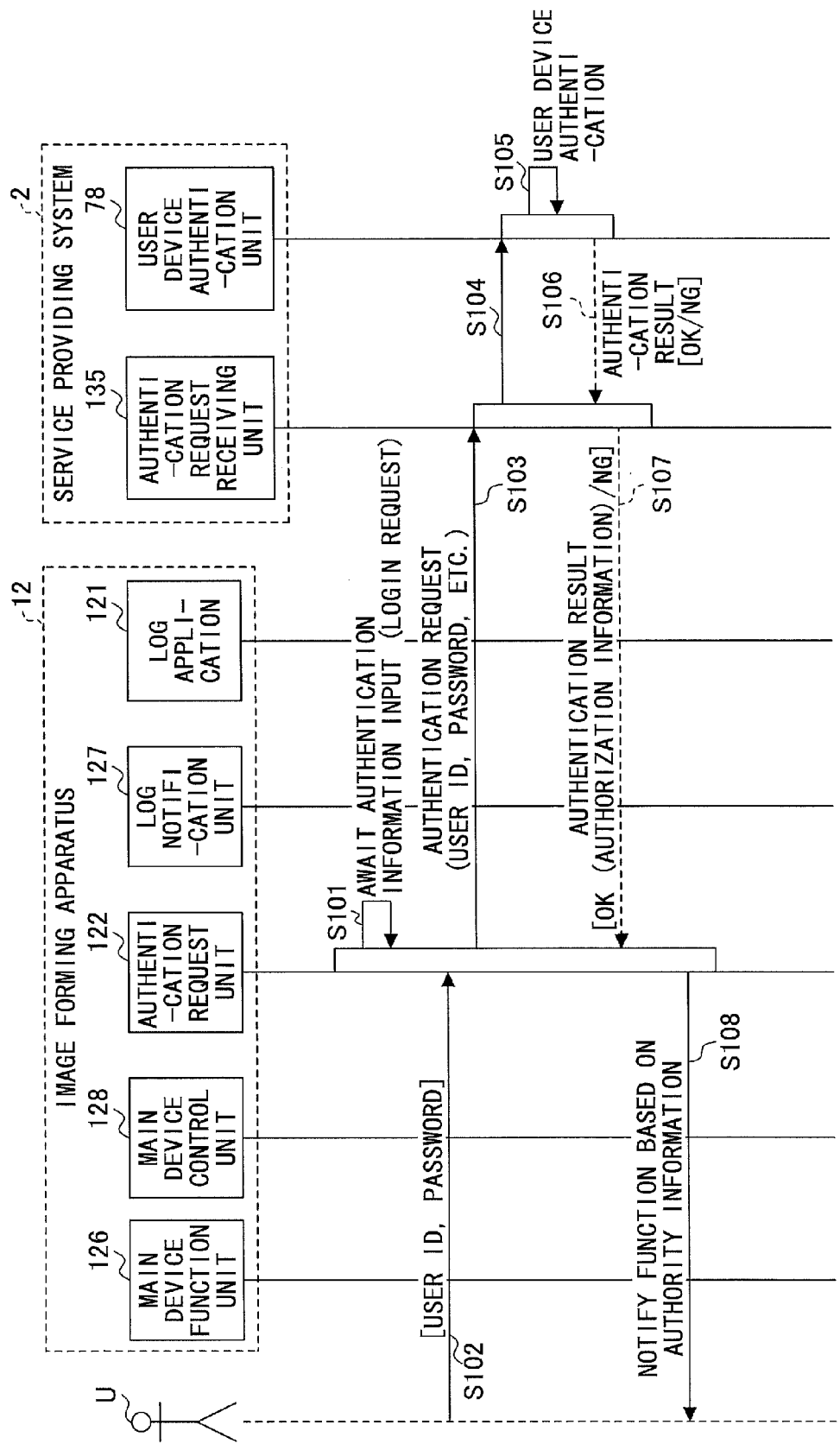
FIG. 21 is a sequence chart illustrating an example of a user authentication process.

FIG. 21 is a sequence chart illustrating an exemplary user authentication process. In the information processing system 1 according to the present embodiment, the following user authentication process is performed by the image forming apparatus 12 and the service providing system 2.

In step S101, the authentication request unit 122 of the image forming apparatus 12 displays a login screen on the operation panel, and awaits an input of authentication information from the user U. In step S102, the authentication request unit 122 receives an input of authentication information such as a user ID and a password of the user U from the login screen.

In step S103, the authentication request unit 122 makes a user authentication request by transmitting to the service providing system 2 the input authentication information and authentication information such as a tenant ID and a device ID stored in its own storage area. In step S104, the authentication request receiving unit 135 included in the print service application 62 of the service providing system 2 requests the user device authentication unit 78 of the platform 52 to perform authentication according to the authentication request from the image forming apparatus 12. In step S105, the user device authentication unit 78 performs the user device authentication according to the above request.

In step S106, the user device authentication unit 78 sends a respond including the authentication result to the authentication request receiving unit 135. Further, in step S107, the authentication request receiving unit 135 sends a response including the authentication result to the authentication request unit 122 of the image forming apparatus 12. If the user is successfully authenticated, the authentication request receiving unit 135 sends authority information together with the authentication result as a response to the authentication request unit 122 of the image forming apparatus 12.

If the user is successfully authenticated, in step S108, based on the authority information, the authentication request unit 122 of the image forming apparatus 12 displays a screen notifying the user U of the functions the user U is authorized to use after authentication (use authorized function screen). For example, in a case where the authentication request unit 122 receives authority information according to the authorized use information illustrated in FIG. 20, the authentication request unit 122 indicates to the user U that the copy function and the printer function are functions the user U is authorized to use after authentication. Note that if the authentication is unsuccessful, the authentication request unit 122 displays a screen indicating such authentication result (authentication error screen) on the operation panel.

In the information processing system 1 of the present embodiment, by implementing the above process steps, the user U may log into the image forming apparatus 12 and use a device function of the image forming apparatus 12.

Figure 22:
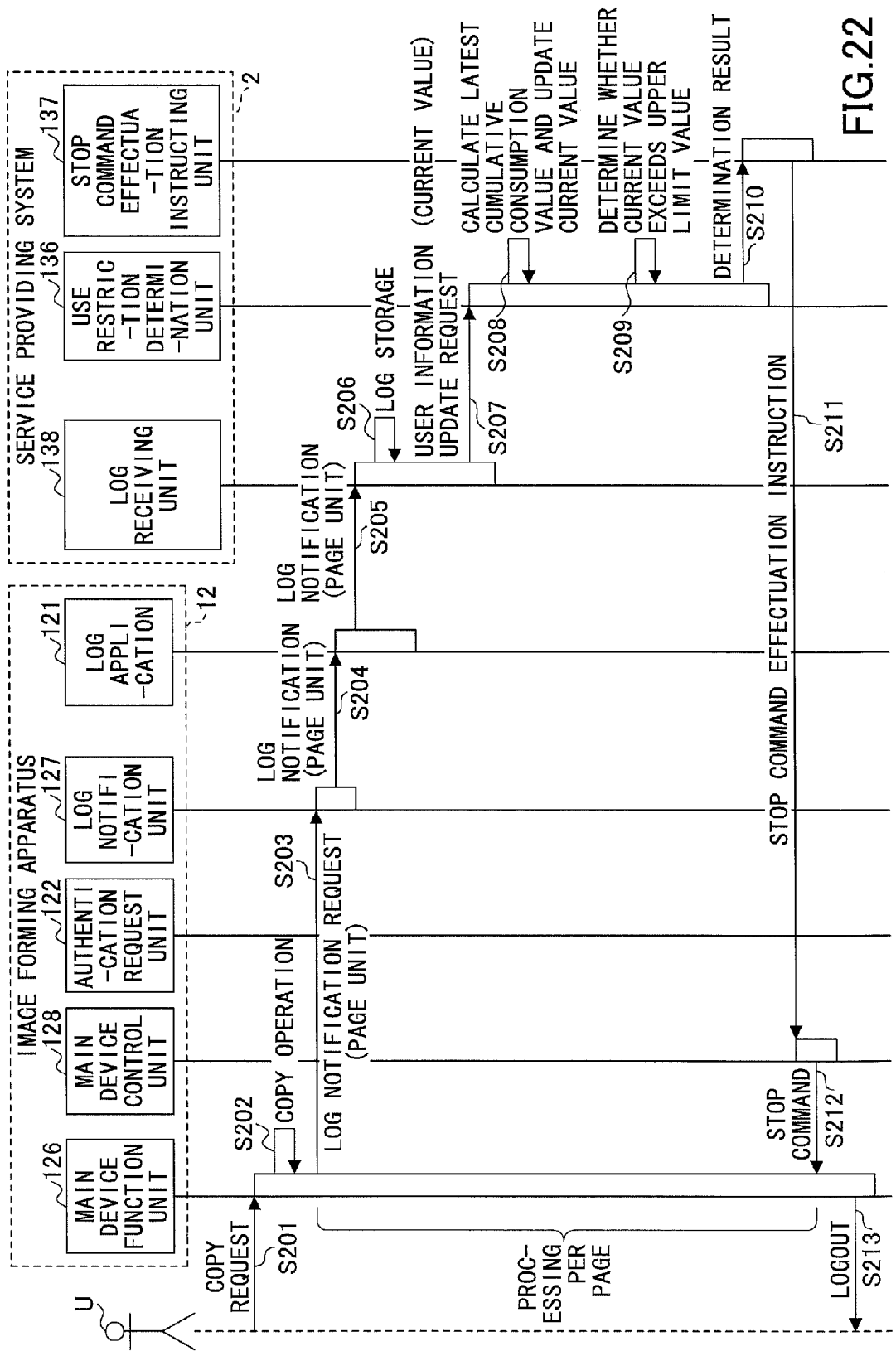
FIG. 22 is a sequence chart illustrating an example of a use restriction process.

FIG. 22 is a sequence chart illustrating an exemplary use restriction process. In the information processing system 1 according to the present embodiment, the following use restriction process may be performed by the image forming apparatus 12 and the service providing system 2.

In the following descriptions, an authenticated user is referred to as "authenticated user U". The descriptions below relate to exemplary process steps that are executed when the authenticated user U makes a request to the image forming apparatus 12 for one set of a one-sided color copy of a 6-page document. Thus, the main device function unit 126 corresponds to a copy function in the example described below.

In step S201, the image forming apparatus 12 receives a copy request from the authenticated user U. In step S202, the main device function unit 126 of the image forming apparatus 12 starts the operation requested by the authenticated user U (copy operation).

The image forming apparatus 12 may implement a use restriction in page units by executing process steps S203 through S212 described below each time a copy operation for one page is completed. In step S203, after the completion of a copying operation for one page, the main device function unit 126 requests the log notification unit 127 to issue and provide notification of a log related to the copy operation for the one page.

In step S204, the log notification unit 127 issue and provides notification of a log related to the one-page copying operation to the log application 121 according to the request. In step S205, the log application 121 transmits the log from the log notification unit 127 to the log receiving unit 138 included in the print service application 62 of the service providing system 2.

In step S206, the log receiving unit 138 manages the received log by storing the log in the data storage unit 93, for example. In step S207, the log receiving unit 138 requests the use restriction determination unit 136 to update the value of the current value (cumulative consumption) item included in the use restriction information of FIG. 20 to the latest value. At this time, the log receiving unit 138 makes the use restriction information update request by passing the log in page units to the use restriction determination unit 136.

In step S208, in response to the use restriction information update request, the use restriction determination unit 136 calculates the latest cumulative consumption including the consumption by the one-page copying operation that has been executed based on the received log of the on-page copying operation, and updates the value of the current value (cumulative consumption) item to the latest cumulative consumption.

The use restriction determination unit 136 calculates the consumption per page of the executed copying operation based on the values of the resource consumption information included in the received log and the value (factor K) of the "consumption calculation factor" information item of FIG. 20. For example, in the case where the use restriction determination unit 136 calculates the consumption per page resulting from the execution of the on-page copying operation based on the log illustrated in FIG. 19 and the user information illustrated in FIG. 20, the calculation may be performed in the following manner.

A copy request for one set of a one-sided color copy of a 6-page document from the authenticated user U is received at the image forming apparatus 12. Based on the resource consumption information included in the log, the use restriction determination unit 136 refers to the "consumption calculation factor" information item and acquires the values "3.0" and "1.0" for the factor K for calculating the consumption per page. Then, based on the acquired values "3.0" and "1.0" for factor K, the use restriction determination unit 136 calculates the value "3.0" (=3.0×1.0×1 (page)) for the consumption per page from executing the one-page copying operation.

Note that in a case where one set of a two-sided color copy of a 6-page document is requested by the authenticated user U, values "3.0" and "2.0" for the factor K for calculating the consumption per page are acquired based on the resource consumption information included in the log related to the requested operation. Thus, the use restriction determination unit 136 calculates the value "6.0" (=3.0×2.0×1 (page)) for the consumption per page from executing the copying operation. In this way, the use restriction determination unit 136 may calculate the consumption per page of a requested operation.

Then, the use restriction determination unit 136 adds the calculated consumption value "3.0" to the value "15" corresponding to the "current value (cumulative consumption)" of the use restriction information in the user information to obtain the value "18" (=15+3) as the latest cumulative consumption value, and updates the current value to the latest value. In this way, the use restriction determination unit 136 may update the cumulative consumption value quantitatively indicating the cumulative consumption previously requested operations based on the consumption per page of a currently requested operation.

In step S209, the use restriction determination unit 136 determines whether the updated current value (latest cumulative consumption) exceeds the value of the "upper limit (use restriction value)" included in the use restriction information. By comparing the updated current value (latest cumulative consumption) with the pre-set upper limit (use restriction value) related to consumption in the above manner, the use restriction determination unit 136 determines whether a use restriction needs to be implemented.

For example, in a case where the use restriction determination unit 136 determines whether a use restriction has to be implemented with respect to a copy function based on the user information illustrated in FIG. 20, the use restriction determination unit 136 may make the following comparisons and determinations. That is, the use restriction determination unit 136 compares the value "25" for the "current value (use restriction value)" with the updated current value "18".

Because the updated current value "18" does not exceed the upper limit (25>18), the use restriction determination unit 136 determines that a use restriction does not have to be implemented with respect to the copy function. That is, when the updated current value does not exceed the upper limit, the use restriction determination unit 136 determines that a use restriction does not have to be implemented with respect to the copy function and continues processing the next page.

On the other hand, if the updated current value exceeds the upper limit, the use restriction determination unit 136 determines that a use restriction has to be implemented with respect to the copy function. For example, in the image forming apparatus 12, the process may be continually performed and the copying operation may progress until a copying operation of the fourth page is performed. After the copying operation of the fourth page is completed, in step S208, the value of the "current value (cumulative consumption)" is updated to "27". Because the updated current value exceeds the upper limit value (25<27), the use restriction determination unit 136 determines that a use restriction has to be implemented with respect to the copy function.

Upon determining that a use restriction has to be implemented, in step S210, the use restriction determination unit 136 notifies the stop command effectuation instruction unit 137 of the determination result that a use restriction has to be implemented. In step S211, the stop command effectuation instruction unit 137 issues a stop command effectuation instruction for stopping the operation of the main device function unit 126 to the main device control unit 128 of the image forming apparatus 12. If it is determined that a use restriction has to be implemented, the print service application 62 instructs the effectuation of a command to stop the copy function.

In step S212, in response to the instruction from the service providing system 2, the main device control unit 128 may direct the main device function unit 126 to stop an operation in page units. In step S213, the main device function unit 126 stops operation of the copy function and displays a screen notifying logout (logout screen) on the operation panel.

As can be appreciated, in the image forming apparatus 12 according to the present embodiment, a use restriction may be implemented in page units with respect to a device function based on an operation log for each page regarding the execution of a function according to a function use request from an authenticated user.

In the image forming apparatus 12 according to the present embodiment, upon receiving a function use request from an authenticated user U, the log notification unit 127 issues an operation log with respect to each page regarding the execution of the function according to the request. Based on the issued operation log, the use restriction determination unit 136 of the service providing system 2 updates a cumulative consumption value quantitatively indicating a cumulative consumption from previously requested operations to the latest value. The use restriction determination unit 136 may compare the latest cumulative consumption value with a pre-set use restriction value, and determine whether a use restriction has to be implemented based on the comparison result. Based on the user restriction determination result, the stop command effectuation instruction unit 137 of the service providing system 2 may instruct the image forming apparatus 12 to stop the operation of the function used in page units.

In this way, in the image forming apparatus 12 of the present embodiment, a use restriction may be implemented with respect to a device function in page units based on an operation log for each page regarding the execution of the function according to a function use request from an authenticated user.

In the information processing system 1 according to the present embodiment, a precise use restriction may be implemented with respect to a device function. Also, in the information processing system 1 according to the present embodiment, a use restriction on a device function may be controlled according to the service providing destination such as a user, an organization, or a company. Further, in the information processing system 1 according to the present embodiment, services to be provided to a service providing destination such as a user, an organization, or a company, and the devices and users that are to use the services may be appropriately managed, and a use restriction may be implemented on a device function under such conditions.

<<Modified Embodiment>>

In the above embodiment, the determination of whether a use restriction has to be implemented is made at the service providing system 2. In the modified embodiment described below, the determination of whether a use restriction has to be implemented is made at the image forming apparatus 12. In the case where the determination of whether a use restriction has to be implemented is made at the image forming apparatus 12, the time required for instructing the main device control unit 128 to stop the operation of the main device function unit 126 (function used) in page units may be reduced. Note that in the following, features of the modified embodiment that differ from the above embodiment are described.

Figure 23:
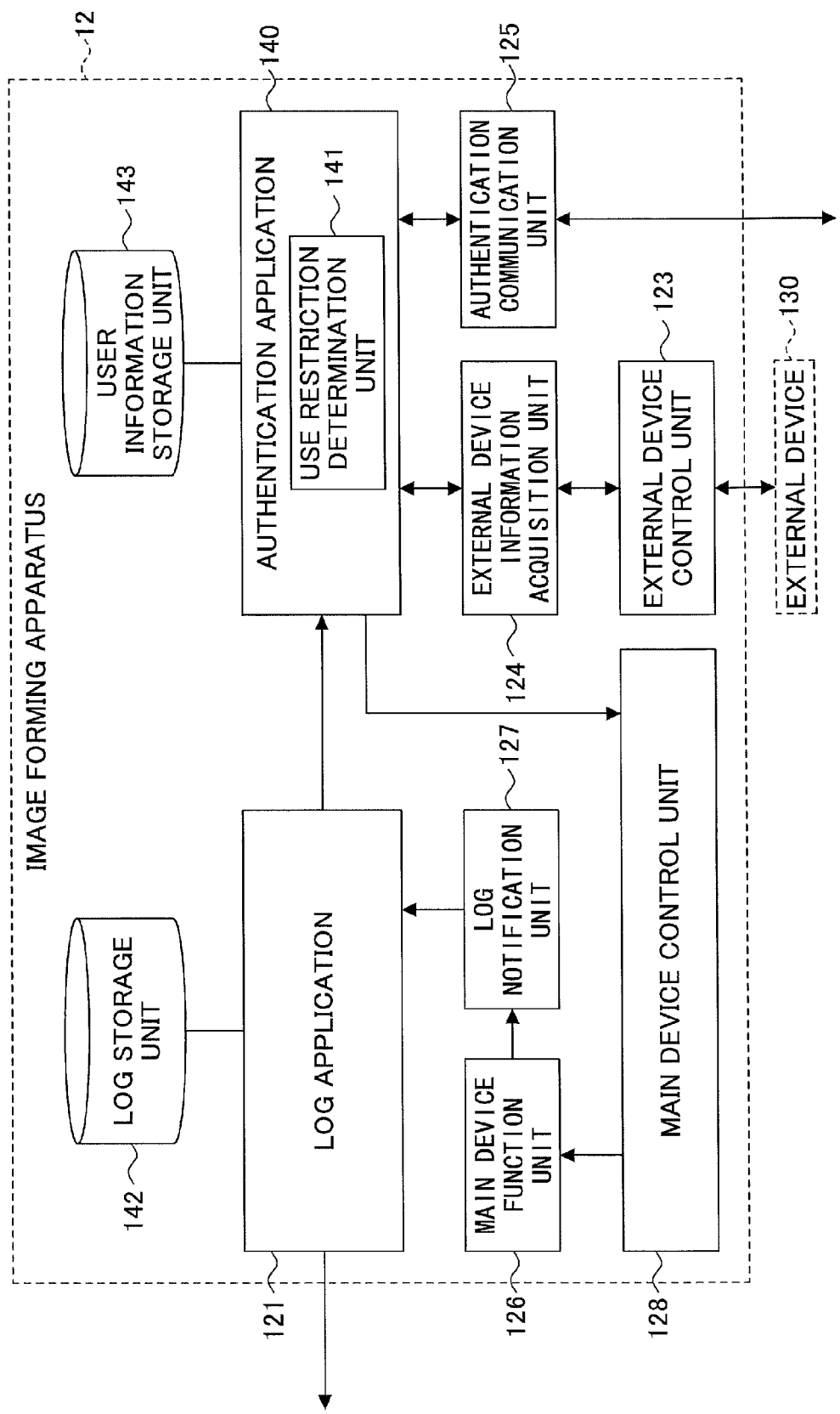
FIG. 23 is a block diagram illustrating another functional configuration of the image forming apparatus.

FIG. 23 is a block diagram illustrating another exemplary functional configuration of the image forming apparatus 12. The image forming apparatus 12 of FIG. 23 includes the log application 121, the external device control unit 123, the external device information acquisition unit 124, the authentication communication unit 125, the main device function unit 126, the log notification unit 127, main device control unit 128, and an authentication application 140. The authentication application 140 includes a use restriction determination unit 141.

The log application 121 manages operation logs received from the log notification section 127 by storing (saving) the operation logs in a log storage unit 142. The log storage unit 142 corresponds to a predetermined storage area of a storage device (e.g. HDD) provided in the image forming apparatus 12. Further, the log application 121 transmits to the service providing system 2, the operation logs received from the log notification part 127. In this way, the same operation logs are stored and managed in the image forming apparatus 12 and the service providing system 2.

The authentication application 140 is a functional unit that cooperates with the print service application 62 of the service providing system 2 and provides an authentication function with respect to the user of the image forming apparatus 12. The authentication application 140 displays a login screen on the operation panel of the image forming apparatus 12 and prompts input of authentication information. The authentication application 140 sends a user authentication request by transmitting the input authentication information to the print service application 62 via the authentication communication unit 125.

As a result, the authentication application 14, receives the authentication result as a response from the print service application 62. At this time, when the user is successfully authenticated, the authentication application 140 acquires as the authentication result, the user information as illustrated in FIG. 20 that is managed by the service providing system 2.

The authentication application 140 stores (saves) the acquired user information in the user information storage unit 143. The user information storage unit 143 may correspond to a predetermined storage area of a storage device (e.g. HDD) of the image forming apparatus 12, for example.

The use restriction determination unit 141 of the authentication application 140 determines whether it is necessary to implement a use restriction with respect to the authenticated user. The log application 121 passes the log operation received from the log notification unit 127 to the use restriction determination unit 141 in page units. Based on the received operation log, the use restriction determination unit 141 updates the cumulative consumption value quantitatively indicating the cumulative consumption of previously requested operations to the latest current value. The use restriction determination unit 141 determines whether it is necessary to implement a use restriction by comparing the updated current value (latest cumulative consumption) with the pre-set upper limit (use restriction value) related to consumption.

Based on the determination result of the determination as to whether a use restriction has to be implemented, the use restriction determination unit 141 of the authentication application 140 may instruct the main device function unit 126 to stop operation of the function used on a page-by-page basis via the main device control unit 128.

The current value and the upper limit value are included in the user information the authentication application 140 receives from the service providing system 2 as the authentication result. That is, the authentication application 140 accesses the user information storage unit 143 and updates the current value included in the user information of the authenticated user. Further, the use restriction determination unit 141 accesses the user information storage unit 143, refers to the upper value included in the user information of the authenticated user, and determines whether it is necessary to implement a use restriction.

Note that in addition to performing user authentication based on authentication information input from a login screen, the authentication application 140 may also perform user authentication based on authentication information acquired by the external device information acquisition unit 124. The main device control unit 128 may stop operation of the main device function unit 126 (function used) according to the instruction from the use restriction determination unit 141 of the authentication application 140.

Figure 24:
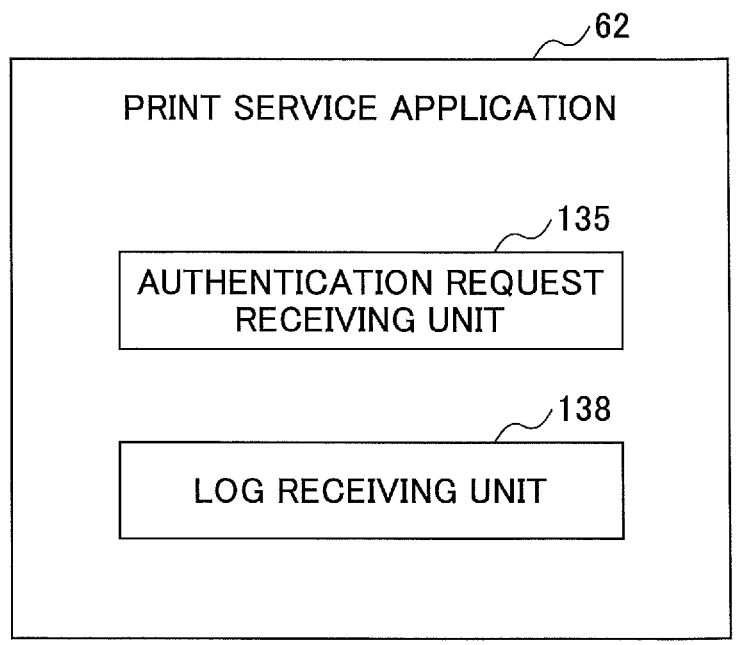
FIG. 24 is a block diagram illustrating another functional configuration of the print service application.

Further, to enable the process for implementing a use restriction on a device function of the image forming apparatus 12 in the information processing system 1 according to the present embodiment, the print service application 62 may be configured to include the functional features as illustrated in FIG. 24, for example.

FIG. 24 is a block diagram illustrating another exemplary configuration of the print service application 62. In FIG. 24, the print service application 62 includes the authentication request receiving unit 135 and the log receiving unit 138. Note that the block diagram of FIG. 24 illustrates functional units necessary for describing the process for implementing a use restriction on a device function of the image forming apparatus 12.

The authentication request receiving unit 135 receives a request for user authentication based on authentication information (user ID, password, etc.) transmitted from the image forming apparatus 12. The authentication request receiving unit 135 requests the user device authentication portion 78 of the platform 52 to perform authentication according to the user authentication request from the image forming apparatus 12. If the user is successfully authenticated, the authentication request receiving unit 135 returns to the image forming apparatus 12 user information as illustrated in FIG. 20 together with the authentication result. Further, the log receiving unit 138 receives a log from the image forming apparatus 12 and manages the log. For example, the log receiving unit 138 may manage the log by storing the log in the data storage unit 93.

In the following, a description is given of a user authentication process and a use restriction process that are performed in order to implement a use restriction on a device function of the image forming apparatus 12 in the information processing system 1 according to the present embodiment.

Figure 25:
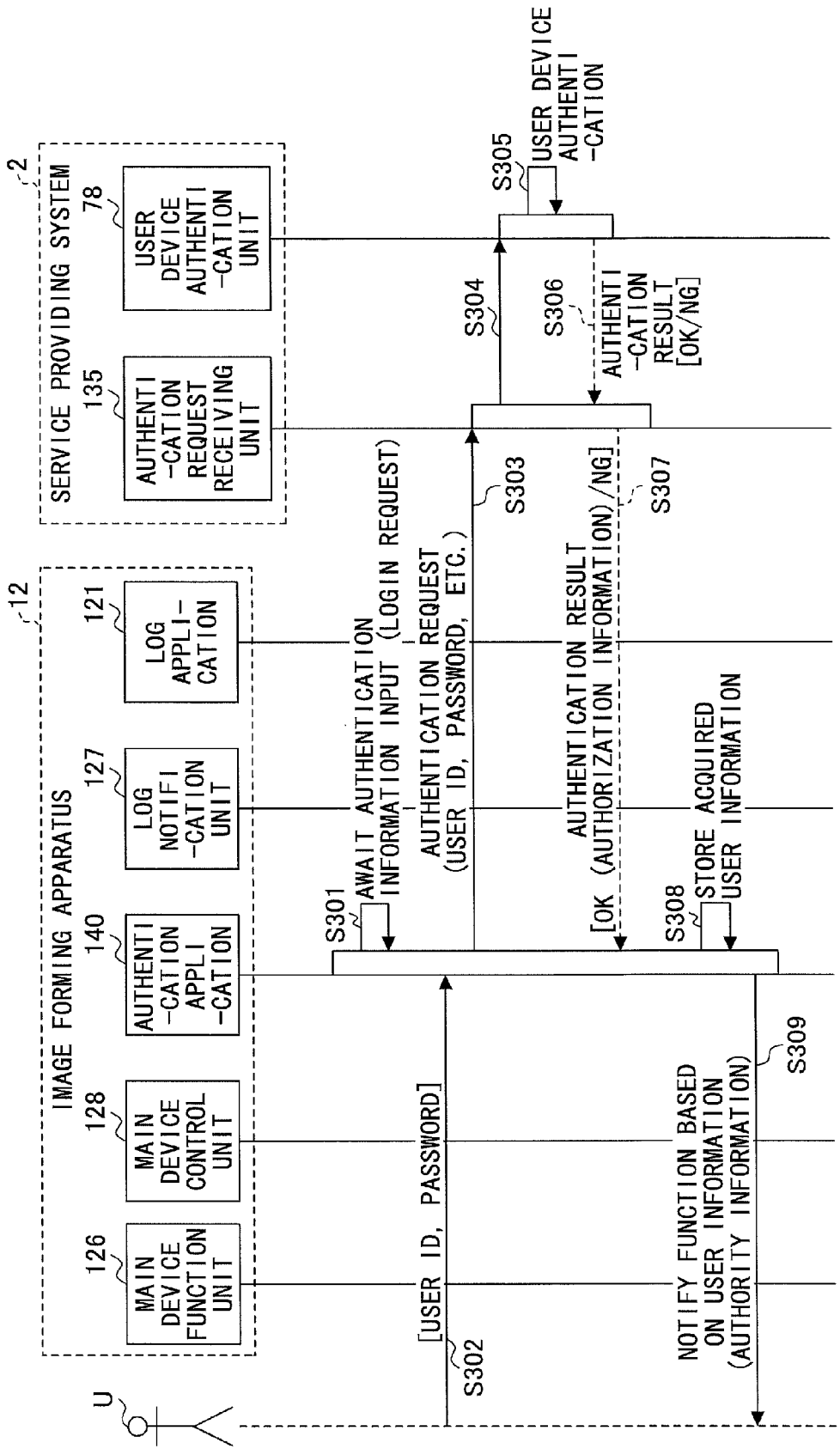
FIG. 25 is a sequence chart illustrating another example of a user authentication process.

FIG. 25 is a sequence chart illustrating another exemplary user authentication process. In the information processing system 1 according to the present embodiment, the user authentication process as described below is performed by the image forming apparatus 12 and the service providing system 2.

In step S301, the authentication application 140 of the image forming apparatus 12 displays a login screen on the operation panel and waits for input of authentication information from the user U. In step S302, the authentication application 140 receives an input of authentication information by the user U from the login screen.

In step S303, the authentication application 140 makes a user authentication request by transmitting to the service providing system 2 the input authentication information and authentication information such as a tenant ID and device ID stored in its own storage area. Note that process steps S304-S306 are substantially identical to steps S104-S106 of FIG. 21.

In step S307, the authentication request receiving unit 135 returns the authentication result to the authentication application 140 of the image forming apparatus 12. If the user is successfully authenticated, the authentication request receiving unit 135 sends the user information as illustrated in FIG. 20 together with the authentication result to the authentication application 140 of the image forming apparatus 12.

If the user is successfully authenticated, in step S308, the authentication application 140 stores the acquired user information in the user information storage unit 143. Then, in step S309, based on the values set up in the user information stored in the "authorized use" information item, the authentication application 140 displays a use authorized function screen notifying the user U of the functions the user U is authorized to use after authentication. On the other hand, if the user U is not authenticated, the authentication application 140 displays an authentication error screen on the operation panel.

By implementing the above process steps in the information processing system 1, the user U may log into the image forming apparatus 12 and use a device function of the image forming apparatus 12.

Figure 26:
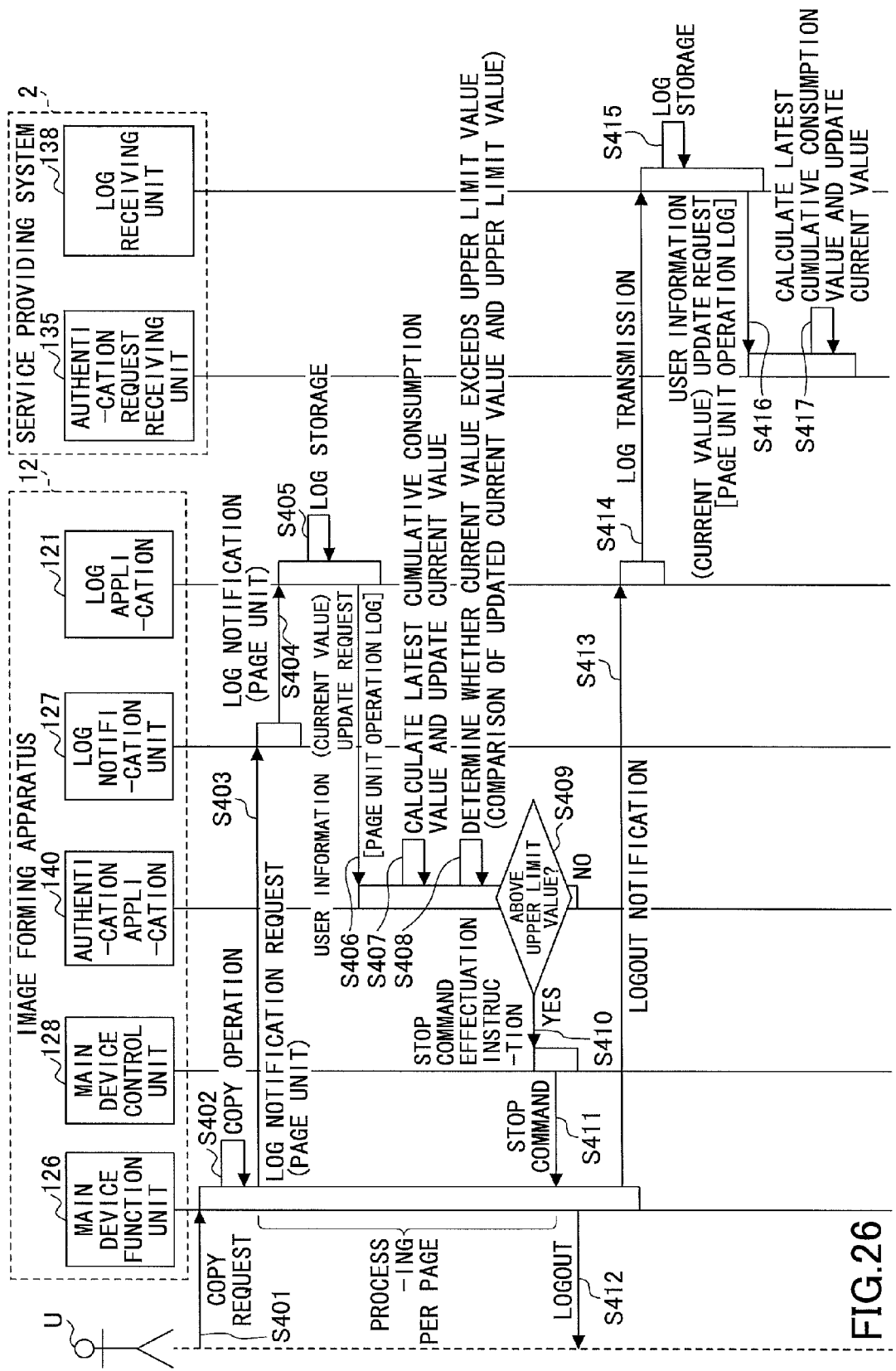
FIG. 26 is a sequence chart illustrating another example of a user authentication process.

FIG. 26 is a sequence chart illustrating another exemplary use restriction process. In the information processing system 1 according to the present embodiment, the use restriction process as described below is performed by the image forming apparatus 12 and the service providing system 2.

Note that process steps S401-S404 are substantially identical to process steps S201-S204 of FIG. 22. In step S405, the log application 121 stores logs that have been issued and notified in the log storage unit 142.

In step S406, the log application 121 requests the authentication application 140 to update the value of the "current value (cumulative consumption)" included in the user information stored in the user information storage unit 143. That is, the log application 121 requests the authentication application 140 to update the user information by passing a log in page units to the authentication application 140.

In step S407, based on the log received in page units, the use restriction determination unit 141 of the authentication application 140 calculates the latest cumulative consumption value including the consumption resulting from the one-page copying operation that has been executed and updates the value of the current value (cumulative consumption) information item to the latest cumulative consumption value.

That is, based on the values set in the resource consumption information included in the log and the values set in the "consumption calculation factor" (factor K) of FIG. 20, the use restriction determination unit 141 calculates the consumption per page resulting from execution of the copying operation (value to be added to the current cumulative consumption value).

In step S408, the use restriction determination unit 141 determines whether the updated current value (latest cumulative consumption) exceeds the pre-set value of the "upper limit (use restriction value)" of the use restriction information included in the user information. By comparing the updated current value (latest cumulative consumption) with the pre-set upper limit (use restriction value) related to consumption, set a (use restriction value), use restriction determination unit 141 may determine whether a user restriction has to be implemented.

If the updated current value does not exceed the upper limit (NO in step S409), the use restriction determination unit 141 determines that there is no need to implement a use restriction with respect to the copy function, and the use restriction determination unit 141 continues processing the next page. On the other hand, if the updated current value exceeds the upper limit (YES in step S409), the use restriction determination unit 141 determines that it is necessary to implement a use restriction with respect to the copy function.

If it is determined that it is necessary to implement a use restriction, in step S410, the usage restriction determination unit 141 instructs the main device control unit 128 to effectuate an instruction to stop the copy function. In step S411, in response to the instruction from the use restriction determination unit 141, the main device control unit 128 instructs the main device function unit 126 to stop operation.

Thus, in the image forming apparatus 12 of the present embodiment, a use restriction may be implemented with respect to a device function in page units based on an operation log for each page regarding the execution of a device function according to a function use request from an authenticated user U.

In step S412, after stopping the copy function, the main device function unit 126 displays a screen for notifying logout (logout screen) on the operation panel. In step S413, the main device function unit 126 further notifies the log application 121 of the logout.

In step S414, in response to the notification of the logout, the log application 121 transmits to the print service application 62 of the service providing system 2 the logs that have been stored in the log storage unit 142 in page units.

In step S415, the log receiving unit 138 of the print service application 62 stores the received logs. In step S416, the log receiving unit 138 requests the authentication request receiving unit 135 to update the value of the "current value (cumulative consumption value)" included in the user information stored in the user information storage unit 143.

In step S417, based on the received logs in page units, the authentication request reception unit 135 calculates the latest cumulative consumption value including the consumption resulting from the copying operation that has just been executed and updates the value of the "current value (cumulative consumption value)". Thus, in the information processing system 1, unified management of the user information held by the image forming apparatus 12 and the user information held by the service providing system 2 may be enabled.

In the information processing system 1 according to the present embodiment, whether a use restriction has to be implemented may be determined at the image forming apparatus 12, and the time required for effectuating an instruction for stopping operation of the main device function unit 126 (function used) in page units may be reduced, for example.

<<Process Supporting Determination of Cost Reduction Factors>>

In the following an exemplary process supporting the determination of cost reduction factors in the information processing system 1 is described. In order to implement a process supporting the determination of cost reduction factors in the information processing system 1 of the present embodiment, the print service application 62 may have a functional configuration as illustrated in FIG. 27, for example.

Figure 27:
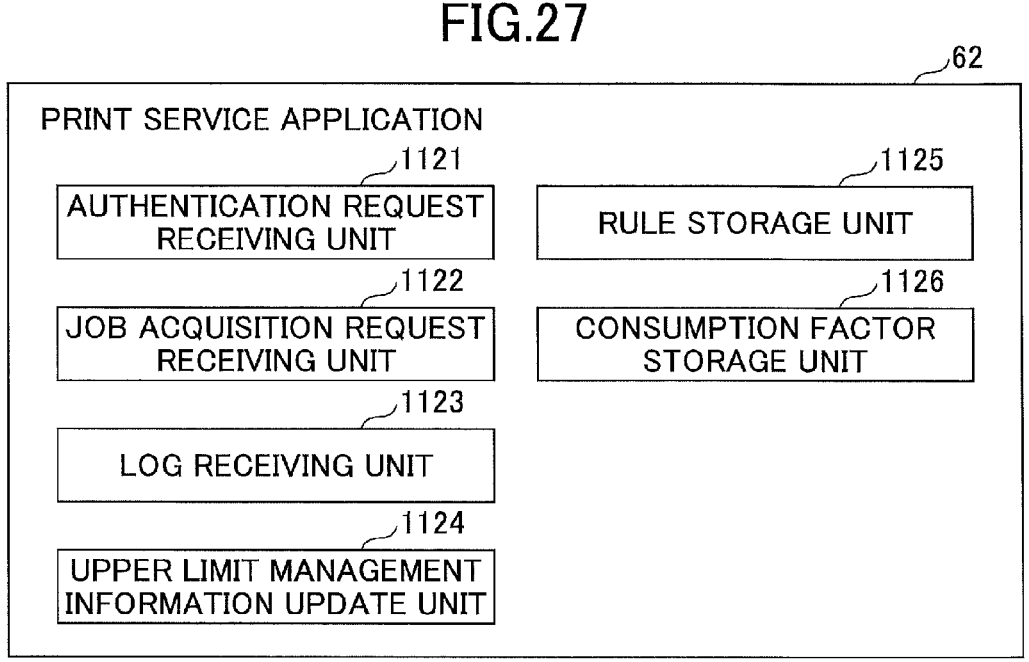
FIG. 27 is a block diagram illustrating another exemplary functional configuration of the print service application.

FIG. 27 is a block diagram illustrating another exemplary functional configuration of the print service application 62. In FIG. 27, the print service application 62 includes an authentication request receiving unit 1121, a job acquisition request receiving unit 1122, a log receiving unit 1123, an upper limit management information update unit 1124, a rule storage unit 1125, and a consumption factor storage unit 126. Note that the block diagram of FIG. 27 illustrates functional elements necessary for describing the process supporting the determination of cost reduction factors.

The authentication request receiving unit 1121 receives an authentication request from the image forming apparatus 12 from which login has been attempted by the user. The authentication request receiving unit 1121 issues a request to the user device authentication unit 78 of the platform 52 to execute authentication according to the authentication request from the image forming apparatus 12. If the user is successfully authenticated, the authentication request receiving unit 1121 returns to the image forming apparatus 12 upper limit management information and rule information of the user that has been successfully authenticated. The upper limit management information of the user may be stored in the management information storage unit 91, for example. Note that the upper limit management information and the rule information are described in detail below.

The job acquisition request receiving unit 1122 receives a print job request from the image forming apparatus 12, and based on the received print job, returns a list of print jobs associated with the user that has sent the print job request. Also, the job acquisition request receiving unit 1122 transmits to the image forming apparatus 12 a print job that has been selected by the user from the list of print jobs.

The log receiving unit 1123 receives from the image forming apparatus 12 log information relating to a print job executed in the image forming apparatus 12, and stores the received log information in the data storage unit 93, for example. The upper limit management information update unit 1124 updates a consumption of points in the upper limit management information based on the log information and a consumption factor. Note that the log information and the consumption factor are described in detail below. The rule storage unit 125 stores the rule information. The consumption factor storage unit 126 stores the consumption factor.

Figure 28:
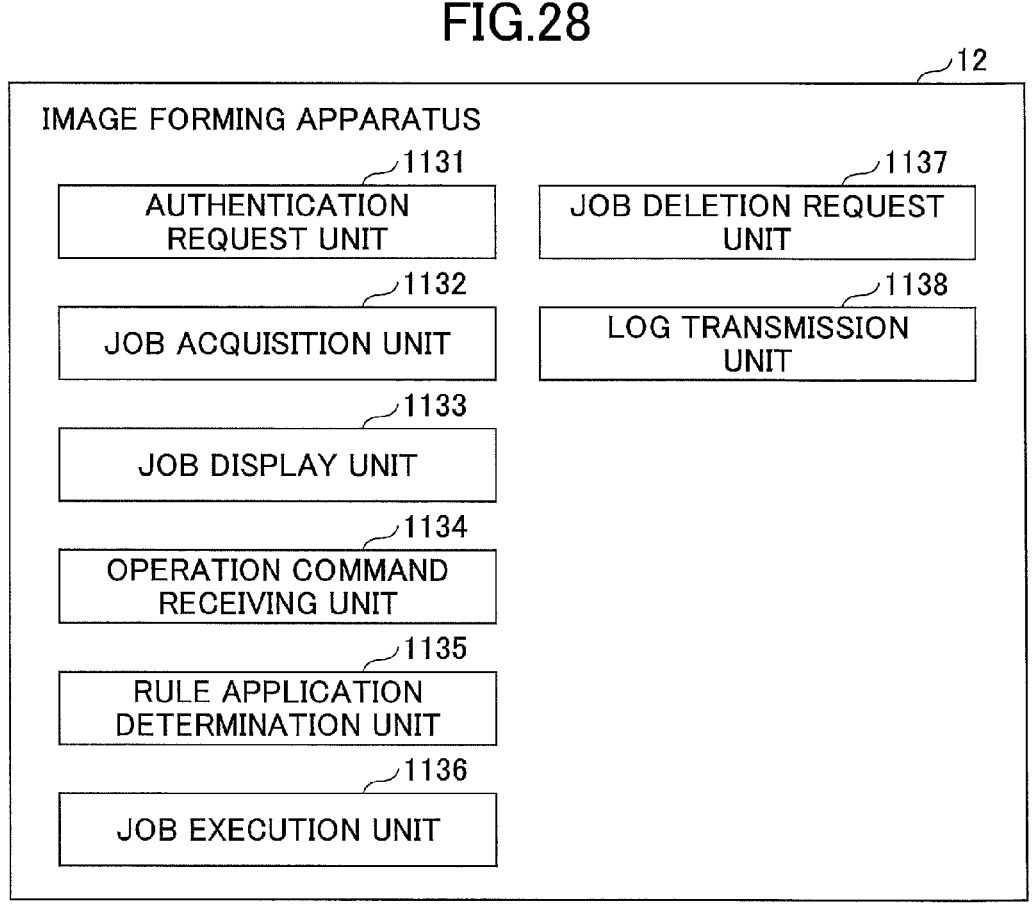
FIG. 28 is a block diagram illustrating another exemplary functional configuration of the image forming apparatus.

Further, in order to implement a process supporting the determination of cost reduction factors in the information processing system 1 of the present embodiment, the image forming apparatus 12 may be arranged to have a functional configuration as illustrated in FIG. 28, for example.

FIG. 28 is a block diagram illustrating another exemplary functional configuration of the image forming apparatus 12. In FIG. 28, the image forming apparatus 12 includes an authentication request unit 1131, a job acquisition unit 1132, a job display unit 1133, an operation command receiving unit 1134, a rule application determination unit 1135, a job execution unit 1136, a job deletion request unit 1137, and a log transmission unit 1138. Note that the block diagram of FIG. 28 illustrates functional elements necessary for describing the process supporting the determination of cost reduction factors.

The authentication request unit 1131 sends a request to the print service application 62 of the service providing system 2 to perform authentication based on authentication information entered by the user. If the authentication is successful, the authentication request unit 1131 receives upper limit management information and rule information from the print service application 62. The job acquisition unit 1132 sends a print job request to the print service application 62 and receives a list of print jobs or a print job from the print service application 62. The job display unit 1133 displays the received list of print jobs at an operation panel.

The operation command receiving unit 1134 receives an operation command input (e.g. execution command or deletion command) with respect to a print job included in the list of print jobs. The rule application determination unit 1135 determines whether a rule has to be applied to a print job selected for execution based on the consumption of points by the user, setting information (print conditions) of the print job, and rule information. Note that the rule application determination unit 1135 may determine the rule to be applied as is necessary.

Rule application may refer to rewriting (changing) the setting value of at least some setting included in the setting information of a print job, for example. The job execution unit 1136 applies a rule to the print job to be executed if necessary and executes the print job.

The job deletion request unit 1137 sends a print job deletion request for deleting a selected print job to the print service application 62 of the service providing system 2 in a case where deletion of a print job is instructed. The log transmission unit 1138 generates log information related to operation (e.g. execution or deletion) of a print job and sends the generated log information to the print service application 62 of the service providing system 2.

FIG. 29 is table illustrating an exemplary data configuration of the upper limit management information. The upper limit management information includes, as data items, "tenant ID", "user ID", "authority information", "upper limit value", and "consumption". The "tenant ID" and "user ID" are used as identification information of the user. The "authority information" corresponds to an identifier of a job or a function that a user is authorized to execute or use. The "upper limit value" corresponds to an upper limit of points assigned to a user. The "consumption" corresponds to the consumption of points by the user. The "consumption" may be periodically initialized to "0" (e.g. 1 month intervals). In this case, the upper limit value represents points assigned to a user during a certain period.

As described above, the upper limit management information includes the upper limit value corresponding to a parameter (referred to as "points" hereinafter) that is consumed (reduced in value) according to use of the image forming apparatus 12 and the current consumption of points. That is, each user is authorized to use the image forming apparatus 12 within a scope defined by an upper limit value assigned to each user. Basically, the consumption of points is determined by the setting information of the jobs executed by the image forming apparatus 12.

FIG. 30 is a table illustrating an exemplary data configuration of the rule information. As illustrated in FIG. 30, the rule information may be set up with respect to each tenant ID, for example. Note, however, that instead of setting up the rule information with respect to each tenant ID, a common set of rule information may be set up in the service providing system 2.

The rule information stores candidate rules to be applied according to the consumption rate of points. The consumption rate of points refers to the rate of consumption with respect to the upper limit value. That is, the consumption rate is an exemplary representation of the relationship between the upper limit value and the consumption.

In FIG. 30, for a case where the consumption rate is 80% or more, a rule (restriction) referred to as "mandatory two sides" is indicated as a candidate rule to be applied. For a case where the consumption rate is 90% or more, a rule referred to as "mandatory black & white" is indicated as a candidate rule to be applied. For a case where the consumption rate is 100%, a rule referred to as "mandatory deletion" is indicated as the candidate rule to be applied.

"Mandatory two sides" refers to a rule that calls for mandatory selection of two sides printing as one of the print settings included in the setting information of a print job. "Mandatory black & white" refers to a rule that calls for mandatory implementation of black & white printing with respect to a color mode for printing included as one of the print settings included in the setting information of the print job. "Mandatory deletion" refers to a rule that calls for mandatory deletion of the print job from the service providing system 2.

Note that at a relatively higher consumption rate, a candidate rule for a relatively lower consumption rate may also be applied. For example, in the rule information of FIG. 30, when the consumption rate is 90%, "mandatory two sides" may be another candidate rule to be applied in addition to "mandatory black & white".

Thus, in the following descriptions, it is assumed that a rule according to a consumption rate includes the rule set up for the relevant consumption rate as well as rules set up for consumption rates that are lower than the relevant consumption rate. Note, also, that rules may be set up with respect to settings other than two sides printing or color mode such as combining, for example. In this case, the rules are preferably set up with respect to settings that are related to or have an impact on consumption of consumable resources such as toner or paper.

Note that the term "candidate" is used in connection with the rules because the rules according to the consumption rate of the points of users may not necessarily be applied with respect to print jobs. That is, whether the rules are actually applied to the print jobs may depend on the setting information of the print jobs.

For example, "mandatory black & white" is not a valid rule (invalid) with respect to a print job having black & white printing designated in its setting information in the first place. Thus, in this case, even if the consumption rate of the user is 81%, for example, the "mandatory black & white" rule is not applied to the print job. Note that in the present embodiment, it is assumed that the rule information is common to all users associated with a common tenant ID. However, in some embodiments, the rule information may be set up with respect to each user, for example.

As described above, the rule information represents a rule or restriction to be applied in connection with the use of the image forming apparatus 12 (e.g. execution of print jobs) according to the relationship between the upper limit value of points and the consumption of points.

FIG. 31 is a table illustrating examples of consumption factors. As illustrated in FIG. 31, the consumption factor is a factor used for calculating the consumption of points for printing one page. The consumption factor is set up according to each value of setting items of setting information of a print job (for each value of the setting item). For example, in FIG. 31, consumption factors "3.0", "1.0", "1.0" and "2.0" are respectively set up for the setting items "color", "black & white", "A4", and "A3".

For example, in the case of color printing on A4 size paper, the consumption of points per page is 3.0×1.0=3.0. If the print job is two pages, the consumption of points is 2×3.0=6.0. The consumption of the points calculated in this manner is added to the current consumption of points in the upper limit management information of the user by the upper limit management information update unit 1124.

FIG. 32 illustrates an example of log information relating to a print job. Note that the log information of FIG. 32 is described in XML (eXtensible Markup Language) format. However, the log information may be described by other formats. In XML, content between a start tag and an end tag is referred to as an element. The tag name of the start tag is used as the name of the element.

In the log information of FIG. 32, accountLog element Er1 element is the root element. The accountLog element Er1 includes attributes such as endTime and startTime. The value of the startTime attribute is the date/time the log information is first recorded after the user logs in. However, the value of the startTime attribute may alternatively be the login date/time of the user. The value of the endTime attribute is the date/time the log information is last recorded. For example, the value of the endTime attribute may be updated each time log information is recorded. However, the value of endTime attribute may alternatively be a logout date/time of the logged-in user.

The accountLog element Er1 includes one user element Eu1, and a plurality of account elements Eac1-Eac5 as child elements. The value of the name attribute of the user element Eu1 "aaa" represents the user name; i.e., the user name of the logged-in user.

The account element includes a type attribute, a rule attribute, and a del attribute. The value of the type attribute indicates the type of job. The value "print" represents a print job. The value of the rule attribute indicates the rule applied using the values 1-4. That is, "1" represents "mandatory black & white", "2" represents "mandatory two sides", "3" represents "mandatory black & white" and mandatory two sides", and "4" represents "mandatory deletion". The value of the del attribute del indicates the form of the deletion when the print job is deleted. That is, "1" represents deletion based on an instruction by the user, and "2" represents mandatory deletion; i.e., deletion through application of the rule "mandatory deletion".

The account element includes an attributes element and a quantities element as child elements. For example, account element Eac1 element includes an attributes element Eat1 and a page element Ep1. The attributes element indicates the setting information of the print job and includes as child elements attribute elements corresponding to the setting items of the setting information of the print job. The attribute element contains a value attribute and a code attribute as child attributes. The value of the code attribute indicates the identifier of the setting item.

In FIG. 32, "color", "twosides", or "size" is indicated as a value of the code attribute. The above values of the code attribute respectively represent color mode, print side, and paper size. The value of the value attribute represents the value of a setting item (setting).

With respect to the code attribute value "color", "1" represents black and white printing, and "2" represents the color printing. With respect to "twosides", "0" represents the front side when one side printing is designated, "1" represents the front side when two sides printing is designated, and "2" represents a the back side when two sides printing is designated. With respect to paper size, "1" represents A4, and "2" represents A3. If the rule is applied, the value of the value attribute indicates the value after the change of settings resulting from the application of the rule. Also, the value of the page element indicates the number of pages that have been deleted or printed.

Note that the account element may be recorded with respect to every print job, or the account element may be recorded with respect to every case where the attribute value of each account element and the attribute value of each attribute element are matching. In the latter case, the number of pages that have been deleted or printed in response to the deletion or execution of print jobs with matching attribute values for the account element and matching attribute values for the attribute element may be added to the value of the page element.

Note that the account element Eac1 corresponds to log information indicating the execution of a print job having the mandatory black & white rule applied thereto. The account element Eac2 corresponds to log information indicating the deletion of a print job based on an instruction from a user that is issued in response to the application of the mandatory black & white rule.

As described below, in the case where a rule is to be applied, an inquiry is made to the user regarding whether to proceed with the execution of the print job with the rule applied. If the user selects to delete the print job in response to the inquiry, log information such as that illustrated by the account element Eac2 element is recorded. The account element Eac3 is log information indicating mandatory deletion of a print job. The account element Ec4 is log information pertaining to the front sides of the print sides of a print job having the mandatory black & white rule and the mandatory two sides rule applied thereto. The account element Ec5 is log information pertaining to the back sides of the print sides of a print job having the mandatory black & white rule and the mandatory two sides rule applied thereto.

Figure 33:
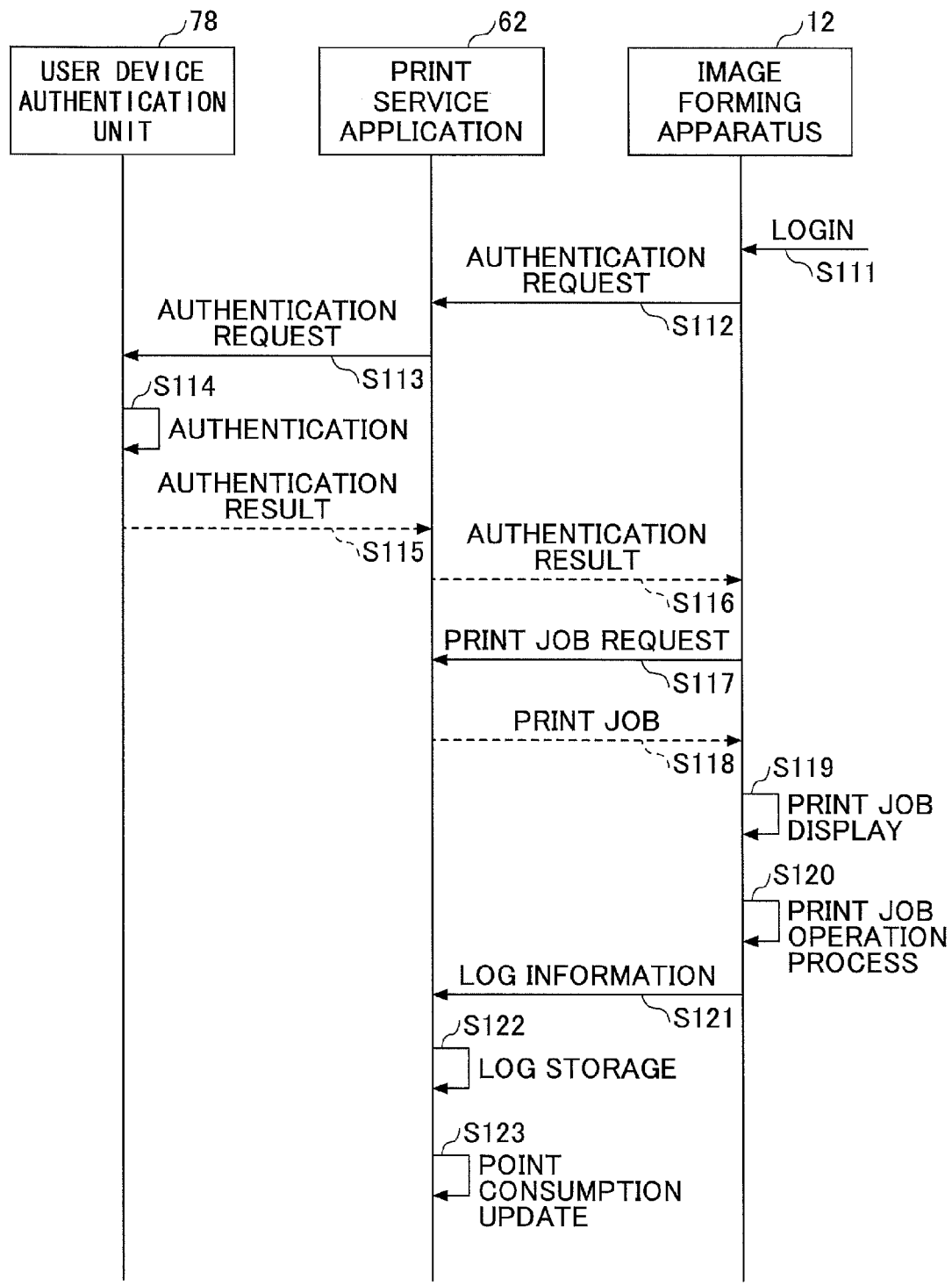
FIG. 33 is a sequence chart illustrating exemplary process steps related to a print job.

In the following, exemplary process steps related to a print job executed by the information processing system of the present embodiment are described. FIG. 33 is a sequence chart illustrating exemplary process steps related to a print job.

When operating the print job stored in the service providing system 2, the user moves to the image forming apparatus 12. In step S111, the user enters authentication information from a login screen displayed at an operation panel of the image forming apparatus 12, for example, and makes a login request.

In step S112, the authentication request unit 131 of the image forming apparatus 12 transmits to the print service application 62 of the service providing system 2 an authentication request including the authentication information (authentication information to be used for device authentication and authentication information to be used for user authentication). In step S113, the authentication request receiving unit 121 of the print service application 62 sends an authentication request including the authentication information to the user device authentication unit 78 of the platform 52.

In step S114, the user device authentication unit 78 performs authentication based on the authentication information included in the authentication request. In step S115, the user device authentication unit 78 returns an authentication result to the print service application 62. In step S116, the authentication request receiving unit 121 of the print service application 62 returns the authentication result to the image forming apparatus 12. If the authentication result indicates successful authentication, the authentication request receiving unit 121 returns to the image forming apparatus 12 rule information and upper limit management information of the authenticated user (referred to as "logged-in user" hereinafter) together with the authentication result.

If the returned authentication result indicates unsuccessful authentication, the authentication request unit 131 of the image forming apparatus 12 rejects the login of the user. Thus, in this case, step S117 and subsequent steps are not executed. On the other hand, if the returned authentication result indicates successful authentication, the authentication request unit 131 stores the rule information and the upper limit management information returned with the authentication result.

In response to successful authentication, in step S117, the job acquisition unit 1132 sends a print job request to the print service application 62 of the service providing system 2. In step S118, in response to the print job request from the image forming apparatus 12, the job acquisition request receiving unit 1122 of the print service application 62 returns a list of print jobs of the user that has made the print job request.

In step S119, the job display unit 1133 of the image forming apparatus 12 prompts the operation panel to display a screen showing the list of print jobs (hereinafter, referred to as "print job list screen"). For example, the print job list screen may include a list of job names for each print job.

In step S120, a process corresponding to an operation command input by the user is executed with respect to the print job selected by the user from the print jobs displayed in the print job list screen. For example, deletion of the print job or execution of the print job may be performed. Note that the process of step S120 is described in detail below.

In response to the execution of the process in step S120, the log transmission unit 1138 of the image forming apparatus 12 records log information related to the executed process. For example, if a print job is executed, the log information may include setting information of the print job and an identifier of a rule applied to the print job, for example. When the logged-in user logs out, in step S121, the log transmission unit 138 sends the recorded log information relating to the process executed during the user login to the print service application 62.

In step S122, the log receiving unit 123 of the print service application 62 receives the log information and stores the received login information in the data storage unit 93, for example. In step S123, the upper limit management information update unit 1124 refers to the login information and the consumption factors stored in the consumption factor storage unit 1126, and updates the consumption in the user information of the logged-in user.

Figure 34:
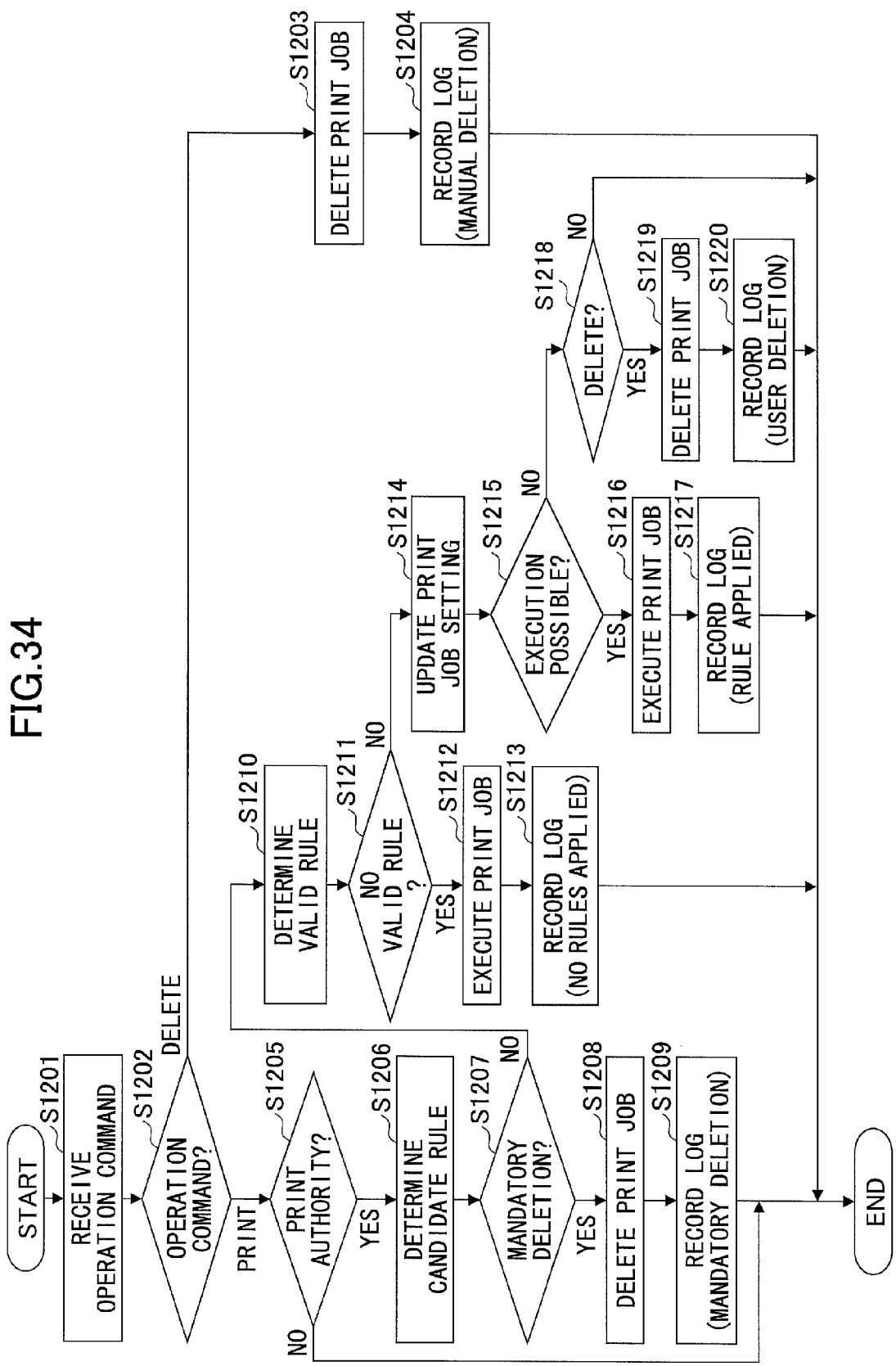
FIG. 34 is a flowchart illustrating exemplary process steps of a print job executed by the image forming apparatus according to an operation command.

In the following, the process of step S120 is described in detail. FIG. 34 is a flowchart illustrating exemplary process steps executed by the image forming apparatus 12 according to a print job operation command.

In step S1201, the operation command receiving unit 1134 receives from the user an operation command input relating to the print job selected from the print job list screen (hereinafter, referred to as "target job"). For example, execution of the target job or deletion of the target job may be selected as the operation command.

If the deletion of the target job is instructed, the job deletion request unit 1137 proceeds from step S1202 to step S1203 to have the target job deleted from the service providing system 2. Specifically, the job deletion request unit 1137 transmits a target job deletion request to the print service application 62 of the service providing system 2. The print service application 62 performs a process of deleting the target job. Subsequently, in step S1204, the log transmission unit 1138 records log information relating to the deletion of the target job in response to the operation command from the user.

In this case, because no rule is applied, an account element having "print" as the type attribute value, "0 (rule not applied)" as the rule attribute value, and "1 (deletion by user instruction)" as the rule attribute (Delete instructed by the user) "1 the del attribute value of log information is recorded. The setting information of the target job is recorded in the attributes element. Also, the number of pages of the target job is recorded in the page element.

On the other hand, if the execution of the target job is instructed, the operation command receiving unit 1134 proceeds from step S1202 to step S1205, refers to the authority information included in the upper limit management information of the logged-in user, and determines whether the logged-in user has print authority. If the logged-in user does not have print authority, the operation command receiving unit 134 rejects the execution of the target job.

If the logged-in user has print authority, in step S1206, the rule application determination unit 1135 determines a candidate rule to be applied to the target job according to the consumption rate of points of the logged-in user. Specifically, the rule application determination unit 1135 calculates the consumption rate of points of the logged-in user by dividing the consumption of points included in the upper limit management information of the logged-in user by the upper limit value.

In step S1207, the rule application determination unit 1135 determines the candidate rule to be applied by cross-checking the consumption rate of points against the rule information. For example, according to the example of FIG. 30, if the consumption rate is less than 80%, it is determined that application of a rule is unnecessary. If the consumption rate is greater than or equal to 80% and less than 90%, the mandatory two sides rule is identified as a candidate rule to be applied. If the consumption rate is greater than or equal to 90% and less than 100%, the mandatory two sides rule and the mandatory black & white rule are identified as candidate rules to be applied. If the consumption rate is 100%, the mandatory deletion rule is identified as a candidate rule to be applied.

If mandatory deletion is included in the candidate rules to be applied, the job deletion request unit 1137 proceeds from step S1207 to step S1208 to have the target job deleted from the service providing system 2. Subsequently, in step S1209, the log transmission unit 1138 records log information regarding the deletion of the target job. For example, an account element having "print" as the type attribute value, "4 (mandatory deletion)" as the rule attribute value, and "2 (mandatory deletion)" as the del attribute value is recorded as the log information.

In the case where application of the mandatory deletion rule is called for, the image forming apparatus 12 may prompt the operation panel to display a screen inquiring the user whether to allow the mandatory deletion. The image forming apparatus 12 may execute the deletion of the print job upon receiving a user input indicating approval of the deletion of the print job, and the image forming apparatus 12 may refrain from executing the deletion of the print job upon receiving a user input indicating non-approval.

If mandatory deletion is not included in the candidate rules to be applied, the rule application determination unit 1135 proceeds to step S1210 and determines the rules that are valid with respect to the setting information of the target job from the candidate rules to be applied. Note that a rule that changed the setting information of the target job upon being applied to the target job is determined to be a valid rule.

In other words, with respect to a setting item to which a rule is directed (setting item to be changed by the rule), if the value of the setting item designated by the rule differs from the value of the setting item in the setting information of the target job, the rule is determined to be a valid rule with respect to the target job. On the other hand, a rule that would not change the setting information of the target job even if it is applied thereto is determined to be an invalid rule with respect to the target job. That is, with respect to a setting item to which a rule is directed (setting item to be changed by the rule), if the value of the setting item designated by the rule is the same as the value of the setting item in the setting information of the target job, the rule is determined to be an invalid rule with respect to the target job.

If there is no valid rule, the job execution unit 1136 proceeds from step S1211 to step S1212 and executes the target job according to the original setting information of the target job. Note that a case where there is no candidate rule to be applied is also included in the case where there is no valid rule. Then, in step S1213, the log transmission unit 138 records log information relating to the execution of the target job to which no rule has been applied. For example, an account element having "print" as the type attribute value, "0 (rule not applied)" as the rule attribute value, and "0 (no deletion)" as the del attribute value is recorded as the log information.

If there is a valid rule, the job execution unit 1136 proceeds from step S1211 to step S1214 and applies the valid rule to the setting information of the target job. As a result, the setting information of the target job is changed. For example, the color mode may be changed from "black & white" to "color", or one side/two sides printing may be changed from "one side" to "two sides". Subsequently, the job execution unit 1136 sends an inquiry to the user regarding whether to allow execution of the target job after application of valid rule.

Specifically, for example, the job execution unit 1136 may have the operation panel display a screen including a list of valid rules and an input field for designating whether to allow execution of the target job with all the valid rules in the list applied thereto.

If approval of the execution of the target job is input by the user, the job execution unit 1136 proceeds from step S1215 to step S1216 and executes the target job according to the changed setting information. In step S1217, the log transmission unit 1138 record log information relating to the execution of the target job having the valid rules applied thereto. For example, an account element having "print" as the type attribute value, the value representing the applied rule as the rule attribute value, and "0 (no deletion)" as the del attribute value is recorded.

On the other hand, if disapproval (rejection) of the execution of the target job is input by the user, the job execution unit 1136 proceeds from step S1215 to step S1218 and prompts the operation panel to display a screen enabling the user to select whether to delete the target job as an inquiry. If a deletion instruction is input by the user, the job deletion request unit 1137 proceeds from step S1218 to step S1219 and deletes the target job from the service providing system 2.

Then, in step S1220, the log transmission unit 1138 records log information relating to the deletion of the target job. For example, an account element having "print" as the type attribute value, a value representing the applied rule as the rule attribute value, and "1 (deletion by user instruction)" as the del attribute value is recorded.

Note that the process of FIG. 34 may be repeated until the logged-in user logs out, and accordingly, log information relating to operations by the logged-in user may be accumulated. In step S121 of FIG. 33, the accumulated log information may be transmitted to the print service application 62 in a format as illustrated in FIG. 32, for example. However, the log transmission unit 1138 may alternatively transmit that log information each time it records the log information, for example.

Based on the log information illustrated in FIG. 32, for example, a determination or a distinction may be made between a case where a setting value for relatively low cost printing such as black and white printing or two sides printing has been set up as a result of the application of a rule and a case where the setting value has been set up voluntarily by the user.

Further, a determination or a distinction may be made between a case where a print job has been deleted as a result of the application of a rule and a case where the print job has been voluntarily deleted by the user. Also, with regard to the case where a print job has been voluntarily deleted by the user, a determination or a distinction may be made between a case where the deletion was prompted by the application of a rule and a case where the deletion was intended by the user in the first place.

Note that an exemplary case where the image forming apparatus 12 includes the rule application determination unit 1135 has been described above. However, the information processing system 1 according to the present embodiment may alternatively have some of the functions of the rule application determination unit 1135 and the job execution unit 1136 provided at the service providing system 2 side, for example. In this case, determination of candidate rules to be applied and application of valid rules to the setting information of a target job may be performed at the service providing system 2 side. Accordingly, the print job transmitted from the print service application 62 to the image forming apparatus 12 may corresponds to the target job having valid rules applied to its setting information.

<Summary>

In the information processing system 1 according to an embodiment of the present invention, a precise use restriction may be implemented with respect to a device function. Also, in the information processing system 1 according to an embodiment of the present invention, a use restriction on a device function may be controlled according to the service providing destination such as a user, an organization, or a company. Further, in the information processing system 1 according to an embodiment of the present invention, services to be provided to a service providing destination such as a user, an organization, or a company, and devices and users that are to use the services may be appropriately managed, and a use restriction may be implemented on a device function under such conditions.

Also, in the information processing system 1 according to an embodiment of the present invention, services to be provided, users that are to use the services, and devices that are to use the services may be appropriately managed, and a process supporting the determination of cost reduction factors may be implemented.

Further, the present invention is not limited to the specific embodiments described herein, and variations and modifications may be made without departing from the spirit and scope of the present invention.

For example, in the information processing system 1 according to an embodiment described above, the print service function 62 is configured to implement a function of the service providing system 2 for enabling a process of implementing a use restriction on a device function of the image forming apparatus 12. However, in other embodiments, the service applications 51 may include a use restriction service application, for example, and this use restriction service application may be configured to implement the function of the service providing system 2 for enabling a process of implementing a use restriction on a device function of the image forming apparatus 12.

Also, in the information processing system 1 according to an embodiment described above, the operation of a function used is stopped when it is determined that a use restriction has to be implemented. However, in other embodiments, some other process related to user restriction such as displaying a warning or providing notification to an administrator may be implemented instead of stopping the function, for example.

Also, in the information processing system 1 according to an embodiment described above, a use restriction is implemented in page units (on a page-by-page basis). However, in other embodiments, a use restriction may be implemented in print side units or job units, for example, or a use restriction may be implemented upon login, for example.

Also, in the information processing system 1 according to an embodiment described above, a function of the service providing system 2 for supporting the determination of cost reduction factors is implemented by the print service application 62. However, in other embodiments, the service applications 51 may include an upper limit management service application, for example, and this upper limit management service application may be configured to implement the function of the service providing system 2 for supporting the determination of cost reduction factors.

Note that the terminal apparatus 11 and the image forming apparatus 12 are exemplary embodiments of a service using apparatus of the present invention. The portal service application 61 is an exemplary embodiment of an authentication information receiving unit of the present invention. The user authentication unit 77 and the user device authentication unit 78 are exemplary embodiments of an authentication unit of the present invention. The portal service application 61 is an exemplary embodiment of a service identification unit of the present invention. The print service application 62, the data process control unit 81, the process queues 82, the data process request units 83, and the data processing units 84 are exemplary embodiments of an execution unit of the present invention. The log receiving unit 138 is an exemplary embodiment of a log receiving unit of the present invention. The use restriction determination units 136 and 141 are exemplary embodiments of a use restriction determination unit of the present invention. The stop command effectuation instruction unit 137 is an exemplary embodiment of a stop instruction unit. The authentication application 140 is an exemplary embodiment of an information receiving unit of the present invention. The main device control unit is an exemplary embodiment of a stop unit of the present invention. The log application 121 is an exemplary embodiment of a log transmission unit of the present invention.

Also, according to an embodiment of the present invention, a service providing system is provided that includes one or more information processing apparatuses and is configured to provide a service to a service using apparatus connected to the service providing system via a network. The service providing system includes a management information storage unit configured to store management information including an association between service identification information of the service to be provided, user identification information of a user using the service, and device identification information of the service using apparatus; an authentication information receiving unit configured to receive from the service using apparatus user authentication information used for user authentication and/or device authentication information used for device authentication as authentication information; an authentication unit configured to execute an authentication process on the received authentication information; a service identification unit for identifying the service associated with the authentication information based on the authentication information and the management information in a case where the authentication information is authenticated; an execution unit configured to execute a process according to a use request for using the identified service upon receiving the use request for using the identified service from the service using apparatus; a log receiving unit configured to receive from the service using apparatus that has authenticated the authentication information an operation log of a function executed at the service using apparatus; a use restriction determination unit (rule application determination unit) configured to determine whether to implement a use restriction with respect to the function executed at the service using apparatus based on the operation log; and a stop instruction unit (rule information application unit) configured to instruct the service using apparatus to stop execution of the function based on a result of the determination.

Note that the use restriction determination unit is an example of a rule application determination unit. Also, the instruction to stop execution of the function executed at the service using apparatus is an example of rule information, and the stop instruction unit is an example of a rule information application unit.

According to a further embodiment, the user restriction determination unit may be configured to update a cumulative consumption value (use history information) quantitatively indicating a cumulative consumption by functions previously executed at the service using apparatus based on the operation log, and determine whether to implement the use restriction with respect to the function executed at the service using apparatus by comparing the updated cumulative consumption value with a pre-set upper limit value (usage upper limit) related to consumption.

According to a further embodiment, the use restriction determination unit may be configured to calculate a consumption by the function executed at the service using apparatus based on resource consumption information, which relates to consumption of resources by the function executed at the service using apparatus and is included in the operation log, and a consumption calculation factor for calculating the consumption based on the resource consumption information.

According to a further embodiment, the cumulative consumption value, the upper limit value, and the consumption calculation factor may be set up in association with the user identification information.

According to a further embodiment, the log receiving unit may be configured to receive the operation log from the service using apparatus in page units, print side units, or job units; and the use restriction determination unit may be configured to determine whether to implement the use restriction with respect to the function executed at the service using apparatus in page units, print side units, or job units based on the operation log.

Note that the present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2013-155173, filed on Jul. 26, 2013, and Japanese Patent Application No. 2013-157009, filed on Jul. 29, 2013, the entire contents of which are hereby incorporated herein by reference.

What is claimed is:

1. A service providing system comprising:
one or more information processing apparatuses configured to provide a service to a service using apparatus connected to the service providing system via a network; and
one or more memories containing instructions that cause the one or more information processing apparatuses to:
store management information including an association between service identification information of the service to be provided, user identification information of a user using the service, and device identification information of the service using apparatus;
receive authentication information from the service using apparatus, the authentication information including at least one of user authentication information used for user authentication and device authentication information used for device authentication;
process on the received authentication information;
identify the service associated with the authentication information based on the authentication information and the management information in a case where the authentication information is authenticated;
execute a process according to a use request for the identified service upon receiving the use request for the service from the service using apparatus;
determine rule information to be applied to the user based on use history information of the service stored in association with the user identification information, and rule information to be applied to the process associated with the use request for the service according to the use history information;
apply the determined rule information to the process associated with the use request for the service; and
store a record of the rule information applied to the process associated with the use request for the service;
store license information including an association between first service identification information of the service identification information and registration information, the first service identification information identifying a first service and including a license for the first service, and the registration information being used for registering the first service identification information as the service to be provided;
receive a registration request including the first service identification information and the registration information, and execute a license authentication process based on the license information and the first service identification information and the registration information included in the received registration request; and
register the received first service identification information as the service to be provided in the management information in a case where a validity of the registration request is verified by the license authentication process.

2. The service providing system according to claim 1, wherein the instructions cause the one or more information processing apparatuses to determine rule information to be applied to setting of the process associated with the use request for the service from the user based on an amount of usage of the service and a usage upper limit for the service that are stored in association with the user identification information, and rule information to be applied to the setting of the process associated with the use request for the service according to a relationship between the amount of usage of the service and the usage upper limit for the service that are stored in association with the user identification information.

3. The service providing system according to claim 2, wherein the instructions cause the one or more information processing apparatuses to store, with respect to each setting of the process associated with the use request for the service, a record of the rule information applied to the setting of the process associated with the use request for the service.

4. The service providing system according to claim 3, wherein the instructions cause the one or more information processing apparatuses to store, with respect to the setting of the process associated with the use request for the service, information for identifying whether the setting corresponds to a changed setting that has been changed from a setting previously set up by the user as a result of application of the rule information.

5. The service providing system according to claim 1, wherein the instructions cause the one or more information processing apparatuses to determine a cancellation of the process associated with the use request for the service from the user, the determination being based on an amount of usage of the service and a usage upper limit for the service that are stored in association with the user identification information, and rule information for prompting cancellation of the process associated with the use request for the service according to a relationship between the amount of usage of the service and the usage upper limit for the service that are stored in association with the user identification information.

6. The service providing system according to claim 5, wherein the instructions cause the one or more information processing apparatuses to store, with respect to the cancellation of the process associated with the use request for the service, information identifying whether the cancellation is instructed by the user, or whether the cancellation results from application of the rule information.

7. The service providing system according to claim 1, wherein
the use history information includes an amount of usage of the service and a usage upper limit for the service that are set up with respect to each user; and
when the process associated with the use request for the service is executed, a different amount is added to the amount of usage of the service according to setting information of the process associated with the use request for the service.

8. The service providing system according to claim 1, wherein the instructions cause the one or more information processing apparatuses to
store first user identification information and second user identification information as the user identification information of a user logging into the service using apparatus;
receive from the service using apparatus first user authentication information or second user authentication information that is authenticated by another authentication apparatus as the user authentication information used for user authentication;
execute a user authentication process based on the first user authentication information and the first user identification information in a case where the first user authentication information is received; and
execute a user authentication process based on the second user authentication information and the second user identification information in a case where the second user authentication information is received.

9. The service providing system according to claim 1, wherein the instructions cause the one or more information processing apparatuses to
store third user identification information as the user identification information of a user logging into an external service connected to the service providing system via a network; and
execute a login process for logging into the external service based on the third user authentication information of the authenticated user in a case where the process associated with the user request for the service includes a cooperative process with the external service.

10. The service providing system according to claim 1, wherein the instructions cause the one or more information processing apparatuses to:
store execution request information of the process associated with the use request for the service according to a specific process of the process;
register the execution request information for executing the process associated with the use request for the service according to the specific process in response to the use request for the service; and
execute a data process corresponding to the specific process based on the stored execution request information;
wherein in a case where there is a next data process to be executed after execution of the data process, register execution request information of the next data process according to a specific process of the next data process.

11. The service providing system according to claim 10, wherein the instructions cause the one or more information processing apparatuses to execute a data process of generating a plurality of sets of execution request information based on the stored execution request information, and register the generated execution request information as the execution request information of the next data process.

12. An information gathering method comprising:
providing, by a service providing system that includes one or more information processing apparatuses and that is connected to a service using apparatus via a network, a service to the service using apparatus via the network;
a management information storage step of storing management information including an association between service identification information of the service to be provided, user identification information of a user using the service, and device identification information of the service using apparatus;
an authentication information receiving step of receiving authentication information from the service using apparatus, the authentication information including at least one of user authentication information used for user authentication and device authentication information used for device authentication;

an authentication step of executing an authentication process on the received authentication information;

a service identification step of identifying the service associated with the authentication information based on the authentication information and the management information in a case where the authentication information is authenticated; and an execution step of executing a process according to a use request for the service identified in the service identification step upon receiving the use request for the service from the service using apparatus; wherein the execution step includes:

a rule application determination step of determining rule information to be applied to the user based on use history information of the service stored in association with the user identification information, and rule information to be applied to the process associated with the use request for the service according to the use history information;

a rule information application step of applying the rule information to be applied to the user determined in the rule application determination step to the process associated with the use request for the service; and a storage step of storing a record of the rule information applied to the process associated with the use request for the service in the rule information application step;

a license information storage step of storing license information including an association between first service identification information of the service identification information and registration information, the first service identification information identifying a first service and including a license for the first service, and the registration information being used for registering the first service identification information as the service to be provided;

a license authentication step of receiving a registration request including the first service identification information and the registration information, and executing a license authentication process based on the license information and the first service identification information and the registration information included in the received registration request; and a setting registration step of registering the received first service identification information as the service to be provided in the management information in a case where a validity of the registration request is verified by the license authentication process.

13. A non-transitory computer-readable medium having a program stored thereon, the program, when executed, causing a service providing system including one or more information processing apparatuses to provide a service to a service using apparatus connected to the service providing system via a network, and causing the service providing system to:

store management information including an association between service identification information of the service to be provided, user identification information of a user using the service, and device identification information of the service using apparatus;

receive authentication information from the service using apparatus, the authentication information including at least one of user authentication information used for user authentication and device authentication information used for device authentication;

execute an authentication process on the received authentication information;

identify the service associated with the authentication information based on the authentication information and the management information in a case where the authentication information is authenticated; and execute a process according to a use request for the identified service upon receiving the use request for the service from the service using apparatus;

determine rule information to be applied to the user based on use history information of the service stored in association with the user identification information, and rule information to be applied to the process associated with the use request for the service according to the use history information;

apply the determined rule information to the process associated with the use request for the service; and store a record of the rule information applied to the process associated with the use request for the service;

store license information including an association between first service identification information of the service identification information and registration information, the first service identification information identifying a first service and including a license for the first service, and the registration information being used for registering the first service identification information as the service to be provided;

receive a registration request including the first service identification information and the registration information, and execute a license authentication process based on the license information and the first service identification information and the registration information included in the received registration request; and register the received first service identification information as the service to be provided in the management information in a case where a validity of the registration request is verified by the license authentication process.

* * * * *